US012417692B2

(12) United States Patent
Krejcarek

(10) Patent No.: US 12,417,692 B2
(45) Date of Patent: *Sep. 16, 2025

(54) METHOD OF FABRICATION OF LOW-POWER ELECTRONIC TAPE FOR TRACKING ITEMS

(71) Applicant: Reelables, Inc., San Francisco, CA (US)

(72) Inventor: Brian Grant Krejcarek, Seattle, WA (US)

(73) Assignee: Reelables, Inc., San Francisco, CA (US)

(*) Notice: Subject to any disclaimer, the term of this patent is extended or adjusted under 35 U.S.C. 154(b) by 161 days.

This patent is subject to a terminal disclaimer.

(21) Appl. No.: 18/341,654

(22) Filed: Jun. 26, 2023

(65) Prior Publication Data

US 2023/0343202 A1    Oct. 26, 2023

Related U.S. Application Data

(63) Continuation-in-part of application No. PCT/US2023/069028, filed on Jun. 23, 2023, which
(Continued)

(51) Int. Cl.
*G08B 21/24* (2006.01)
*G08B 5/22* (2006.01)
*H04W 4/80* (2018.01)

(52) U.S. Cl.
CPC ............ *G08B 21/24* (2013.01); *G08B 5/223* (2013.01); *H04W 4/80* (2018.02)

(58) Field of Classification Search
CPC ......... G08B 21/24; G08B 5/223; H04W 4/80; Y02D 30/70
(Continued)

(56) References Cited

U.S. PATENT DOCUMENTS 6,614,392 B2 * 9/2003 Howard .................. G01S 19/09
342/357.31
8,294,040 B2 10/2012 Shimizu
(Continued)

FOREIGN PATENT DOCUMENTS

CN    206058255 U    3/2017
CN    206162636 U    5/2017
(Continued)

OTHER PUBLICATIONS

International Search Report Issued for PCT/US24/35342, mailed on Dec. 10, 2024, 16 pgs.
(Continued)

*Primary Examiner* — Omar Casillashernandez
(74) *Attorney, Agent, or Firm* — PATENT LAW WORKS LLP

(57) ABSTRACT

A wireless communication tape, dispenser of the same and methods of usage of the wireless tape and the dispenser in asset tracking applications are disclosed. The wireless communication tape can be manufactured in an ultrathin form factor by laminating a stack of layers to impart functionality to the wireless communication tape. Methods of use and operation of the wireless communication tape are disclosed to save battery resources of the communication tape.

25 Claims, 53 Drawing Sheets

Related U.S. Application Data is a continuation of application No. 17/849,482, filed on Jun. 24, 2022, application No. 18/341,654, filed on Jun. 26, 2023 is a continuation-in-part of application No. 17/849,482, filed on Jun. 24, 2022, which is a continuation-in-part of application No. 17/187,704, filed on Feb. 26, 2021, now Pat. No. 11,594,120, which is a continuation of application No. 16/596,698, filed on Oct. 8, 2019, now Pat. No. 10,964,197.

(60) Provisional application No. 62/742,935, filed on Oct. 9, 2018.

(58) Field of Classification Search
USPC ...................................................... 340/539.1
See application file for complete search history.

(56) References Cited

U.S. PATENT DOCUMENTS

| | | | |
|---|---|---|---|
| 8,836,533 B2 | 9/2014 | Timm | |
| 9,092,814 B2 | 7/2015 | Timm | |
| 9,648,751 B2 | 5/2017 | Depres | |
| 10,108,898 B1 | 10/2018 | Ballam | |
| 10,153,657 B1 | 12/2018 | Koifman | |
| 2004/0121231 A1* | 6/2004 | Kim | H01M 50/553 |
| | | | 429/185 |
| 2005/0079418 A1 | 4/2005 | Kelley | |
| 2008/0061972 A1 | 3/2008 | Hwang | |
| 2008/0117048 A1 | 5/2008 | Rachwalski | |
| 2008/0159364 A1 | 7/2008 | Rofougaran | |
| 2008/0268344 A1* | 10/2008 | Kim | H01M 50/55 |
| | | | 429/246 |
| 2011/0135849 A1 | 6/2011 | Kruesemann | |
| 2011/0293851 A1 | 12/2011 | Bollstrom | |
| 2012/0067961 A1 | 3/2012 | Mauricia | |
| 2013/0074330 A1* | 3/2013 | Tucholski | H01M 4/42 |
| | | | 29/832 |
| 2015/0129666 A1 | 5/2015 | Butler | |
| 2015/0201694 A1 | 7/2015 | Boyce | |
| 2015/0208513 A1 | 7/2015 | Hirano | |
| 2015/0296612 A1 | 10/2015 | Gumbiowski | |
| 2018/0025603 A1* | 1/2018 | Tyler | H04W 52/0216 |
| | | | 340/572.1 |
| 2018/0037009 A1 | 2/2018 | Carvalho Gomes | |
| 2018/0240376 A1 | 8/2018 | Caironi | |
| 2019/0069788 A1 | 3/2019 | Coleman | |
| 2019/0187456 A1 | 6/2019 | Filo | |
| 2020/0092683 A1* | 3/2020 | Fyfe | H04L 67/125 |
| 2020/0111343 A1* | 4/2020 | Krejcarek | H04W 4/80 |
| 2020/0387766 A1* | 12/2020 | Seitz | G06K 19/0723 |
| 2022/0245420 A1 | 8/2022 | Yazaki | |
| 2022/0271816 A1* | 8/2022 | Alijan | H04B 1/0475 |
| 2022/0319301 A1 | 10/2022 | Krejcarek | |
| 2024/0029589 A1 | 1/2024 | Krejcarek | |

FOREIGN PATENT DOCUMENTS

| | | |
|---|---|---|
| CN | 107992924 A | 5/2018 |
| EP | 1995053 A1 | 11/2008 |
| WO | 2006076667 A2 | 7/2006 |
| WO | 20100041173 | 4/2010 |
| WO | 2013104520 A1 | 7/2013 |
| WO | 2015143202 A1 | 9/2015 |
| WO | 2017046699 A1 | 3/2017 |
| WO | 2017084760 A1 | 5/2017 |
| WO | 2018039558 A1 | 3/2018 |
| WO | 2018210977 A1 | 11/2018 |
| WO | 2019055161 A1 | 3/2019 |
| WO | 2021206753 A1 | 10/2021 |
| WO | 20210206753 | 10/2021 |

OTHER PUBLICATIONS

International Preliminary Report on Patentability Issued for PCT/US23/069028, mailed on Jan. 2, 2025, 10 pgs.
International Search Report in PCT Application No. PCT/US19/55272, mailed Jan. 6, 2020.
International Search Report in PCT Application No. PCT/US23/69028, mailed Sep. 28, 2023.

* cited by examiner

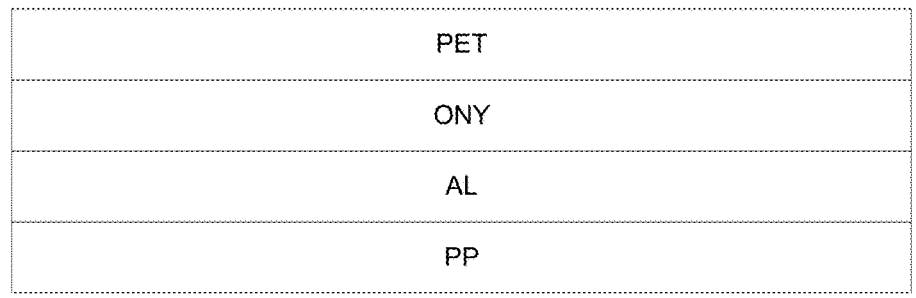
FIG. 11A
FIG. 11B
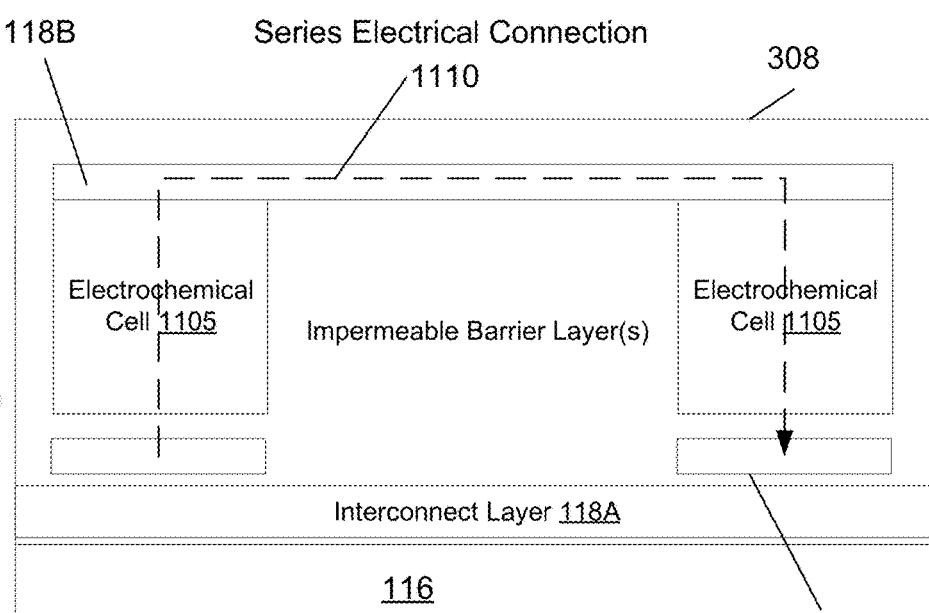
FIG. 11C

Even number of planar stacked cells with series connections and capability to route two or more different voltages to different types of circuits 1880

Circuits at first voltage level (e.g.,3V circuits) 1882

(Circuits at second voltage level (e.g., 6V circuits) 1884

FIG. 18C

Form a wireless tracking label layer structure having least two conductive layers separated by intermediate layer (e.g., aluminum, Paper/PET, aluminum) 2202

Form perforation holes between at least two conductive layers of a wireless tracking label 2204

Fill in voids using conductive ink or conductive epoxy 2206

Interconnect Separator Layers

METHOD OF FABRICATION OF LOW-POWER ELECTRONIC TAPE FOR TRACKING ITEMS

CROSS-REFERENCE TO RELATED APPLICATIONS

This application is a continuation-in-part of PCT Patent Application No. PCT/US2023/069028 filed on Jun. 23, 2023, entitled "METHOD OF FABRICATION OF LOW-POWER ELECTRONIC TAPE FOR TRACKING ITEMS", which is a continuation-in-part of U.S. patent application Ser. No. 17/849,482, filed on Jun. 24, 2022, entitled "METHOD OF FABRICATION OF LOW-POWER ELECTRONIC TAPE FOR TRACKING ITEMS". This application is a continuation-in-part of U.S. patent application Ser. No. 17/849,482, filed on Jun. 24, 2022, entitled "METHOD OF FABRICATION OF LOW-POWER ELECTRONIC TAPE FOR TRACKING ITEMS", which is a continuation-in-part of U.S. patent application Ser. No. 17/187,704 filed on Feb. 26, 2021, entitled "LOW-POWER ELECTRONIC TAPE FOR TRACKING ITEMS", now issued as U.S. Pat. No. 11,594,120, which is a continuation of U.S. patent application Ser. No. 16/596,698, filed on Oct. 8, 2019, entitled "LOW-POWER ELECTRONIC TAPE FOR TRACKING ITEMS", now issued as U.S. Pat. No. 10,964,197, which claims the benefit of priority of U.S. Provisional Application No. 62/742,935 filed on Oct. 9, 2018 entitled "LOW-POWER ELECTRONIC TAPE FOR TRACKING ITEMS," the content of which are incorporated herein by reference in its entirety and should be considered a part of this specification.

BACKGROUND

Field

This invention relates generally to the field of wireless communication and more particularly to ultrathin Bluetooth labels used for asset tracking.

Description of the Related Art

The ability to track objects can have many commercial uses, including cargo tracking and logistics in supply chains. For example, nearly every business that maintains inventory can use an improved system to track objects within its inventory.

SUMMARY

In one aspect, a wireless tape is disclosed that includes wireless tracking labels, which may be formed in a reel-to-reel process and later separated to form individual wireless tracking labels. The wireless tape includes: a polyester substrate; an interconnect layer coated on the polyester substrate and patterned to electrically couple a plurality of electrical circuits, wherein the electrical circuits are formed and/or bonded on the interconnect layer, and comprise an RF processor, an RF communication circuit configured to broadcast beacons at a broadcast frequency; and a battery comprising a cathode and anode layer and a battery pouch disposed on the interconnect layer, wherein the interconnect layer comprises the cathode layer, and wherein the RF processor is configured to: receive the electrical signal; determine a rate of change of the electrical signal; and modulate the broadcast frequency, at least in part, based on the determined rate of change of the electrical signal. In some implementations, the RF processor is a Bluetooth processor and the RF communication circuit is Bluetooth processor.

In some implementations, the Bluetooth processor is further configured to: select a sequence of broadcasting signals, comprising a predetermined number of broadcasting signals; modify the broadcasting signals in the sequence based on a predetermined modification algorithm; and signal the Bluetooth communication circuit to transmit the sequence of the modified broadcasting signals to a smart device.

In one implementation, the smart device receives and routes the sequence of modified broadcasting signals to a wireless tape application running on the smart device and the wireless tape application reconstructs unmodified broadcasting signals from the received modified broadcasting signals, based on the predetermined modification algorithm.

In some implementations, the wireless tape further includes: a coil antenna formed and/or disposed on the interconnect layer and tuned to resonate at a frequency generated by a transceiver of a smart device; and wherein the coil antenna is electrically coupled to a GPIO port of the Bluetooth processor, wherein the coil antenna is configured to receive RF energy field generated by the transceiver and convert the RF energy to an AC signal, and transmit the AC signal to the GPIO port of the Bluetooth processor waking up the Bluetooth processor, and wherein the Bluetooth processor begins transmitting a wireless beacon comprising a startup sequence, having a predefined power level and an identifier of the Bluetooth processor and the Bluetooth communication circuit.

In another implementation, the wireless tape further includes a first conductive plane and a second conductive plane formed on opposite edges of the wireless tape and on an external surface of the wireless tape, wherein the interconnect layer is further patterned to connect the first and second conductive planes to terminals of a GPIO port of the Bluetooth processor, and wherein the first and second conductive planes comprise an electrically conductive adhesive layer.

In some implementations, a dispenser is configured to dispense the wireless tape.

In another aspect, a method is disclosed. The method includes: providing a polyester substrate; coating an interconnect layer on the polyester substrate and patterning the interconnect layer to electrically couple a plurality of electrical circuits, wherein the electrical circuits are formed and/or bonded on the interconnect layer, and comprise a Bluetooth processor, a Bluetooth communication circuit configured to broadcast beacons at a broadcast frequency, and an energy harvesting circuit; providing a photovoltaic layer coupled to the energy harvesting circuit, wherein the photovoltaic layer and the energy harvesting circuit are configured to generate an electrical signal from converting light to the electrical signal; and forming a layered battery comprising a cathode and anode layer and a battery pouch disposed on the interconnect layer, wherein the interconnect layer comprises the cathode layer, and wherein the Bluetooth processor is configured to: receive the electrical signal; determine a rate of change of the electrical signal; and modulate the broadcast frequency, at least in part, based on the determined rate of change of the electrical signal.

In some implementations, the Bluetooth processor is further configured to: select a sequence of broadcasting signals, comprising a predetermined number of broadcasting signals; modify the broadcasting signals in the sequence based on a predetermined modification algorithm; and signal the Bluetooth communication circuit to transmit the sequence of the modified broadcasting signals to a smart device.

In another implementation, the smart device receives and routes the sequence of modified broadcasting signals to a wireless tape application running on the smart device and the wireless tape application reconstructs unmodified broadcasting signals from the received modified broadcasting signals, based on the predetermined modification algorithm.

In some implementations, the method further includes: forming and/or disposing a coil antenna on the interconnect layer; tuning the coil antenna to resonate at a frequency generated by a transceiver of a smart device; and electrically coupling the coil antenna, and a GPIO port of the Bluetooth processor, wherein the coil antenna is configured to receive RF energy field generated by the transceiver and convert the RF energy to an AC signal, and transmit the AC signal to the GPIO port of the Bluetooth processor waking up the Bluetooth processor, and wherein the Bluetooth processor begins transmitting a wireless beacon comprising a startup sequence, having a predefined power level and an identifier of the Bluetooth processor and the Bluetooth communication circuit.

In one implementation, the Bluetooth processor further comprises an ADC configured to receive voltages from a conductive surface of the wireless tape and the Bluetooth processor is further configured to determine a rate of change of the voltages from the conductive surface and modulate the broadcast frequency, at least in part, based on the determined rate of change of the voltages from the conductive plane.

In another implementation, the method further includes forming a first conductive plane and a second conductive plane on opposite edges of the wireless tape and on an external surface of the wireless tape; and further patterning the interconnect layer to connect the first and second conductive planes to terminals of a GPIO port of the Bluetooth processor, and wherein the first and second conductive planes comprise an electrically conductive adhesive layer.

In one implementation, a wireless tracking label includes a flexible substrate. An interconnect layer is formed on the flexible substrate and patterned to electrically couple a plurality of electrical circuits including a wireless RF communication processor and a wireless RF communication circuit configured to generate tracking information. A battery is formed on the flexible substrate and includes a cathode layer and an anode layer, with a battery pouch disposed on the interconnect layer, the battery pouch containing electrochemical components of the battery. In some implementations, the battery includes a cathode coating and an anode coating, with a battery pouch formed on the interconnect layer, the battery pouch containing electrochemical components of the battery to form a barrier impermeable to gases or moisture deleterious to battery lifetime for electrolyte chemicals including at least one member from the group consisting of $ZnSO_4$, $ZnCl_2$, $MnSO_4$, and $AlCl_4$. In some implementations, the battery comprises two electrochemical cells in series formed by a planar process with vertical flow of ions in each electrochemical cell with a planar conductive layer coupling the two electrochemical cells in series. Alternatively, in some implementations, the battery comprises two electrochemical cells in series formed by a coplanar process with each electrochemical cell having a lateral flow of ions between an interdigitated cathode and anode with a planar conductive layer coupling the two electrochemical cells in series.

In one implementation, wireless tracking label tape includes a flexible substrate. An interconnect layer is formed on the flexible substrate and patterned to electrically couple a plurality of electrical circuits including a wireless RF communication processor and a wireless RF communication circuit configured to generate tracking information. A battery formed on the flexible substrate includes a cathode layer and an anode layer, with a battery pouch disposed on the interconnect layer. The battery pouch contains the electrochemical components of the battery. In one implementation, the wireless RF communication processor is a Bluetooth processor and the wireless RF communication circuit is a Bluetooth communication circuit, and the wireless RF communication processor and the wireless RF communication circuit are configured to generate broadcast beacons at a broadcast frequency. In one implementation, the battery is coated onto the interconnect layer. In one implementation, the battery is a layered structure. In one implementation, the battery is printed onto the interconnect layer. In one implementation, the wireless RF communication processor and the wireless RF communication circuit are configured to stay in a power-saving sleep mode during storage until activated for use. In one implementation, the wireless tracking label tape is formed in a reel-to-reel process with the wireless RF communication processor and the wireless RF communication circuit of at least one individual wireless tracking label is activated subsequent to separation from a reel. In one implementation, the wireless tracking label tape includes a coil antenna tuned to resonate at a wake-up frequency and generate a wake-up voltage in response to engaging with a device having a transceiver emitting a wireless signal at the wake up frequency. In one implementation, the wireless tracking label tape includes a coil antenna to harvest energy from engaging with HF RFID or NFC reader and in response generate a wake-up voltage for the wireless RF communication processor and the wireless RF communication circuit. In one implementation of the wireless tacking label tape, the wireless RF communication processor is configured to: receive an electrical signal; determine a rate of change of the electrical signal; and modulate a broadcast frequency, at least in part, based on the determined rate of change of the electrical signal.

In one implementation, a wireless tracking label tape includes a flexible substrate. An interconnect layer is formed on the flexible substrate and patterned to electrically couple a plurality of electrical circuits including a wireless RF communication processor and a wireless RF communication circuit configured to generate tracking information. A battery is printed onto the interconnect layer and includes a cathode layer and an anode layer. A battery pouch disposed on the interconnect layer, the battery pouch containing electrochemical components of the battery. The wireless tracking label tape is formed in a reel-to-reel process with the wireless RF communication processor and the wireless RF communication circuit of at least one individual wireless tracking label activated subsequent to separation from a reel. In one implementation, the wireless tracking label tape includes a coil antenna tuned to resonate at a wake-up frequency and generate a wake-up voltage in response to engaging with a user device having a transceiver emitting a wireless signal at the wake up frequency. In one implementation, the wireless tracking label tape includes a coil antenna to harvest energy from engaging with a n HF RFID or an NFC reader and in response generate a wake-up voltage for the wireless RF communication processor and the wireless RF communication circuit. In one implementation, the wireless RF communication processor and the wireless RF communication circuit comprises a Bluetooth processor and a Bluetooth communication circuit configured to generate broadcast beacons at a broadcast frequency.

In one implementation, a wireless tracking label tape has a flexible substrate. An interconnect layer formed on the flexible substrate is patterned to electrically couple a plurality of electrical circuits including a RF communication processor and a RF communication circuit configured to generate broadcast beacons at a broadcast frequency. A battery formed on the flexible substrate has a cathode coating and an anode coating. A battery pouch is formed on the interconnect layer, the battery pouch containing electrochemical components of the battery to form a barrier impermeable to gases or moisture deleterious to battery lifetime. The electrolyte chemicals of the battery include at least one member from the group consisting of $ZnSO_4$, $ZnCl_2$, $MnSO_4$, and $AlCl_4$. In one implementation, the interconnect layer comprises an aluminum layer. In one implementation, the RF communication processor and the RF communication circuit are configured to stay in a power-saving sleep mode during storage until activated for use. In one implementation, the wireless tracking label tape is formed in a reel-to-reel process with the RF communication processor and the RF communication circuit of at least one individual wireless tracking label activated subsequent to separation from a reel. In one implementation, the wireless tracking label tape includes coil antenna tuned to resonate at a wake-up frequency and generate a wake-up voltage in response to engaging with a user device having a transceiver emitting a wireless signal at the wake up frequency. In one implementation, the battery includes at least two electrochemical cells in series formed by a planar process with vertical flow of ions in each electrochemical cell with a planar conductive layer coupling the two electrochemical cells in series. In one implementation, the battery comprises at least two electrochemical cells in series formed by a coplanar process with each electrochemical cell having a lateral flow of ions between an interdigitated cathode and anode, with a planar conductive layer coupling the two electrochemical cells in series. In one implementation, the battery comprises 3 electrochemical cells in series with an electrical trace formed on the flexible substrate electrically coupling a top layer to a bottom layer.

In one implementation of a method of fabricating a wireless tracking label tape, the method includes: forming a sequence of patterned anode and cathode battery layer sections into a first section and a second section on a flexible substrate. The first second and the second section are arranged on opposite sides of a fold line. At least one conductive trace is formed crossing the fold line between the first and second section. The method includes folding the flexible substrate along a pre-selected fold line to form a battery housed in a battery pouch having in series at least 3 electrochemical cells of the battery. The method includes mounting a RF communication chip to the flexible substrate with an electrical interconnect layer coupling the positive current collector and negative current collector of the battery in series to the RF communication chip with the conductive trace providing an electrical connection to one of the positive current collector and negative current collector.

In one implementation of a method of fabricating a wireless tracking label tape, the method includes: forming on a flexible substrate, cathode layer regions and anode layer regions; patterning a transfer adhesive onto the flexible substrate in 1) a first set of regions to be used as seals; and 2) a second set of regions that have electrolyte; and applying a powdered gel electrolyte to the second set of regions.

BRIEF DESCRIPTION OF THE DRAWINGS

These drawings and the associated description herein are provided to illustrate specific implementations of the invention and are not intended to be limiting.

FIG. 11A illustrates an example of conventional battery pouch layers.

FIG. 11B illustrates a functional equivalent of battery pouch layers in terms of providing an impermeable barrier.

FIG. 11C is a side view of a battery pouch in accordance with an implementation.

FIG. 18C illustrates how a wireless tracking label with an even number of at least four electrochemical cells in series can be used to power dual voltage circuits in accordance with an implementation.

DETAILED DESCRIPTION

Figure 1A:
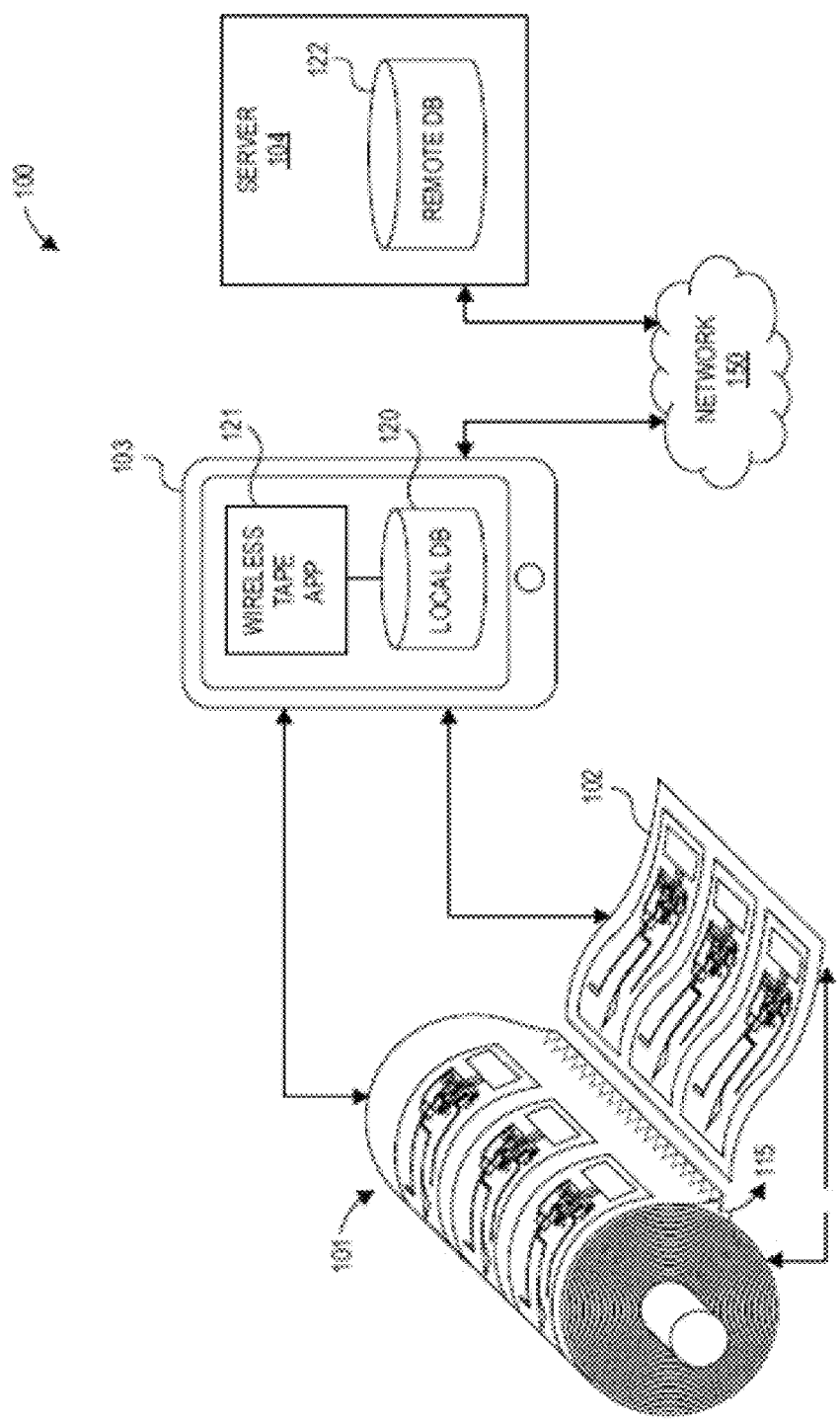
FIG. 1A illustrates an object tracking system according to an implementation.

The following detailed description of certain implementations presents various descriptions of specific implementations of the invention. However, the invention can be embodied in a multitude of different ways as defined and covered by the claims. In this description, reference is made to the drawings where like reference numerals may indicate identical or functionally similar elements.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

Object Tracking System 100

FIG. 1A illustrates an object tracking system 100 according to an implementation. A tape dispenser 101 can be used to dispense a wireless tape 102 from a reel of rolled up wireless tape 102. The dispenser 101 can include a cutting means 115 for detaching wireless tape 102 from its reel. The wireless tape 102 can include an adhesive layer allowing it to be affixed to various objects for tracking.

Wireless tape 102 is capable of wireless communication with a smart device 103. The smart device 103 may be any kind of computer system capable of sending and receiving wireless communication to and from the wireless tape 102. Examples include smart phones, tablets, smart glasses, smart watches, laptops, desktops, personal digital assistant (PDA) devices and others. In one implementation, a wireless tape application 121 may run on the smart device 103 to manage the operations of one or more wireless tapes 102. The wireless tape application 121 can include program instructions to wirelessly communicate with the wireless tapes 102 and a server 104 via a wired or wireless connection with the network 150. The network 150 can be a local-area network, intranet, wide-area network, internet, the Internet, wireless networks, wired networks, a Wi-Fi, Bluetooth, cellular network or other networks. The server 104 may be local to the wireless tape 102 and/or the smart device 103 or it may be at a remote location.

The wireless tape application 121 may maintain and/or manage a local database 120 on the smart device 103. The local database 120 can store various information related to the tracking and management of the wireless tapes 102, such as an identifier for each wireless tape 102, name of an associated item to which the wireless tape is affixed, description and/or images of the item, historical tracking data, an identifier of the owner/custodian of the item and other information as may be desired to be stored in relation to a tracked object. The data stored in local database 120 can additionally, instead or partially be stored in a remote database 122 at the server 104. The server 104 may include the remote database 122, which includes information about additional wireless tapes 102 that may be associated with a user and also other users of wireless tapes 102. Although illustrated as a single server 104, the server 104 may be implemented as a plurality of networked servers.

Figure 1B:
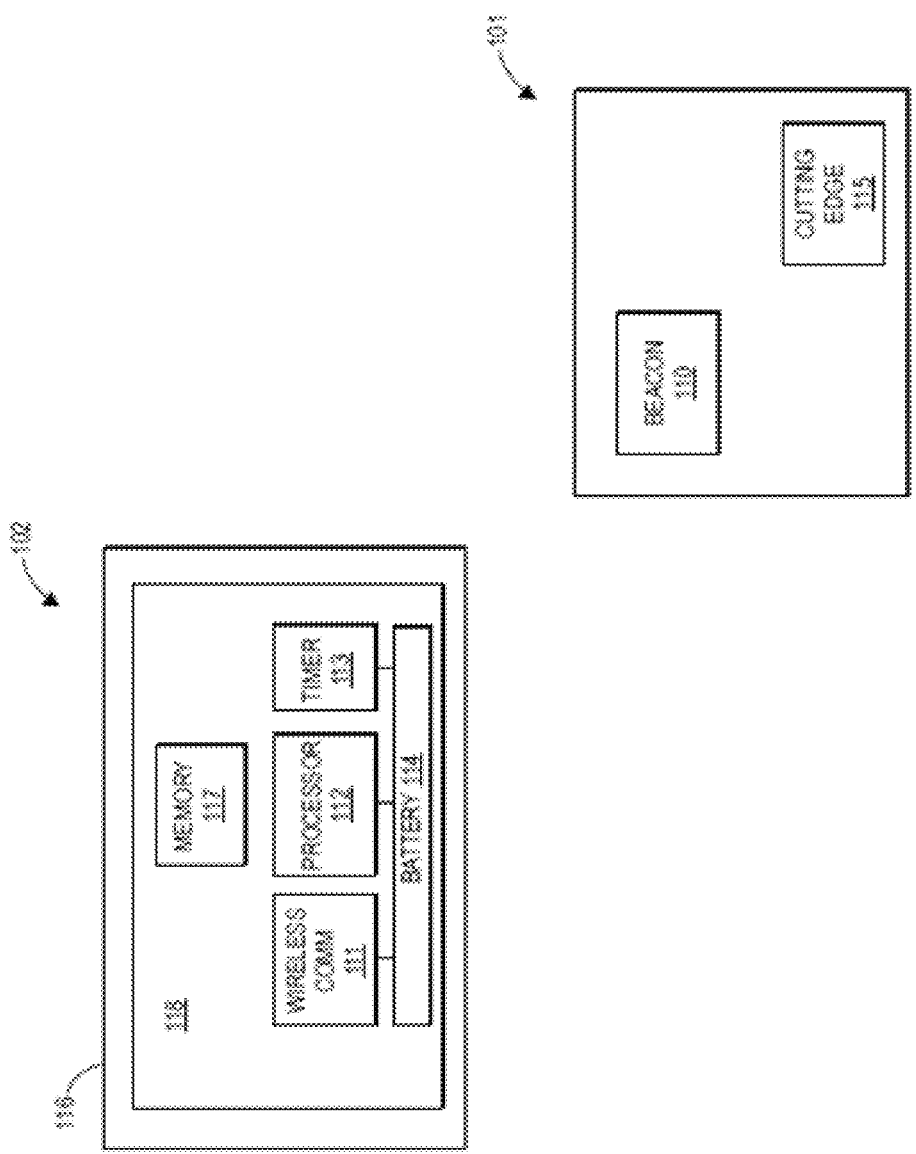
FIG. 1B is a block diagram illustrating more details of a dispenser and a wireless tape, used in the object tracking system.

FIG. 1B is a block diagram illustrating more details of the dispenser 101 and the wireless tape 102. The dispenser 101 may include a beacon 110, comprising a wireless communication system, and a cutting means 115 for detaching pieces of wireless tape 102 from a roll of them. The beacon 110 can be any wireless communication device, capable of transmitting and receiving wireless communication signals to and from the smart device 103. As described earlier, the dispenser 101 can include a cutting means 115 configured to detach wireless tapes 102 during dispensing process. In other implementations, the dispenser 101 can be a housing enclosing a stack of wireless tapes 102 that are folded in a zig-zag pattern on top of one another. A small slit in the housing allows at least one wireless tape 102 to protrude through the slit, giving a user an ability to tear one wireless tape 102 from the rest of the stack. The wireless tapes 102 may be separated by perforation along which a user may tear and separate one wireless tape 102 from the rest. Alternatively, or in addition to perforation, a cutting means at the slit can facilitate separating a wireless tape 102 from the rest.

The wireless tape 102 may comprise a plurality of electronics on a flexible and ultrathin substrate 116. In some implementations, the electronics in the wireless tape 102 can include a wireless communication circuit 111, a processor 112, timer 113, battery 114, and memory module 117, etched, fabricated, bonded or otherwise formed on the substrate 116 and connected through an interconnect layer 118. The interconnect layer 118 can be any electrically conductive material, including aluminum, copper, gold, silver and others. While the circuitry in the wireless tape 102 are shown as discrete components, the persons of ordinary skill in the art can appreciate that these components can be combined in single or multiple chips, depending according to various implementations of the disclosed implementations. For example, when a Bluetooth wireless communication circuit is used to implement the wireless tape 102, the processor 112 can include Bluetooth wireless communication circuitry, and timing circuits, as well as volatile and non-volatile memory to carry out the operations of the wireless tape 102. Alternatively, some components may be integrated, while others can remain as separate components.

Using the Object Tracking System 100

Figure 2A:
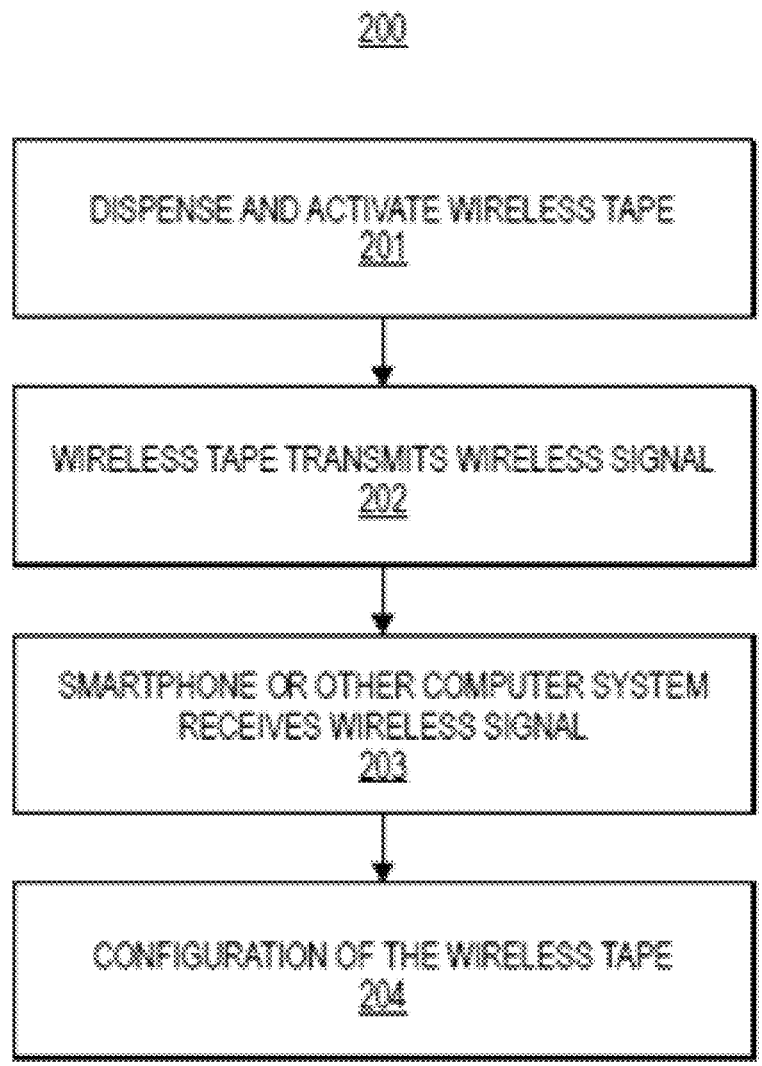
FIG. 2A illustrates an exemplary method of dispensing the wireless tape from the dispenser for tracking objects.

FIG. 2A illustrates an exemplary method 200 of dispensing the wireless tape 102 from dispenser 101 for tracking objects. The wireless tape 102 can be dispensed from a roll of wireless tapes 102 and subsequently attached to an item to be tracked. In step 201, the wireless tape 102 is dispensed from the dispenser 101 and simultaneously activated in a single action. Activation can refer to waking up the processor 112 to send/receive wireless signals, beacons, packets or other wireless messages, using the wireless communication circuit 111. In step 202, the wireless tape 102 may transmit a wireless signal to the smart device 103. The wireless signal may be transmitted at predetermined intervals based on a signal from the timer 113 or may be transmitted based on detected changes in the environment such as through electrostatic detection or other mechanisms like ambient light sensing, accelerometer or other methods, as described herein.

The wireless signal transmitted from the wireless tape 102 may include a unique identifier that is encoded in the memory module 117 of the processor 112, where the identifier is unique among all the wireless tape devices. In step 203, the smart device 103 may receive the wireless signal from the wireless tape 102. In step 204, configuration and setup of the wireless tape 102 may be performed on the smart device 103. The configuration and setup of a wireless tape 102 can include, registering an item to be tracked and associating the item with a unique identifier of the wireless tape 102 and recording the registration and association in one or more local or remote databases, including local database 120 and the remote database 122. The smart device 103 may check for the identifier in the local database 120. If the identifier is located in the local database 120, the smart device 103 may display some or all of the stored information about the wireless tape device and its associated item. Otherwise, the smart device 103 may transmit a request to the server 104 to query the remote database 122 using the identifier. If the identifier is found in the remote database 122, then the information about the wireless tape device is retrieved from the remote database 122 and transmitted from the server 104 to the smart device 103 where the information may be displayed. For example, the smart device 103 may display an indication of the owner of the wireless tape 102. Otherwise, if the wireless tape 102 is not found in the local database 120 nor the remote database 122, then this can indicate that the wireless tape 102 is unassociated with any smart device 103 and can be paired to the smart device 103. The smart device 103 may prompt the user to pair the wireless tape 102 and thereby claim ownership of it. The smart device 103 may display on its screen user interface elements for entering information about the item that the wireless tape 102 is attached to and/or is going to be tracking. The smart device 103 can gather information, such as a name and description of the item. The gathered item information can include text entry, photo of the item, video, voice memo and/or any other data associated with the owner/tracker of the item and/or the item. The gathered item and/or owner data can be stored in the local database 120 and/or in the remote database 122 along with the identifier of the paired wireless tape 102.

Wireless Tape 102

Various techniques and material, described herein, can be used to manufacture the wireless tape 102 in an ultrathin fashion. For example, the inclusion of the battery source in most ultrathin devices can be challenging. In one implementation, the wireless tape 102 can be manufactured as a laminated structure, where a battery source is integrated in the laminated structure to distribute the battery components between various layers to reduce the overall area consumed by the battery source and to maintain the flexibility of the wireless tape 102.

Figure 3:
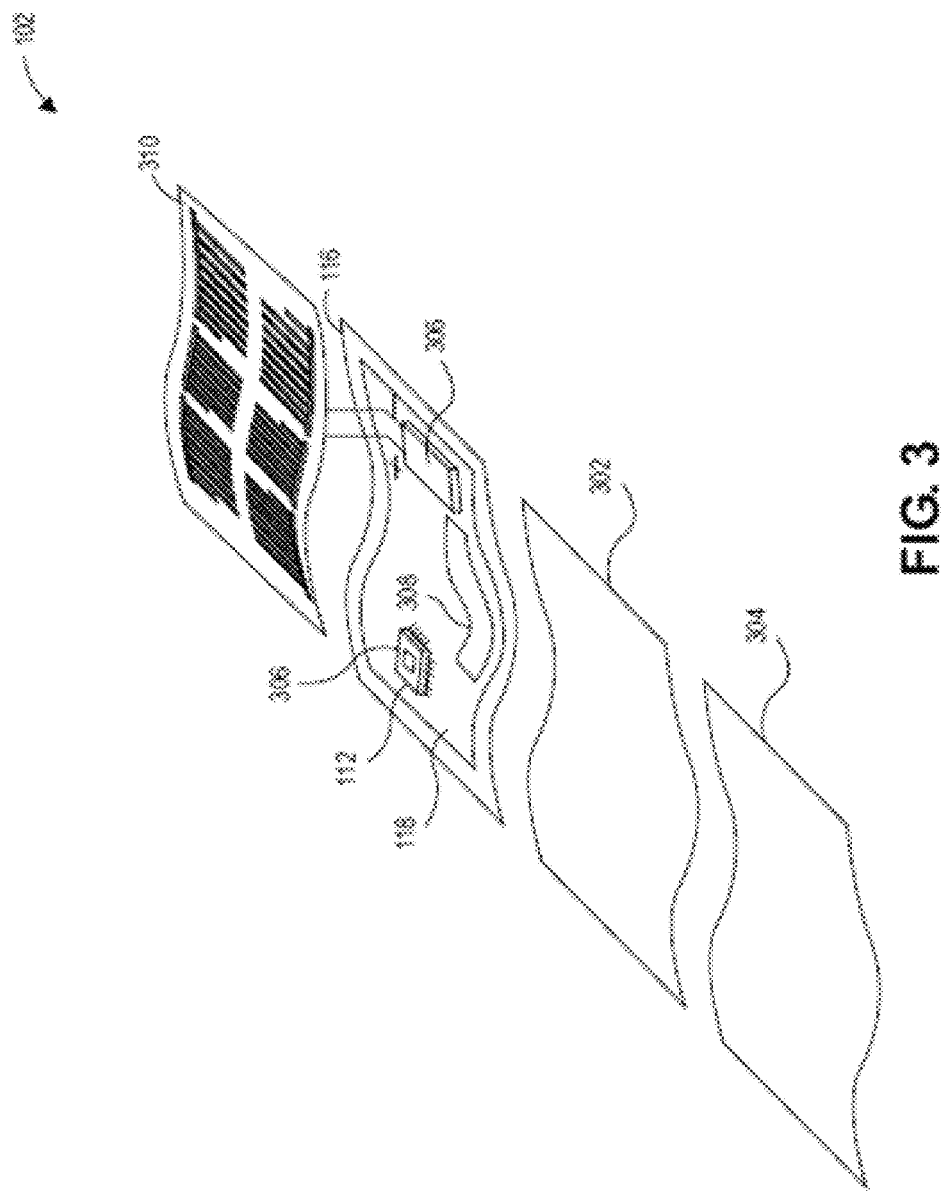
FIG. 3 illustrates some layers and arrangements of the layers in an example wireless tape according to an implementation, where a layered battery structure is used.

FIG. 3 illustrates some layers and arrangements of the layers in an example wireless tape 102 according to an implementation, where a layered battery structure is used. In the implementation shown, an anode layer 302 of the battery powering the wireless tape 102 is the bottom layer. In one implementation, the anode layer 302 may be a graphite coated anode in a reel-to-reel process. The substrate layer 116 and the components thereon are sandwiched between the anode layer 302 and a photovoltaic layer 310. The photovoltaic layer 310 can be formed from a lattice of an organic photovoltaic (OPV) material or other solar energy harvesting material. The interconnect layer 118 formed on the substrate 116 can function as a cathode of the battery powering the electronics 306 of the wireless tape 102. A battery pouch 308 containing electrochemical components of the battery can be formed on the interconnect 118. The substrate 116 can be an ultrathin and flexible material such as a polyester or Polyethylene terephthalate (PET). The interconnect layer 118 can be coated with a conductive metal, such aluminum. The battery pouch 308 can be manufactured by coating the interconnect 118 in the battery portion by an active lithium compound, such as lithium manganese dioxide. The wireless tape 102 can also include an adhesive layer 304 to allow the wireless tape 102 to be affixed to an item for tracking or other purposes.

The electronics 306 can include various components depending on the implementation of the wireless tape 102. For example, if the photovoltaic layer 310 is used, the electronics 306 can include circuitry to harvest and utilize light energy absorbed from that layer to power the electronics 306. If manual beacon trigger feature is included, the electronics 306 can include an associated switch and/or piezo electric sensors. The electronics 306 can include the components of the wireless tape 102 as described above. Examples include the wireless communication circuit 111, the processor 112, the timer 113 and the memory 117. These components can be discrete, separate components or they can be part of an integrated circuit implementing their functionality in one or multiple chips. In some implementations, as will be described, the electronics 306 can include an analog to digital converter (ADC). Additional electrical components 306, depending on the implementation of the wireless tape 102 can include a near field communication chip (NFC), sensors (e.g., sensors for detecting ambient light, motion, acceleration, temperature, etc.). While not shown, the interconnect layer 118 can be patterned in a manner to provide electrical connection and/or isolation between the electrical components 306 of the wireless tape 102. The layers shown are for example purposes only and persons of ordinary skill in the art can envision that the wireless tape 102 may be manufactured with more or fewer layers than those shown.

Example Dimensions and Components of Wireless Tape 102

Implementations of the wireless tape 102 may be constructed in various ways. One implementation of the wireless tape 102 is a paper-thin label that comprises ultrathin electronics printed or etched on laminated layers of a polyester film (e.g., PET), as described earlier. In some implementations, the thickness of the wireless tape 102, including the layers and the electronics therein, depending on the implementation, can range from approximately ½0th of a millimeter, to half a millimeter. The electronics 306 may be etched or printed into the interconnect layer 118, or they may be attached or otherwise bonded to the interconnect layer 118, as separate chips or circuits or as various integrated or separate components, depending on the implementation.

To help achieve an ultrathin form factor for the wireless tape 102, one or more of the surface areas of the battery pouch 308, the anode layer 302 or the cathode layer (e.g., some or a portion of the interconnect layer 118) can be used as a wireless communication antenna, instead of a traditional dedicated antenna component (such as a printed antenna). For example, in some implementations, the surface area of the battery pouch 308 comprises a substantial area within the wireless tape 102 and can function additionally as a wireless antenna component to radiate wireless beacons. When a Nordic nRF52810 or similar processors 112 are used, the wireless balun at the analog output of the processor 112 can be connected to an outside metal foil of the battery pouch 308, or the anode layer 302 or to the interconnect layer 118 and/or a portion thereof, where these components can additionally function as an antenna.

The wireless tape 102 may be designed with an adhesive layer to attach the wireless tape 102 to a surface of an item of interest to track the item. In one implementation, As described, the wireless tapes 102, in some implementations, can be fabricated on a very flexible substrate 116 (e.g., a PET substrate), with a thin, flexible, battery source printed or laminated directly to a flexible coated interconnect layer 118, therein. In one implementation, the battery may be printed onto the interconnect layer 118.

In one implementation, the wireless tape 102 may be designed to adhere to a range of surfaces and things. In an implementation, one or both sides of the wireless tape 102 are coated with an adhesive to allow sticking to other objects.

Methods of Pairing Wireless Tape 102 with Smart Device 103

In one implementation, the wireless communication circuit 111 can be activated and paired with the smart device 103 using near-field-communication (NFC).

NFC can be employed to pair NFC-enabled Bluetooth devices such as internet of things (IOT) appliances, wearables or other devices with user accounts on mobile phones. The pairing process can also pair these devices with backend databases associated with the user account. This works by users touching or bringing their smart devices (e.g., a smart phone) in close proximity to an NFC-enabled Bluetooth device. A coil antenna on a circuit board inside the NFC-enabled Bluetooth device receives and converts the RF energy field of the user's smart device to an electrical signal, which can turn on an NFC chip inside the NFC-enabled Bluetooth device. Example NFC chips include NTAG213, NTAG214, NTAG215, manufactured by NXP Semiconductors N.V. of Eindhoven, Netherlands (https://www.nxp.com/). Using the same energy harvested through the coil, the NFC chip can return to the smart device of the user, an NFC unique identifier. This NFC unique identifier is linked via a backend software (e.g., a database) to the Bluetooth identifier of the NFC-enabled Bluetooth device (e.g., at the time of manufacturing that product). The user's smart device can use the Bluetooth identifier to pair with the NFC-enabled Bluetooth device and communicate with it via Bluetooth. The pairing information can also be used to associate the NFC-enabled Bluetooth device with the user's profile and account in a backend database.

The NFC method of pairing described above can be used to pair a wireless tape 102 with a user's smart device 103, thereby eliminating the need for continuous broadcast of wireless beacons for pairing. Compared to continuous broadcast methods for pairing, the NFC method of pairing a wireless tape 102 and a smart device 103 consumes no battery power and prolongs the life of the wireless tape 102. Additionally, the described NFC pairing technique, can prevent multiple users from simultaneously pairing with the same wireless tape 102 because only the user whose smart device 103 is held within close proximity of the NFC-enabled wireless tape 102 (e.g., within 2-3 centimeters range of the wireless tape 102) can receive the NFC unique identifier and pair with that wireless tape 102.

However, in some implementations, the inclusion of an NFC chip (such as NTAG213) can add to manufacturing cost of the wireless tape 102, and/or the chip area dedicated to circuitry for pairing. Consequently, it is advantageous to utilize NFC techniques of pairing a wireless tape 102 to a smart device 103, without the use of a dedicated NFC chip for pairing.

Figure 4:
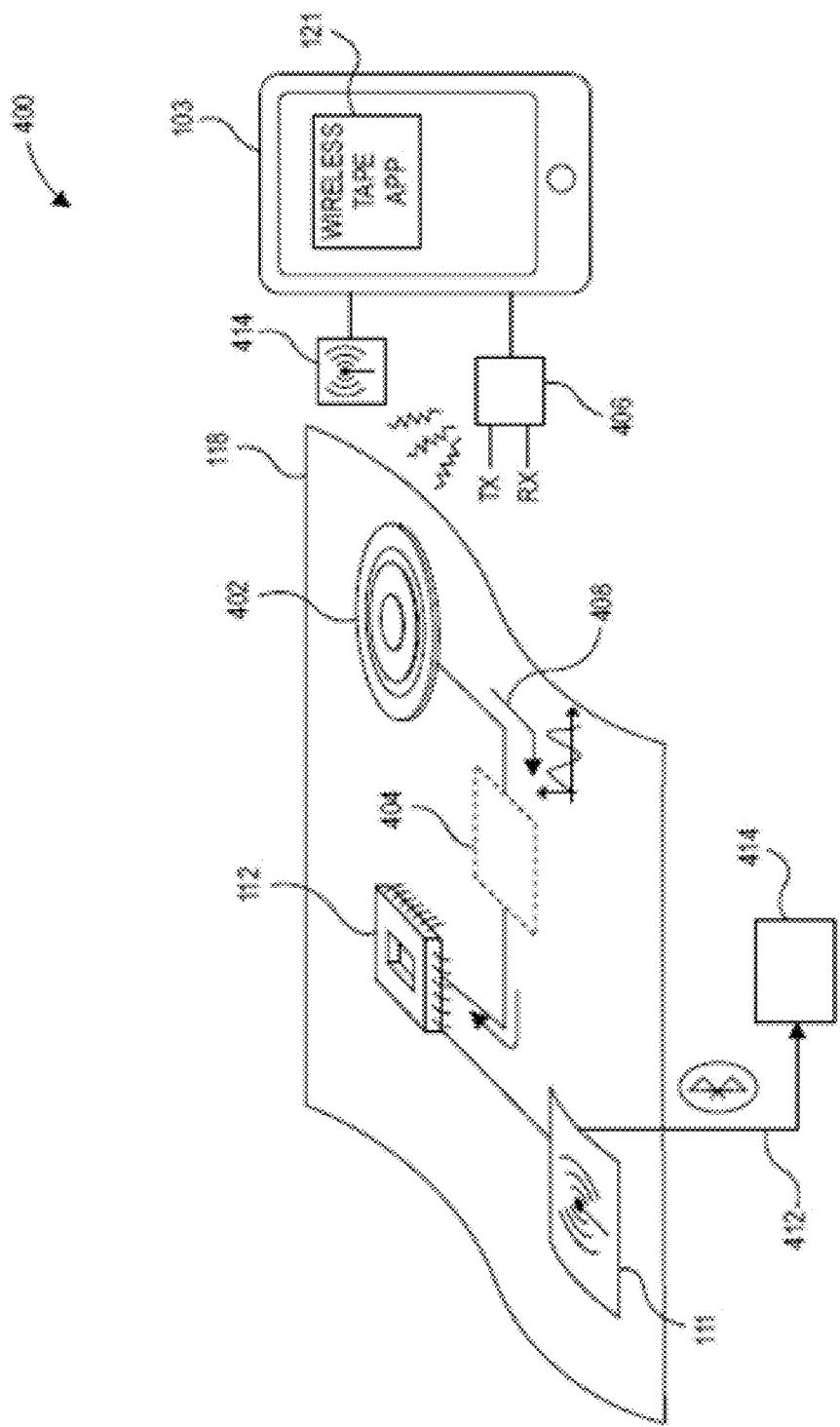
FIG. 4 illustrates a diagram of a wireless tape, which can be paired to a smart device without using a dedicated NFC pairing chip.

FIG. 4 illustrates a diagram 400 of a wireless tape 102, which can be paired to a smart device 103, without using a dedicated NFC pairing chip. As described earlier, the electronics of the wireless tape 102 can be manufactured on an interconnect layer 118, which is patterned to create electrical connections and isolation between various electrical components on the interconnect layer 118. The diagram 400 does not illustrate every component and layers of an NFC-enabled wireless tape 102. Only some components are shown to illustrate Bluetooth pairing using NFC, without a dedicated NFC chip. An NFC coil antenna 402 and an RF energy harvesting circuit 404 can be manufactured on the interconnect layer 118. A user's smart device 103 is equipped with an NFC transceiver 406 capable of generating and transmitting an RF energy field with wake-up frequency (WUF). The coil antenna 402 is tuned to resonate at the wake-up frequency, WUF sent by the transceiver 406. In some implementations, the NFC energy harvesting circuit 404 can include components, such as one or more capacitors, and rectifiers to convert an alternating current (AC) signal generated in the coil antenna 402 to a direct current (DC) signal by which the processor 112 can be awakened. In another implementation, the NFC energy harvesting circuit 404 can include components that capture a wake-up voltage 408 from the coil antenna 402 and transmit the wake-up voltage 408 to the processor 112 to wake up the processor 112. In another implementation, the NFC energy harvesting circuit 404 and some or all components therein can be skipped. In this scenario, the wake-up AC voltage generated in the coil antenna 402 can be used to directly wake up the processor 112, without converting AC voltages to DC voltages. Advantages of eliminating some or all of the components of the NFC energy harvesting circuit 404, include, lowering manufacturing cost and complexity of the NFC-enabled wireless tape 102. In other implementations, some or all of the components of the NFC energy harvesting circuit 404 can be integrated in the processor 112, when the processor 112 is implemented as a system on chip (SOC) solution.

Figure 5:
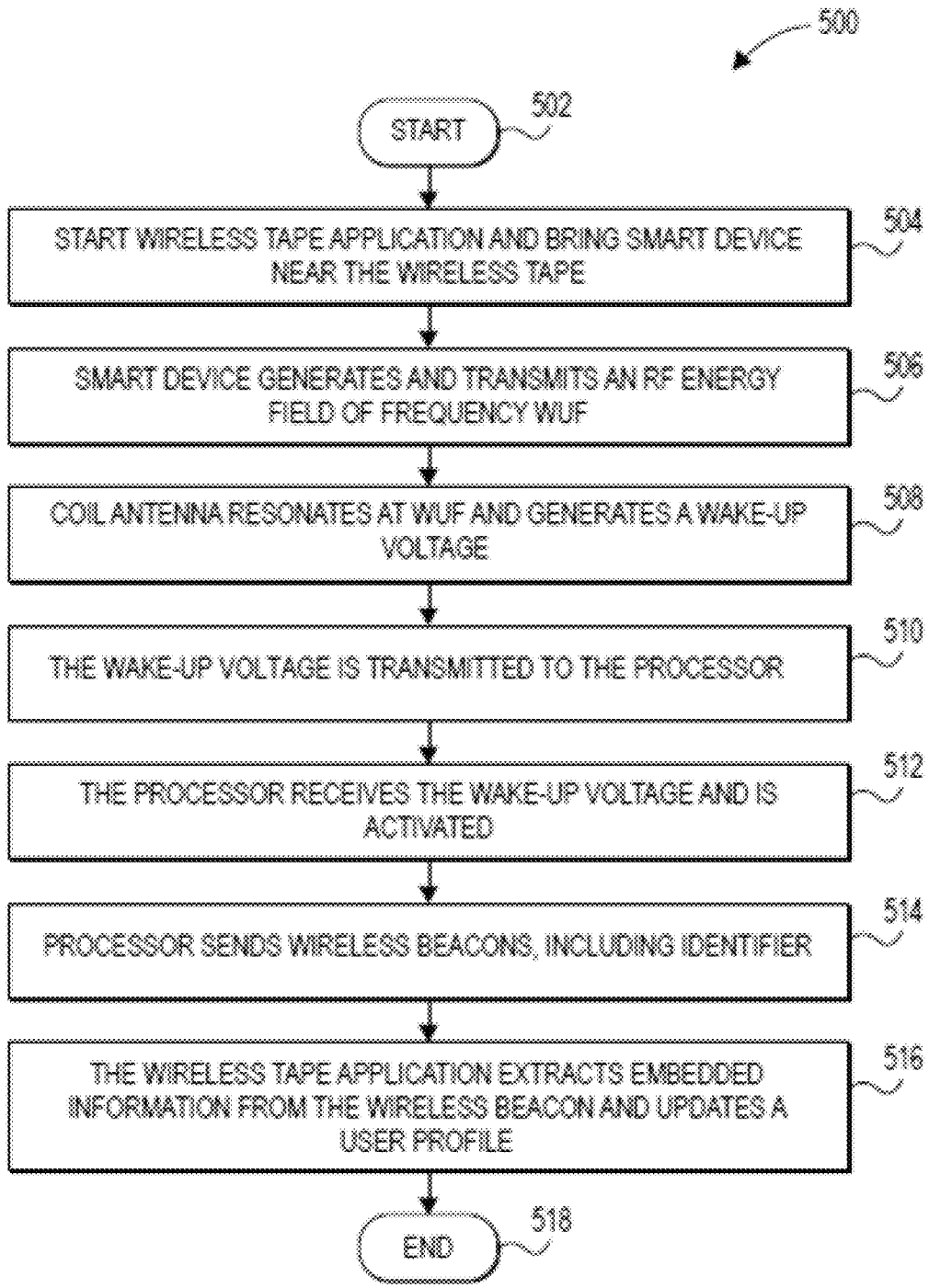
FIG. 5 illustrates a method of Bluetooth pairing of an NFC-enabled wireless tape with a smart device.

FIG. 5 illustrates a method 500 of Bluetooth pairing of an NFC-enabled wireless tape 102 with a smart device 103. The processor 112 can be a Bluetooth microprocessor, such as Nordic Semiconductor, nRF52810, as described above, and the wireless communication circuit 111 can be a Bluetooth communication circuit. While the processor 112 and the wireless communication circuit 111 are shown as separate components, in some implementations, they can be part of an integrated Bluetooth chip. The processor 112 includes a general-purpose input/output (GPIO) port capable of receiving GPIO signals. The smart device 103 can be configured to execute program instructions to run the wireless tape application 121. The wireless tape application 121 can configure the transceiver 406 to resonate at the wake-up frequency, WUF. The method 500 starts at the step 502. At step 504, the user of the smart device 103 executes the wireless tape application 121 and brings the smart device 103 in close proximity (e.g., approximately within a 5-centimeter range) of the coil antenna 402 of the wireless tape 102. At step 506, the transceiver 406 generates and transmits an RF energy field at the wake-up frequency, WUF. The coil antenna 402 is tuned to resonate at the wake-up frequency, WUF. At step 508, the coil antenna 402 resonates at the wake-up frequency, WUF, and a wake-up voltage 408 is generated and transmitted to a GPIO port of the processor 112.

In some implementations, the NFC energy harvesting circuit 404 can include components that convert the wake-up AC voltage 408 to a DC voltage. However, both a DC or AC voltage can be used at a GPIO port of the processor 112 to wake up the processor 112. For example, in some implementations, voltages (DC or AC) above 0.7 Volts (V) at the GPIO port, can wake up the processor 112. In some instances, a conversion of the wake-up AC voltage 408 to a DC voltage may be desirable to protect the processor 112 from potentially receiving an unsafely high voltage. Nevertheless, the AC to DC conversion in some implementations can be safely skipped because the range of voltages the NFC-enabled wireless tape 102 and the coil antenna 402 encounter, most likely, do not exceed the levels that may be unsafe for the processor 112. As a result, the wake-up AC voltage 408 generated in the coil antenna 402 can be applied to the GPIO port of the processor 112, without conversion. In this scenario, the NFC-enabled wireless tape 102 can be manufactured, without the components, cost and complexity of converting NFC voltages.

In implementations where a threshold voltage to wake up the processor 112 is higher than the range of voltages the coil antenna 402 can generate, a comparator circuit as an external component or as an integrated component in the processor 112, as part of a system on chip (SOC) solution, can receive the wake-up signal and wake up one or more additional circuits in the processor 112. For example, in some implementations the processor 112 can wake up when it receives a voltage above a wake-up threshold voltage of approximately 0.7V, where the antenna coil 402 can generate voltages of approximately 0.3-0.4V or lower. A comparator circuit can detect low voltages generated from the antenna coil 402 (e.g., as low as approximately 1.8V in some implementations) and wake up the rest of the circuitry in the processor 112.

At step 512, the processor 112 receives the wake-up voltage 408 at its GPIO port and is awakened from an inactive state (e.g., a deep shutdown state). At step 514, the processor 112 uses the wireless communication circuit 111 to send a sequence of Bluetooth beacons 412 (e.g., via low powered BLE signals), which can be received by the wireless communication facilities of the smart device 103. The wireless facilities of the smart device 103 can include Bluetooth communication circuits 414. The Bluetooth beacons 412 can include a Bluetooth identifier, and/or other information which may be included in the pairing process. For example, the Bluetooth beacons 412 can include a unique identifier of the wireless tape 102. At step 516, the wireless tape application 121 can receive the information embedded in the Bluetooth beacon 412 and use them to associate the wireless tape 102 with the user profile of the wireless tape application 121 and the smart device 103. The method 500 ends at the step 518.

In some implementations, the Bluetooth beacons 412 can be customized to further identify the wireless tape 102 and/or other information to be included in the pairing process. For example, the Bluetooth beacons 412 can comprise an initial startup sequence having a pre-defined sequence and/or having a predefined power-level, also identified and recorded in the wireless tape application 121. Such information can be uploaded via the wireless tape application 121 upon purchase of a roll of wireless application tapes 102, the dispenser 101 and stored in the local database 120 and/or remote database 122. In some implementations, a camera of the smart device 103 can be used to scan a barcode from a dispenser 101 or from a roll of wireless tapes 102, where the barcode can include pairing information associated with the wireless tapes 102.

While the method 500 is described in the context of pairing Bluetooth devices, persons of ordinary skill in the art can appreciate that the described systems and methods can be modified to apply to other communication protocols, such as radio frequency identification (RFID) and others. Additionally, while the described systems and methods of NFC pairing, without a dedicated NFC chip, is described in the context of pairing of wireless tapes 102, the persons of ordinary skill in the art can appreciate that the described technology can be used in other applications, where pairing of wireless devices are desired. For example, in many applications, wireless device pairings are performed infrequently or only once in the lifetime of the product. At the same time, the cost of an NFC chip used infrequently or only once for an initial pairing, may be prohibitive in several applications. The described technology can be used in these and other scenarios, where pairing of wireless devices is desired.

Figure 6:
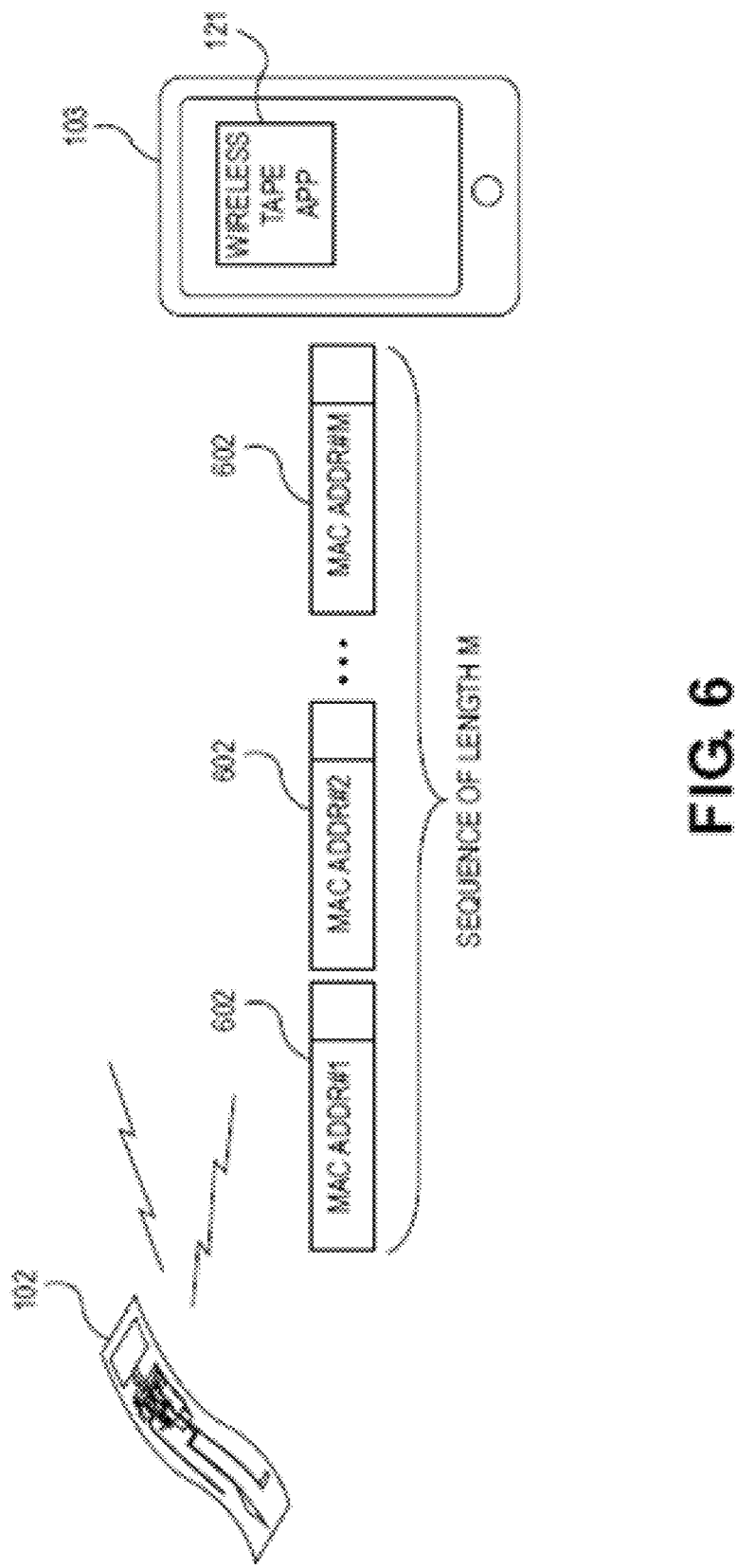
FIG. 6 illustrates a diagram of a communication protocol between a wireless tape and a smart device, which can enhance the background processes of the smart device in relation to the processing of the signals received from the wireless tape.

FIG. 6 illustrates a diagram of a communication protocol between a wireless tape 102 and a smart device 103, which can enhance the background processes of the smart device 103 in relation to the processing of the signals received from the wireless tape 102. In one implementation, the wireless tape 102 can modify its broadcasting signals 602 to simulate multiple devices sending them. The operating systems of the smart device 103 and similar devices are more likely to listen and allocate more background processes to received broadcasting signals 602 if they appear to be from new devices that they have not listened to before and/or have not processed before. In other words, in the described implementation, the broadcasting signals 602 are not redundant. The redundancy in the broadcasting signals 602 can be removed by a variety of means.

Figure 7:
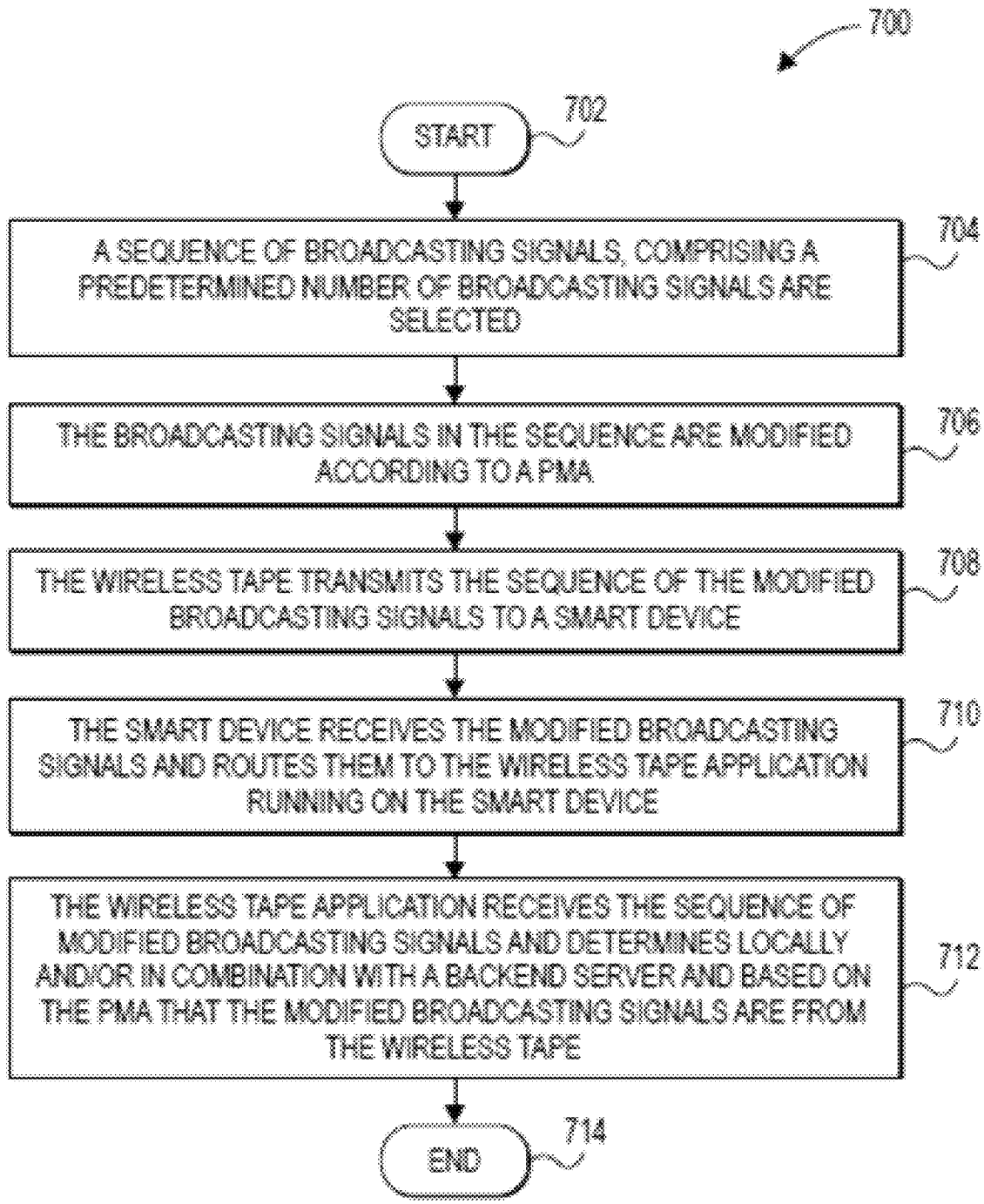
FIG. 7 illustrates a method of enhancing the background processes of a smart device in relation to receiving broadcasting signals from the wireless tape.

FIG. 7 illustrates a method 700 of enhancing the background processes of a smart device 103 in relation to receiving broadcasting signals 602 from the wireless tape 102. The method 700 starts at step 702. At step 704, a sequence of broadcasting signals 602, comprising a predetermined number of broadcasting signals 602 are selected. In one implementation, a broadcasting signal 602 is a BLE beacon formatted packet. At step 706, the broadcasting signals 602 in the sequence are modified according to a PMA. In some implementations, the PMA modifies the MAC address and/or the UUID embedded in one or more broadcasting signals 602. At step 708, the wireless tape 102 transmits the sequence of the modified broadcasting signals 602 to a smart device 103. At step 710, the smart device 103 can receive the modified broadcasting signals 602 and route them to the wireless tape application 121. The smart device 103 is more likely to receive some or all of the transmitted sequence of modified broadcasting signals 602 because they appear to be from different sources. At step 712, the wireless tape application 121 can receive the sequence of modified broadcasting signals 602 and determine locally and/or in combination with the server 104, and based on the PMA, that the modified broadcasting signals 602 are from the wireless tape 102. For example, in some implementations, the wireless tape application 121 and/or the server 104 can apply a reconstructing algorithm based on the PMA to reconstruct the original MAC addresses and/or UUIDs of the received modified broadcasting signals 602. The method 700 ends at step 714.

Method of Achieving Ultra-Low Power Using Changing Ambient Light Levels to Trigger Power Saving States in a Microprocessor-Based Device For many wireless devices (e.g., IOT devices) conserving battery power can be paramount. To maintain an ultrathin profile, many devices use a primary source. When the batter is exhausted, the battery or the device have to be replaced. In many applications, it is often the device that has to be replaced, as changing the used batteries is not a practical option. As a result, many modern wireless devices need to conserve battery to achieve longer product life span. Nonetheless, many wireless devices broadcast their beacon on periodic basis, whether or not a listening device can capture their beacon. This scenario presents a challenge for applications where the broadcasting device has limited battery resources. For example, it is advantageous for an ultrathin profile wireless tape 102, used for tracking items, to broadcast its beacons when a smart device 103 is in the vicinity and capable of receiving the beacons and communicating with the wireless tape 102. It is also advantageous for the wireless tape 102 to limit or stop sending broadcasting beacons, when no smart device 103 is in the vicinity to receive the beacons. Additionally, it is desirable to increase the frequency at which the wireless tape 102 broadcasts its beacons if a smart device 103 is in the vicinity and able to receive and process those beacons. Conversely, it is advantageous to reduce the frequency of (or stop) sending the beacons if no smart device 103 is in the vicinity to receive the beacons.

Sensors can be used to modulate the broadcasting of beacons and/or their sending frequency in order to save battery resources. For example, vibration or motion sensors can be used in wireless devices (such as the wireless tape 102) to trigger and/or to modulate the sending frequency of broadcasting beacons emitted from the wireless device. If sensors detect motion and/or vibration, the wireless device can increase the frequency of sending broadcasting beacons. However, in some applications, the sensors consume more battery resources than they save. For example, in some applications, motion sensing with passive infrared (PIR) or similar motion sensors and motion sensing with an accelerometer to save battery resources can task the battery resources more than they save the battery resources. Yet in other applications, the cost of the additional sensors can be prohibitive in relation to the overall target cost of the product, thus making the use of these sensors impractical. For other wireless devices, the form factor and sizes of these sensors can be incompatible with their form factor or design.

In the case of wireless devices that operate by NFC, solar or other energy harvesting methods, the battery resources can be limited. Thus, it is advantageous to reduce or minimize broadcasting beacons, when no listening smart device 103 is in the vicinity.

In one implementation, fluctuations of light levels in the environment of a wireless device can be used to modulate the frequency of broadcasting beacons. In this scenario, fluctuations in light levels in the environment can indicate the presence of a listening smart device 103. For example, when a wireless device, such as the wireless tape 102 is used for asset tracking, the wireless tape 102 may be attached to an item, which is placed in a delivery van, a work truck, a supply room or other physical locations, where that item and the attached wireless tape 102 are stored. When a person carrying the smart device 103, who has an interest in the tracked item, enters the physical location where the item and the attached wireless tape 102 are located, the environment likely can experience fluctuations in light level. For example, an automatic motion sensor in the environment can turn the lights on, when the person enters the environment. Or when the person opens the door to a storage area (such as the cargo compartment of a van or truck), the storage area, where the tracked item and wireless tape 102 are located can be exposed to outside light and experience fluctuations in light levels.

Figure 8:
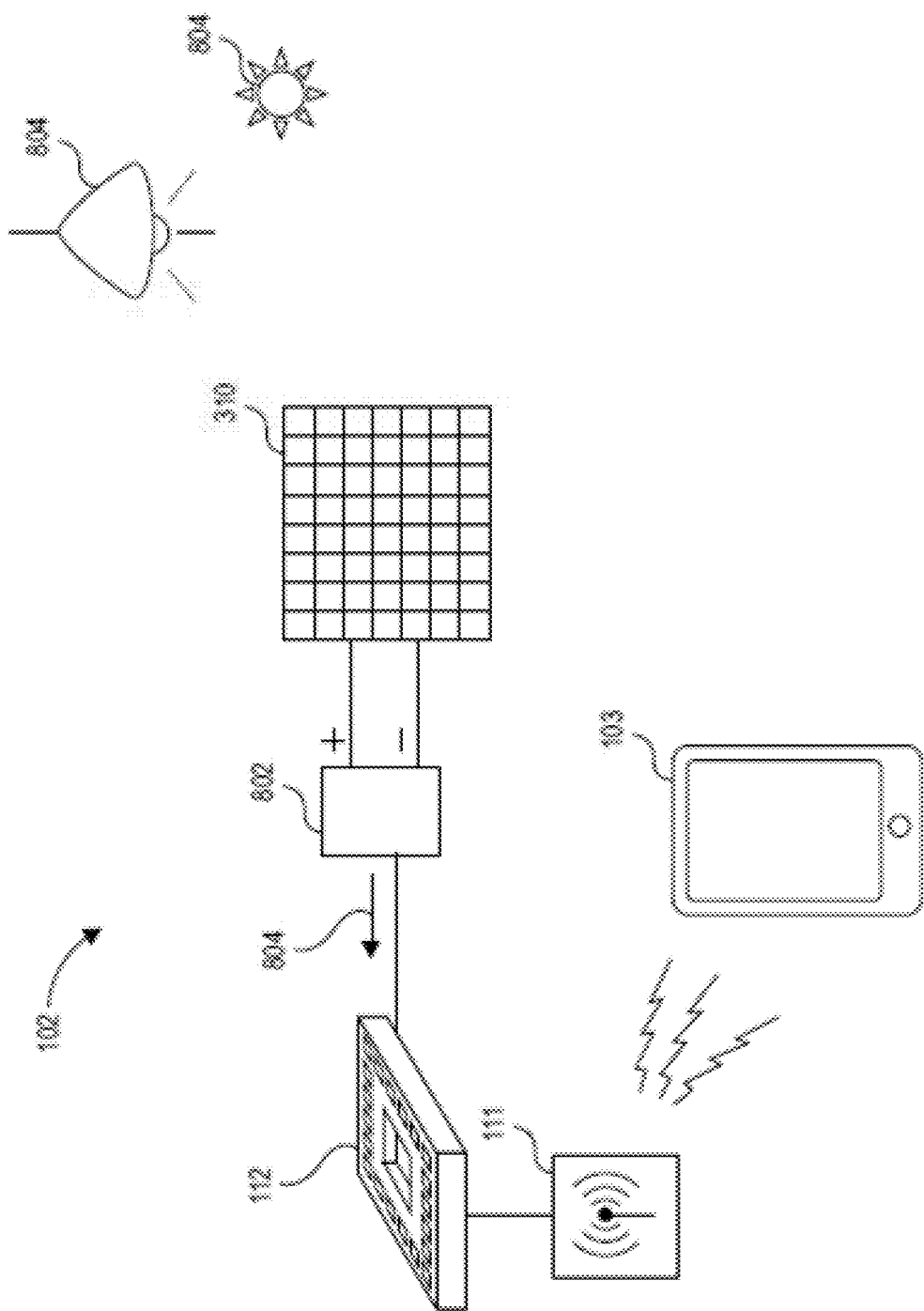
FIG. 8 illustrates an implementation of the wireless tape, where fluctuations in light levels can be used to modulate the frequency of broadcasting beacons.

FIG. 8 illustrates an implementation of the wireless tape 102, where fluctuations in light levels can be used to modulate the frequency of broadcasting beacons. The wireless tape 102 in this scenario includes a photovoltaic layer 310 (as described in relation to FIG. 3) and an energy harvesting circuit 802. Fluctuations in light levels can occur due to the photovoltaic layer 310's exposure to various light sources 804. The photovoltaic layer 310 and the energy harvesting circuit 802 convert light to an electrical signal 804 (e.g., a voltage or current), which can be received by the processor 112. The processor 112 can modulate the frequency of beacons sent from the wireless communication circuit 111, based on the value of the electrical signal 804. For example, the processor 112 can increase the frequency of broadcasting beacons, based on a rate of increase in the voltage received in the electrical signal 804. Accordingly, when a person carrying a smart device 103 enters the environment of the wireless tape 102 and exposes the photovoltaic layer 310 to fluctuations of light levels, the voltage generated by the energy harvesting circuit 802 can increase at a rapid rate, R1. The processor 112 can correspondingly increase the rate of broadcasting beacons from the wireless communication circuit 111 at the rate R1 or to an increased rate based on R1. In this manner, the increased broadcasting beacons have a better chance of detection by the smart device 103.

Conversely, if light fluctuations in the environment of the photovoltaic layer 310 is minimal, the voltage/current of the electrical signal 804 does not change or changes at a reduced rate, R2. The processor 112 can adjust the frequency of broadcasting beacons from the wireless communication circuit 111 to be at the reduced rate, R2 or another reduced rate based on R2. If R2 is zero, the frequency of broadcasting the beacons can be also zero or a reduced amount (e.g., every thirty seconds) in order to conserve the battery energy. In some implementations, the electrical signal 804 can be used to wake up the processor 112 and begin broadcasting beacons.

Figure 9:
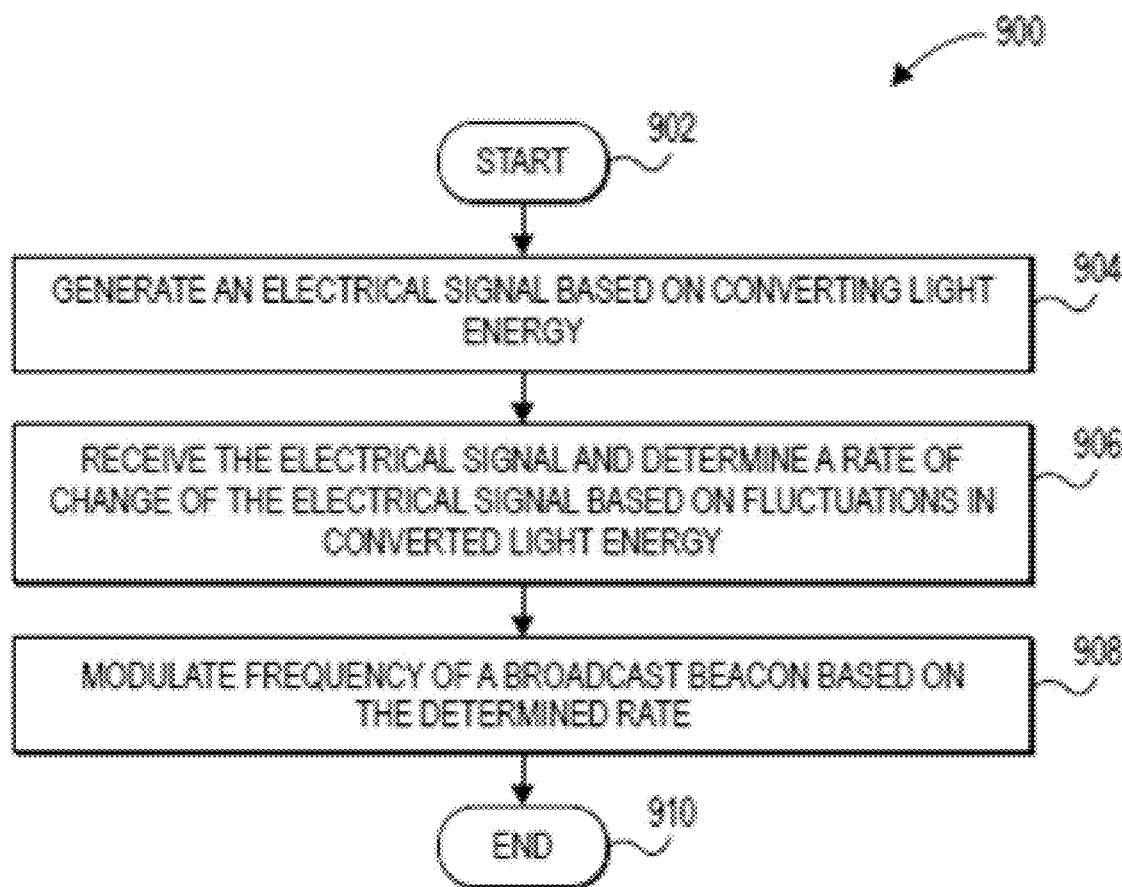
FIG. 9 illustrates a method of using fluctuations in light level to modulate the frequency of a broadcasting beacon.

FIG. 9 illustrates a method 900 of using fluctuations in light level to modulate the frequency of a broadcasting beacon. The method 900 starts at step 902. At step 904, the photovoltaic layer 310 and the energy harvesting circuit 802 generate an electrical signal by converting light energy from various light sources 804. At step 906, the processor 112 receives the electrical signal 804 and determines a rate of change of the electrical signal 804, based on fluctuations in converted light energy. At step 908, the processor 112 modulates the frequency of the broadcasting beacons sent from the wireless communication circuit 111, based on the determined rate. The method 900 ends at step 910.

Additional Methods of Activating the Wireless Tape 102

Figure 10:
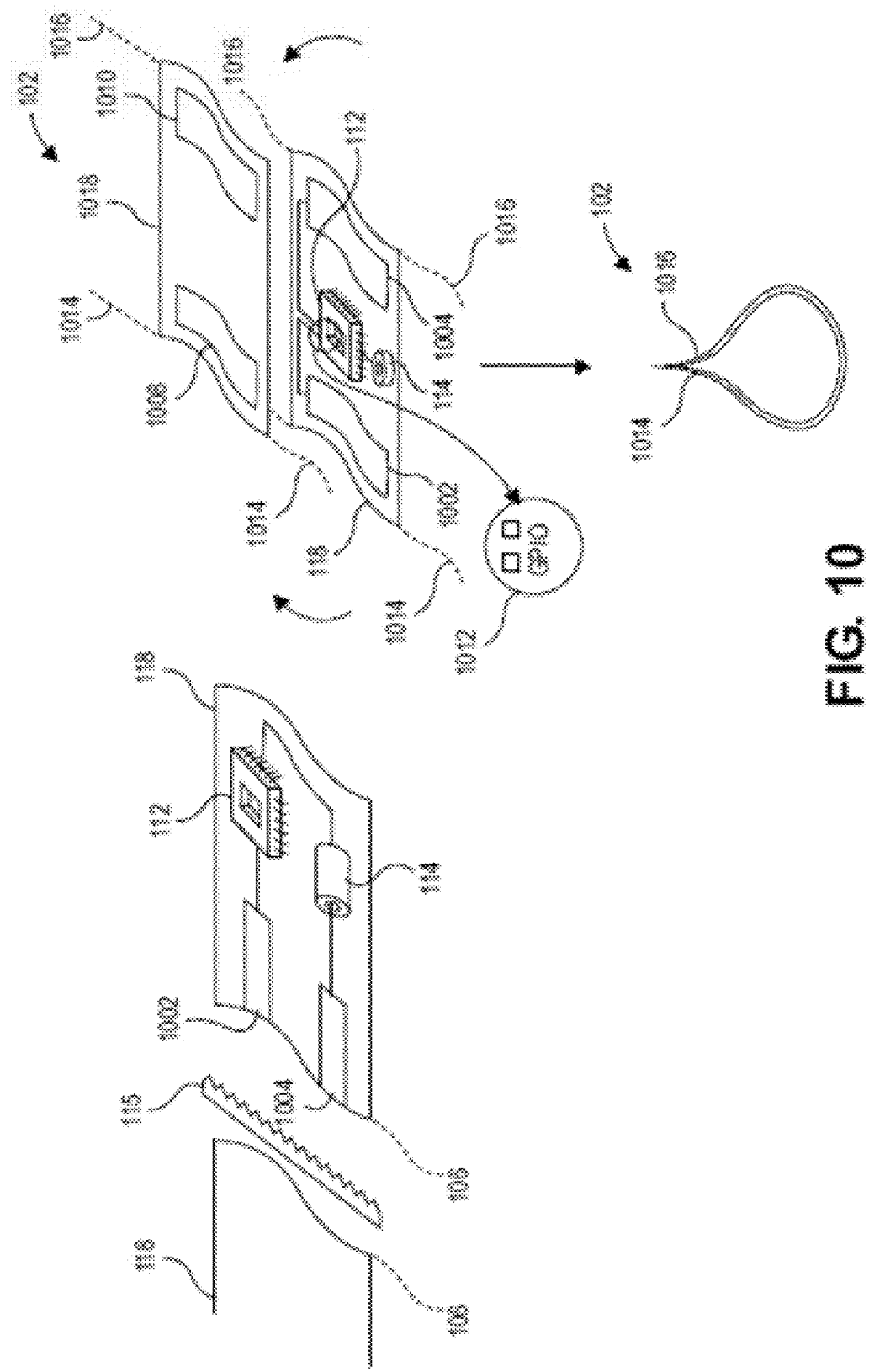
FIG. 10 illustrates diagrams of various implementations to maintain the wireless tape in a low-power state when in storage or before deployment by a user of the object tracking system.

It is advantageous to conserve the battery resources of the wireless tape 102 by maintaining the electronics 306 in a low-power of off-state, until the wireless tape 102 is to be used. FIG. 10 illustrates diagrams of various implementations to maintain the wireless tape 102 in a low-power state when in storage or before deployment by a user of the object tracking system 100. In one implementation, two conductive planes 1002 and 1004 can be patterned on the interconnect layer 118 or in one or more layers of the wireless tape 102 in a manner that the conductive planes 1002 and 1004 form a part of an edge 1006 of the wireless tape 102. The edge 1006 can be an edge between two discrete wireless tapes 102 (e.g., from a roll of wireless tapes 102). A metal cutting means 115 can shear the roll of wireless tapes 102 and separate them at edge 1006. The same process can be utilized to activate/wake-up the processor 112 and/or other electronics of the wireless tape 102. The interconnect layer 118 is patterned to electrically connect the conductive plane 1002 to a GPIO port of the processor 112 and the conductive plane 1004 to the battery 114. For ease of illustration, the battery 114 is shown as a single component on the interconnect layer 118. However, as described earlier in relation to FIG. 3, the battery 114 can be a layered structure on multiple layers of the wireless tape 102. The cutting means 115 can be made of a metal material, which can electrically connect the conductive planes 1002 and 1004 during the shearing of the edge 1006, thereby generating a signal at the GPIO port of the processor 112 from the battery 114. The signal at the GPIO port of the processor 112 can wake-up and activate the processor 112. The processor 112 can send beacons to nearby smart devices 103 for connection and communication.

In another implementation, the conductive planes 1002 and 1004 can be patterned on the same surface of the interconnect 118 and on the opposite edges 1014 and 1016 of the wireless tape 102, respectively. The conductive planes 1002 and 1004 can be electrically connected to conductive planes 1008, 1010, respectively. The conductive planes 1008 and 1010 are formed on an external surface 1018 of the wireless tape 102, from an electrically conductive and adhesive material, on the opposite edges 1014 and 1016 of the wireless tape 102, respectively. The conductive planes 1002 and 1004 and the conductive planes 1008 and 1010 are electrically coupled via interconnect patterns in the interconnect layer 118 to the terminals of a GPIO port 1012 of the processor 112. In this arrangement, the conductive planes 1002, 1004, 1008 and 1010 form an open switch between the terminals of the GPIO port 1012. When a user of the wireless tape 102 intends to activate the wireless tape 102, he can bring the opposite edges 1014 and 1016 of the wireless tape 102 together and adhere the conductive planes 1008 and 1010 together. Connecting the conductive planes 1008 and 1010 closes the switch and connects the terminals of the GPIO port 1012, generating a signal in the processor 112 and causing the processor 112 to wake up and begin transmitting beacons for connection and communication. In another implementation, the conductive planes 1008 and 1010 from the external surface 1018 of the wireless tape 102 can be routed to the terminals of the GPIO port 1012, directly or via interconnect patterns in the interconnect layer 118. In this scenario, the conductive planes 1002 and 1004 on the interconnect layer 118 can be excluded and not manufactured.

Some examples of reel-to-reel manufacturing processes and manufacturing considerations will now be described. In some implementations, the wireless tape 102 is fabricated to include a series of wireless tracking labels, in which each wireless tracking label can include a wireless communication circuit 111, a processor 112, a timer 113, a battery 114, and a memory module 117.

A fabricated reel of wireless tape 102 formed on a flexible substrate 116 includes many individual wireless tracking labels. This leads to several issues. First, a reel of wireless tape may be stored for some period of time before it is cut into different individual wireless tracking labels. Individual tracking labels may not necessarily be immediately used at the time of cutting. However, as discussed above, the processor(s) and communication circuit(s) may be activated as required. That is, an individual wireless tracking label may be awakened from a hibernation or sleep state close in time to when an individual tracking label is to used. That can include activating a wireless tracking label in response to cutting it from a reel. It can also include a wireless tracking label waking up in response to receiving energy from an external device. As discussed above, a coil on a wireless tracking label may receive energy from an NFC reader or other source that is used to generate a wakeup voltage.

In the context of a wireless tracking label, in some end-use applications, the wireless tracking label may only need to be active for less than a month to support, for example, tracking the shipment of a package in a supply chain.

Keeping individual wireless tracking labels in a hibernation mode until close to the time they are used extends the lifetime of the battery 114. This supports, for example, the option to omit using solar cells to harvest energy.

In a reel-to-reel manufacturing process, it's desirable to design the layers used to optimize several goals. First, while the underlying substrate is flexible, it's desirable to minimize the number of unnecessary layers and the number of critical alignments in the manufacturing process. It's also desirable that the overall manufacturing process minimizes the likelihood of defects (e.g., pinholes or other sealing defects) that would increase the permeability of the battery pouch 308 to water vapor, oxygen, or other deleterious gases that might potentially shorten battery lifetime. Moreover, depending on the electrolyte chemicals used, preventing deleterious evaporation of the electrolytes may also be a concern in designing the battery pouch.

The lifetime of the battery will depend at least in part on the quality of the battery pouch 308 as a barrier to water vapor, oxygen, or other deleterious gases. The battery pouch 308 also serves as a barrier to prevent the evaporation of electrolytes.

Depending on the end-use application, a wireless tracking label may, in some cases, only require the battery 114 and battery pouch 308 design to be sufficient for the battery 114 to last through some initial time period in a hibernation state prior to use and provide, after activation, sufficient power for typical wireless tracking applications. For example, in many shipping applications, the total shipping time may be less than a month when taking into account all the different legs of the shipment process.

The electrochemical components of the battery 114 may include electrolyte chemicals including at least one member from the group consisting of $ZnSO_4$, $ZnCl_2$, $MnSO_4$, $AlCl_4$. These types of electrolyte chemicals are safer and more environmentally friendly than some alternatives such as lithium cell batteries. An advantage of lithium-based cells have nominal voltages of 3.0 or 3.6 V and up to 4.2 V fully charged. In contrast, many other electrochemical cells have a nominal voltage that is much lower, e.g., around 1.5 V in many cases. However, many communication and processor chips are designed to work in voltage ranges above 3.0 V. In fact, due to the wide-spread use of lithium batteries, many communication and processor chips are designed to work off the typical voltage ranges of a lithium battery.

This means that to directly replace lithium cell type batteries (without using voltage multiplier chips or specialty low-voltage chips designed to work at low voltages) requires connecting several 1.5 V electrochemical cells in series.

It should be understood that the battery 114 includes cathode and anode current collectors, a separator, and electrolyte. The current collectors may, for example, be based on carbon layers or a carbon-coated aluminized interconnect layer.

As previously discussed, the battery pouch 308 containing electrochemical components of the battery 114 can be formed on the interconnect 118. The substrate 116 can be an ultrathin and flexible material such as a polyester or Polyethylene terephthalate (PET), although other materials may be used.

One aspect that should be understood is that the battery pouch 308 is designed to provide an impermeable barrier to deleterious water vapor and deleterious gases such as oxygen. The battery pouch 308 is also designed to prevent the electrochemical components of the battery from evaporating.

In some implementations, a battery pouch has a multi-layer film to protect the battery. For example, as illustrated in FIG. 11A, a battery pouch may be formed from a multilayer film, which may include a polypropylene (PP) composite layer, an aluminum layer (Al), a biaxial oriented nylon layer (ONY), a PET layer, and other optional layers.

But as illustrated in FIG. 11B, the battery pouch may be formed from other sequences of layers that provide the function of serving as a barrier to water vapor and deleterious gases, as well as preventing evaporation of the electrochemical components.

Referring to FIG. 11C, the battery pouch 308 is formed by using one or more interconnect layers 118A, 118B to form at least one side of the battery pouch 308. The bottom interconnect layer 118A is formed on flexible substrate 116. In FIG. 11C, a bottom interconnect layer 118A forms a bottom side of the battery pouch 308. A top interconnect layer 118B may also, in some implementations, be used to form a top side of the battery pouch 308. As an example, some types of interconnect layers, such as aluminum, are impermeable to deleterious gases. The overall battery pouch 308 includes barrier layers to form a barrier for the battery 114, which in this example includes two electrochemical cells 1105 with a series electrical connection 1110. As indicated by the dashed line, a series connection 1110 may be formed between at least two electrochemical cells 1105. This is useful in which individual electrochemical cells produce a voltage of around 1.5 V, such as electrochemical cells having electrolytes such as $ZnSO_4$, $ZnCl_2$, $MnSO_4$, or $AlCl_4$.

Figure 11D:
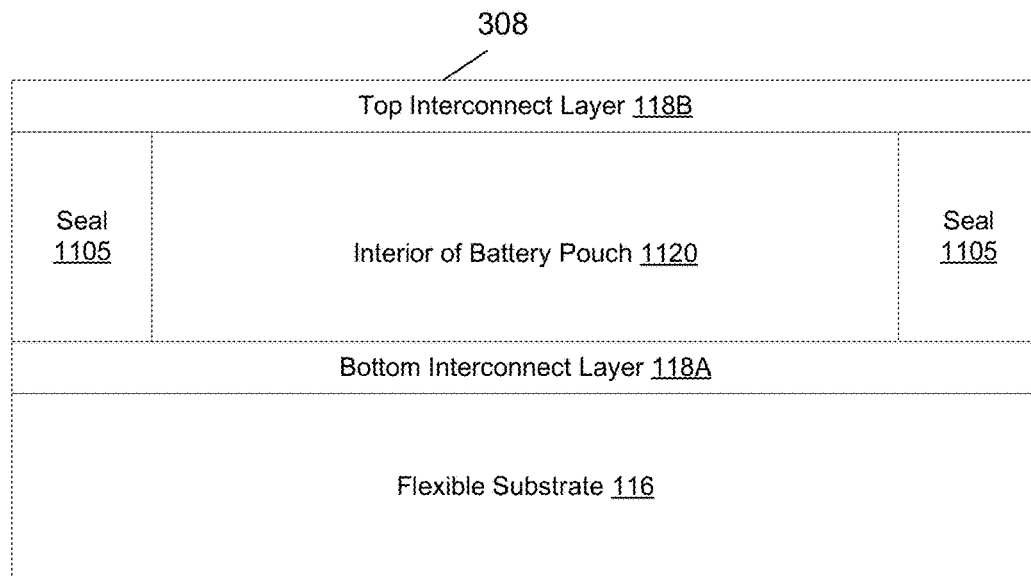
FIG. 11D is a side view illustrating how an interconnect layer forms a portion of a battery pouch in accordance with an implementation.

Referring to FIG. 11D, one or more interconnect layers, such as a bottom interconnect layer 118A and a top interconnect layer 118B, may be used to form at least parts of the top and bottom sides of the battery pouch 308 having an interior region 1120 to house electrochemical components (not shown in FIG. 11D). Additional seals 1105 may be formed to complete the battery pouch 308.

Figure 11E:
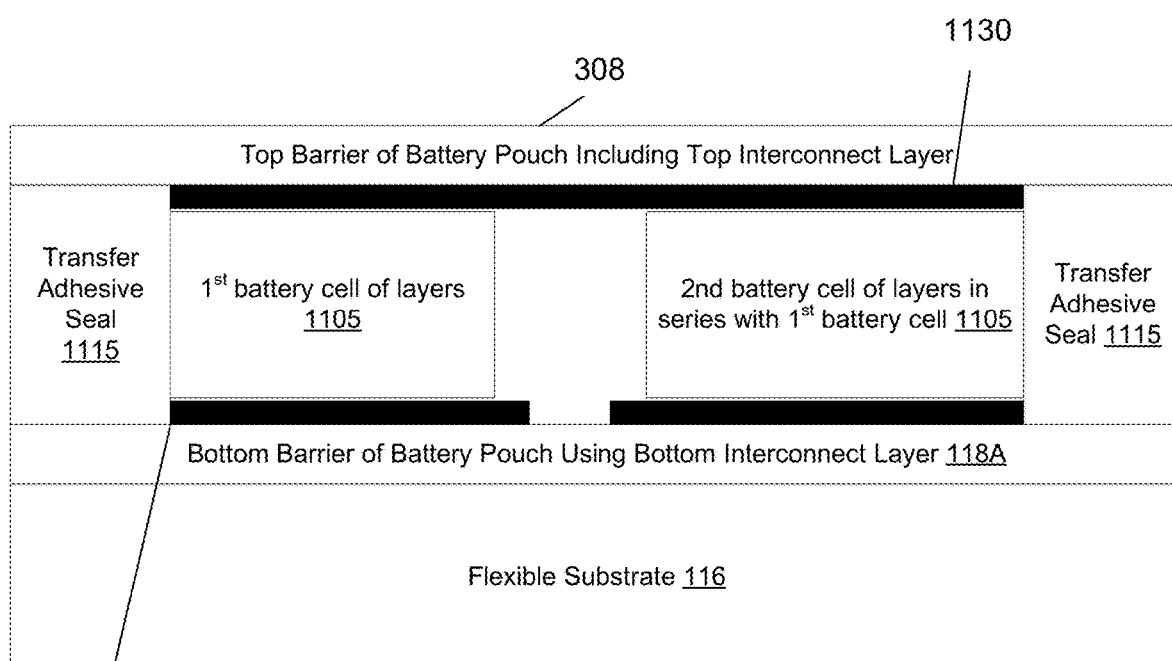
FIG. 11E is a side view illustrating another example of how an interconnect layer forms a portion of a battery pouch in accordance with an implementation.

Referring to FIG. 11E, in some implementations the seal regions are formed from a transfer adhesive 1115. The transfer adhesive 1115 used to form the seal regions may be selected to be electrically insulating. Many variations on the interconnect layer design and current collector layers 1130 are possible to form a series electrical connection between at least two electrochemical cells.

Figure 11F:
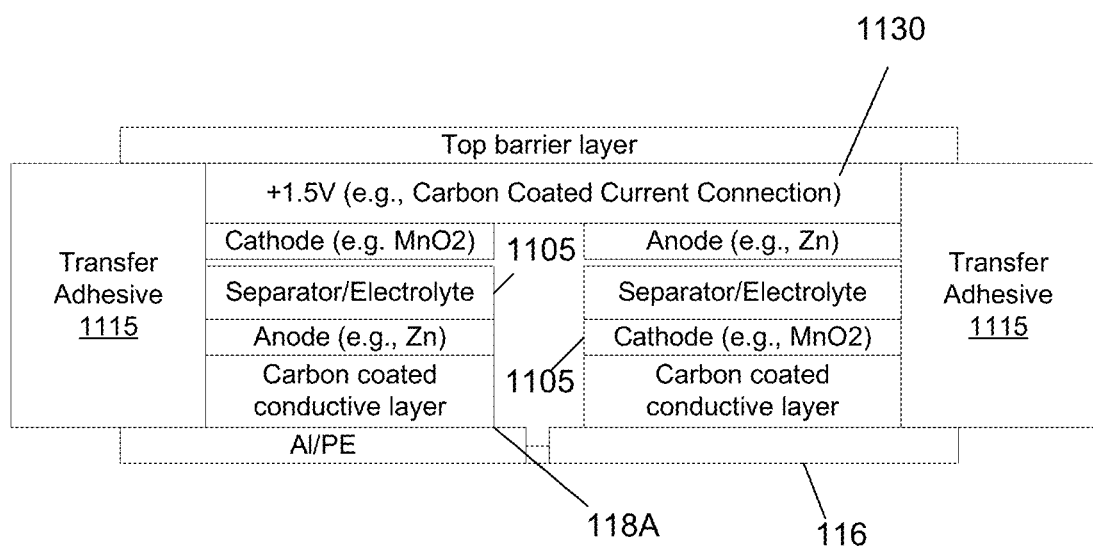
FIG. 11F is a side view illustrating an example of a battery and battery pouch formed in the Zn and MnO2 system in accordance with an implementation.

Referring to FIG. 11F, as an illustrative but non-limiting example, the bottom interconnect layer 118A may be formed of aluminum layer formed on a flexible PE substrate. The anodes may be formed from Zn, and the cathodes from MnO$_2$. Each electrochemical cell may include a separator, such as cellulose, with an electrolyte. A variety of different manufacturing processes may be used to support current collection and an electrical series connection between the electrochemical cells. This may include carbon layers as one option.

Figure 12A:
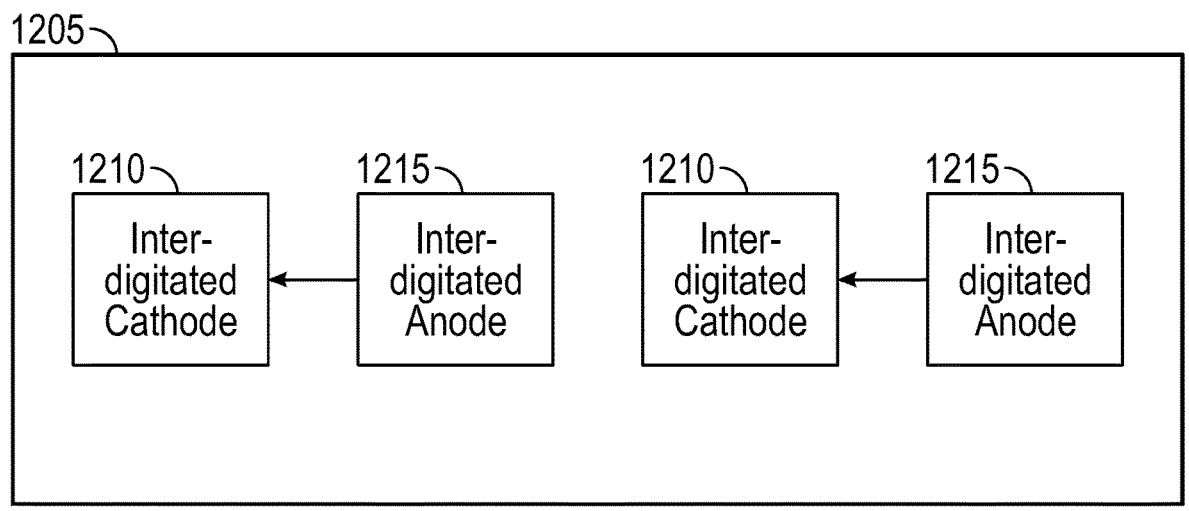
FIG. 12A is a top view illustrating a coplanar battery with interdigitated cathodes and anodes in accordance with an implementation.
Figure 12B:
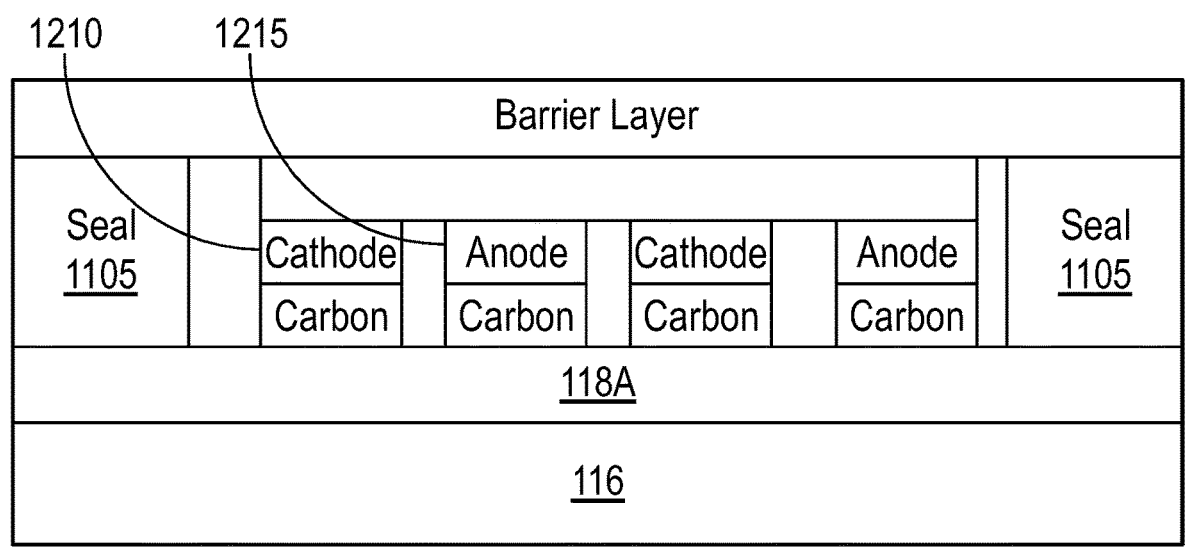
FIG. 12B is a side view of a coplanar battery and battery pouch in accordance with an implementation.

In some implementations, the battery structure 1205 is co-planar in that it is formed using interdigitated cathodes 1210 and anodes 1215 with a lateral flow of ions. FIG. 12A is a top view of co-planar design (not to scale). FIG. 12B is a side view, illustrating alternating cathode regions 1210 and anode regions 1215. In a co-planar design, there is a lateral ion flow between laterally adjacent interdigitated anode and cathode regions. That might be contrasted with a planar design in which the ion flow is vertical with respect to cathode and anode layers in the same vertical stack.

While a bottom and/or top interconnect layers 118A, 118B can be used to form part of the battery pouch 308, a variety of other materials may also be used to form part of the battery pouch. A variety of materials may be used to form a portion of the battery pouch, including thermochromatic paper, resin coated face stock, etc. A wide variety of materials are good barriers by themselves or can be made impermeable by, for example, adding resins, waxes, or various sol gel processes and coatings. In one implementation, transfer adhesive is used to form the edge seals.

By appropriate selection of layers, an individual interconnect layer forms at least a portion of one side of the battery pouch. This provides a variety of manufacturing benefits. It reduces the total number of layers required, simplifies manufacturing, and improves the reliability of the battery pouch in a reel-to-reel manufacturing process. In a reel-to-reel manufacturing process the electrical connections, layers, and seal regions are stored (at least for a while) on a reel with a radius of curvature such that upper layers of a given section of wireless tape 102 have slightly greater elongation of upper layers due to the radius of curvature. Simplifying the overall design of the battery pouch and reducing the number of layers improves manufacturability and reduces the likelihood sealing defects in the barrier and/or failures of electrical connections.

Figure 13:
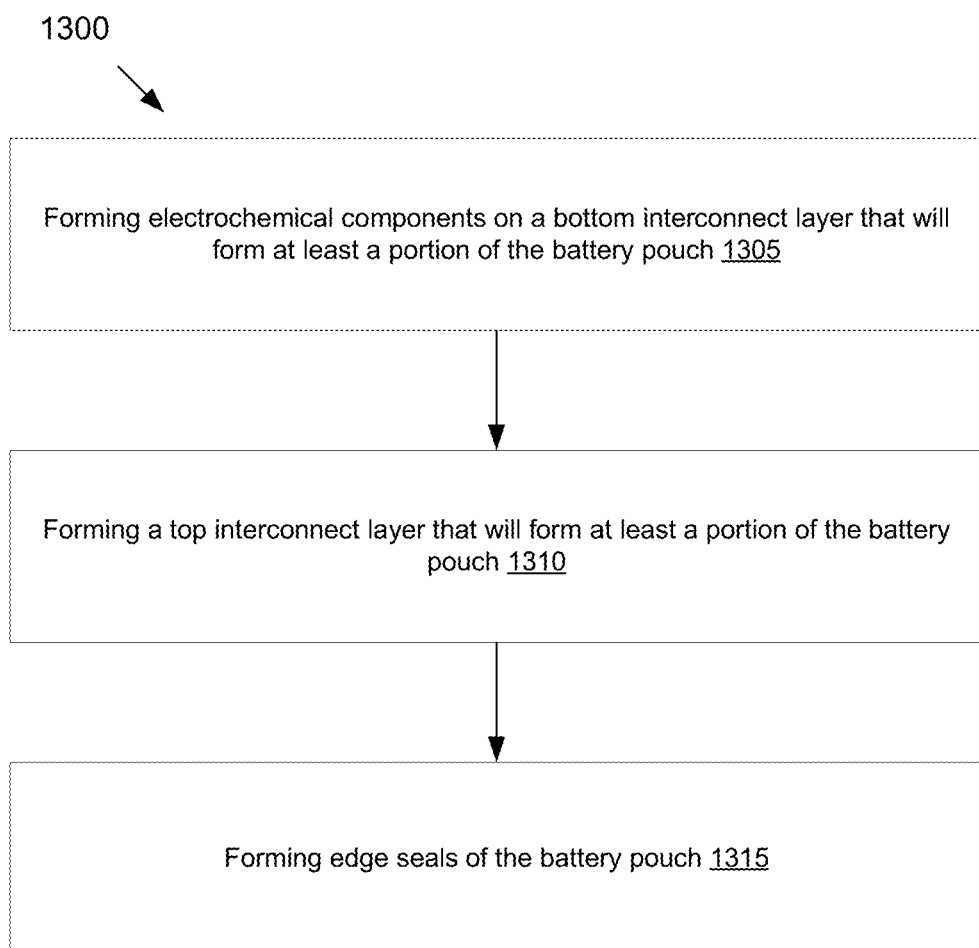
FIG. 13 is a flow chart of a method of forming a battery pouch in accordance with an implementation.

As illustrated in the flow chart 1300 of FIG. 13, a high-level method or process may include forming electrochemical components of the battery on a bottom interconnect layer that acts as at least a portion of bottom barrier layer in block 1305. A top interconnect layer that acts as at least a portion of the top barrier layer may be formed on the battery pouch in block 1310. In block 1315, additional seals and/or seal layers may be formed to complete the battery pouch.

Figure 14:
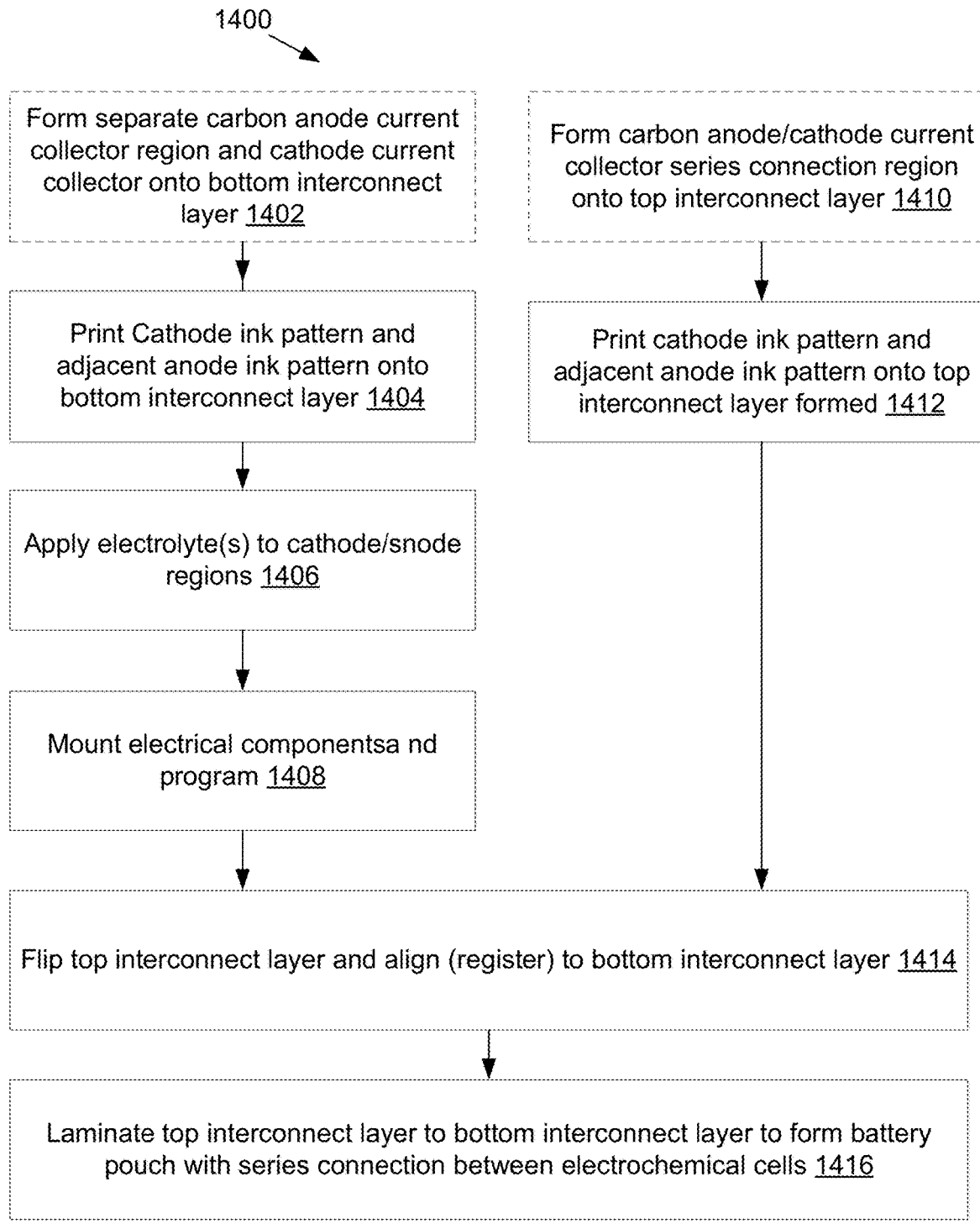
FIG. 14 is a flow chart of a planar fabrication process in accordance with an implementation.

FIG. 14 is a flowchart 1400 of an example of a planar process with additional details illustrated in FIGS. 14A, 14B, 14C, 14D, and 14E. As illustrated in FIG. 14 there is initially a separate (but parallel) set of reel-to-reel processes for forming what will be the top and bottom interconnect layers of a wireless tape 102. In the fabrication process, the top interconnect layer may be flipped over and aligned to the bottom interconnect layer, with top and bottom interconnect layers laminated to each other. The overall process can be implemented in a reel-to-reel process.

Figure 14A:
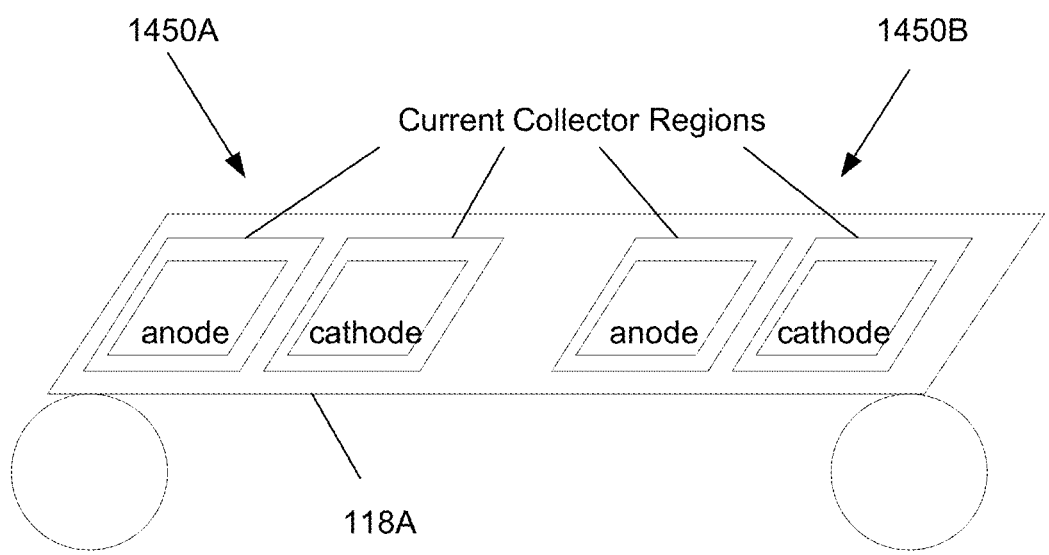
FIGS. 14A, 14B, 14C, 14D, and 14E illustrate aspects of the flowchart of FIG. 14.

FIG. 14A illustrates the result of initial steps 1402 and 1404 in a planar process. There is a printing of a cathode layer with (MnO$_2$—C-PVDF) ink and an anode layer on (Zn—C-PVDF) ink onto a first interconnect layer, corresponding in the figure to a bottom interconnect layer. The bottom interconnect layer serves as an impervious battery pouch material. As examples, the first interconnect layer may include a liner or the underside of face stock material or thermal chromatic paper.

FIG. 14A shows an anode and cathode pair of what will become a first wireless tracking label device 1450A and an anode and cathode pair of second wireless tracking label device 1450B along the tape. Thus, in this example, as the reels (the circles) are rotated, a certain number of individual wireless tracking labels are fabricated by printing in windowed/masked areas, the appropriate inks to fabricate anode and cathode regions. The current collectors as part of the anode and cathode regions or structures may be served by the conductive nature of the interconnect layer itself or enhanced by additional coatings such as carbon or carbon nanotubes.

Figure 14B:
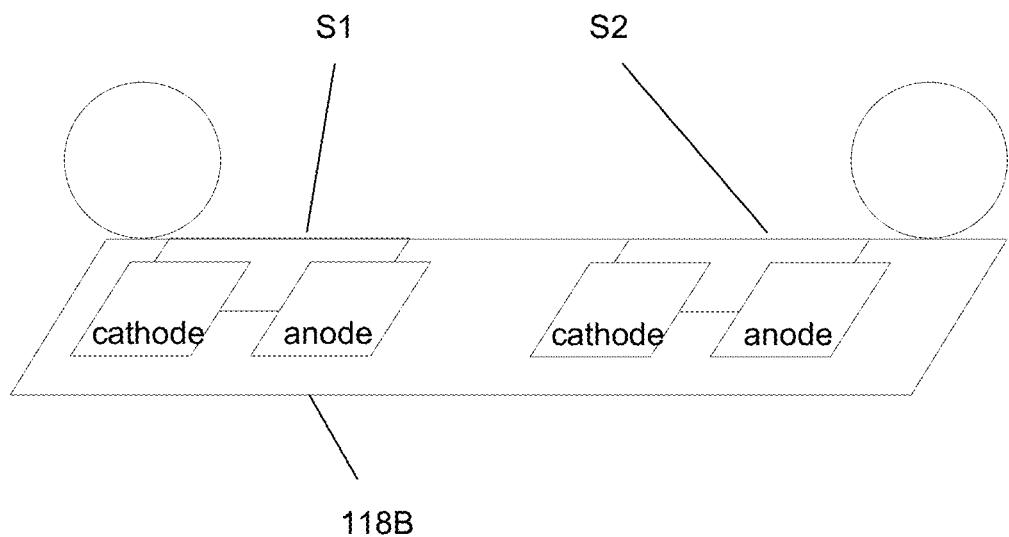

FIG. 14B illustrates printing of a cathode layer with (MnO$_2$—C-PVDF) ink and an anode layer on (Zn—C-PVDF) ink onto a second interconnect layer, which also will serve as an impervious battery pouch material. In one implementation, the anode and cathode inks, Zn—C and MnO2, respectively, are coated on top of carbon. The carbon is coated on top of the aluminum-PET or just the PET in the interconnect layer. However, carbon is not always required on top of aluminum PET. This corresponds generally to the result from steps 1410 and 1412. The second interconnect layer 118B may be a liner or the underside of face stock material or thermal chromatic paper. The second interconnect layer 118B may, as illustrated in the figure, be a top interconnect layer. The top interconnect layer in this example also has two label devices along the wireless tape. Conductive sections S1 and S2 (e.g., carbon, copper, carbon-coating copper, etc.) are formed to create what will become a series connection between two electrochemical cells in the final fabricated devices.

Figure 14C:
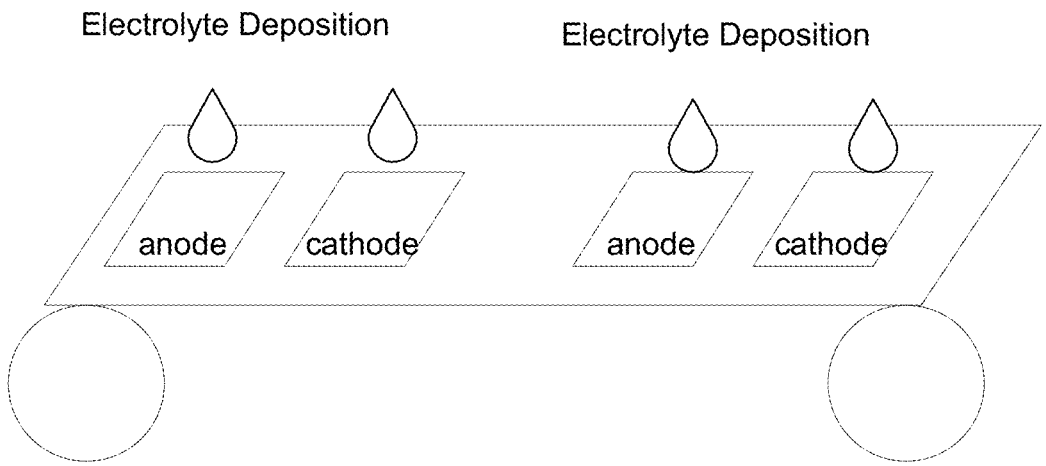

FIG. 14C illustrates a processing step to apply electrolyte in windowed regions on the anode and cathode regions on what will be the bottom interconnect layer. This corresponds generally to step 1406.

Figure 14D:
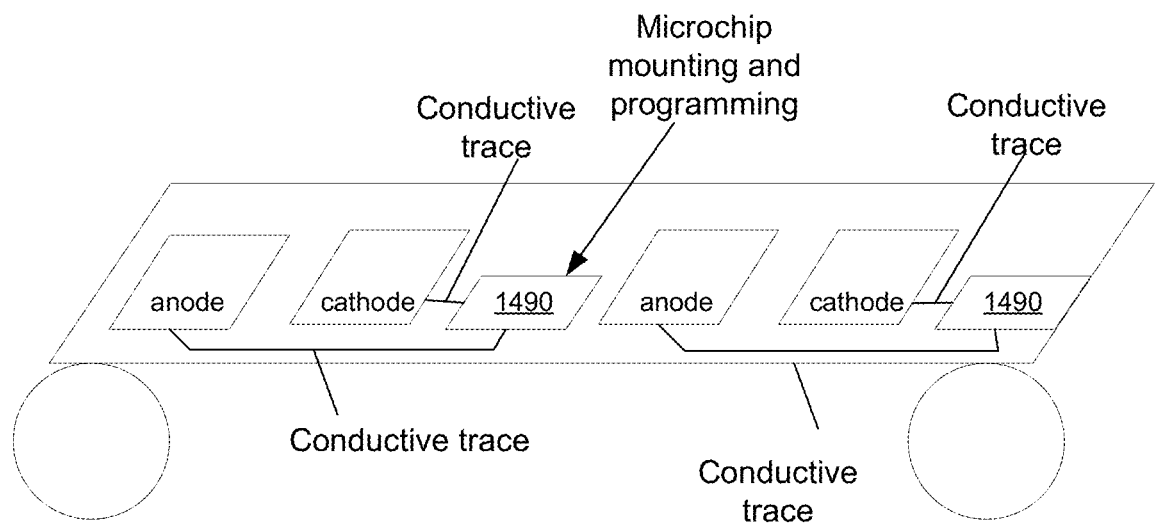

FIG. 14D illustrates mounting of electrical components 1490, such as an RF wireless processor and an RF wireless communication chip (e.g., a Bluetooth processor and a Bluetooth wireless communication chip). Conductive traces, directly connected to the current collectors, are formed to power the electrical components 1490. Programming of firmware may also be performed. Pogo pin landing pads (not shown) may be provided for the programming. FIG. 14D corresponds generally to step 1408.

Figure 14E:
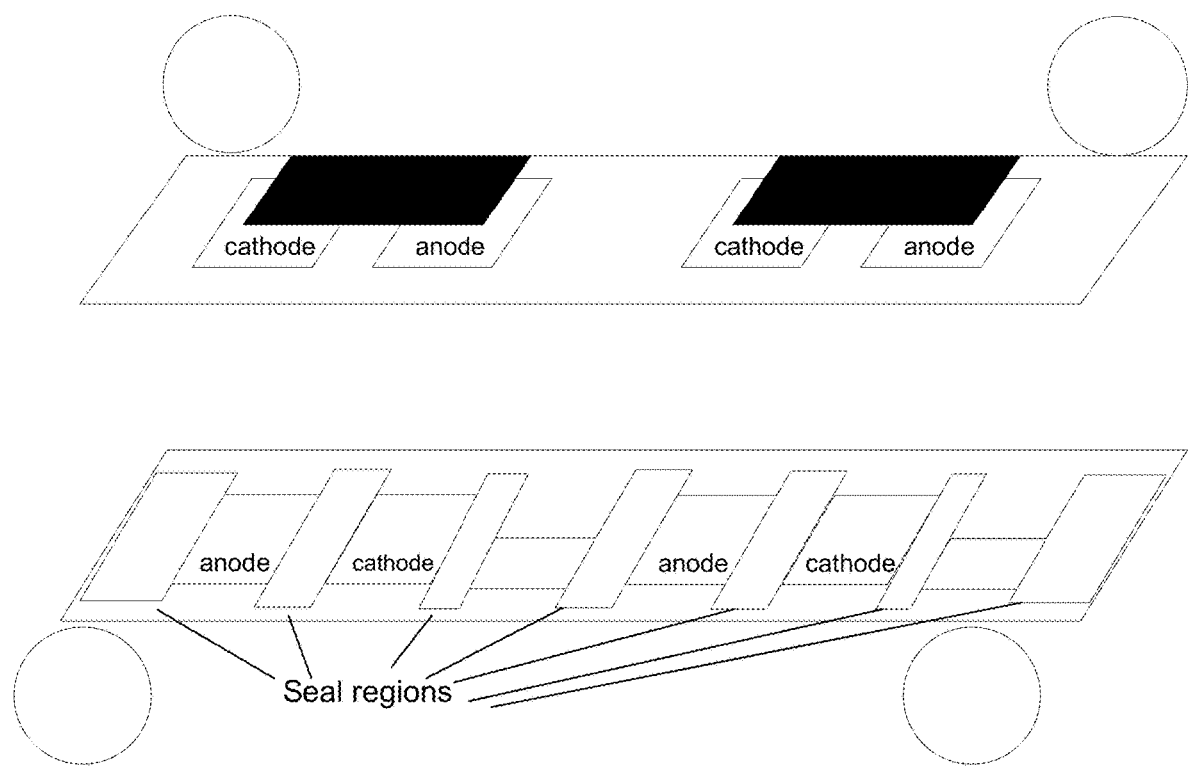

FIG. 14E illustrates how the top interconnect layer is flipped over and laminated to the bottom interconnect layer. This corresponds generally to steps 1414 and 1416. For example, in a reel-to-reel process a mechanical fixture may be used to slowly twist and rotate the top interconnect layer to flip it over. A registration technique (e.g., using optical fiducial marks or other alignment techniques) may be used to align the flipped top interconnect layer. Other mechanical components may by used to form the lamination, including adhesives, transfer adhesives, and/or thermal sealing techniques. This is what may be called a planar design in which an electrochemical cell is a vertical stack of layers with a vertical flow of ions as indicated by the arrows.

Referring back to FIG. 14, in the process of FIGS. 14A to 14E, the initial process for forming the bottom interconnect layer may include forming anode and cathode current collectors in step 1402. In step 1404, cathode and anode ink patterns are formed. In step 1406, electrolytes are applied. In step 1408, electrical components are mounted and programed. For the top interconnect layer, in step 1410 anode and cathode current collector regions are formed. In step 1412, cathode and anode ink patterns are printed. In step 1414 the top interconnect layer is flipped over and aligned to the bottom interconnect layer. In step 1416 the top layer is laminated to the bottom interconnect layer.

Figure 15:
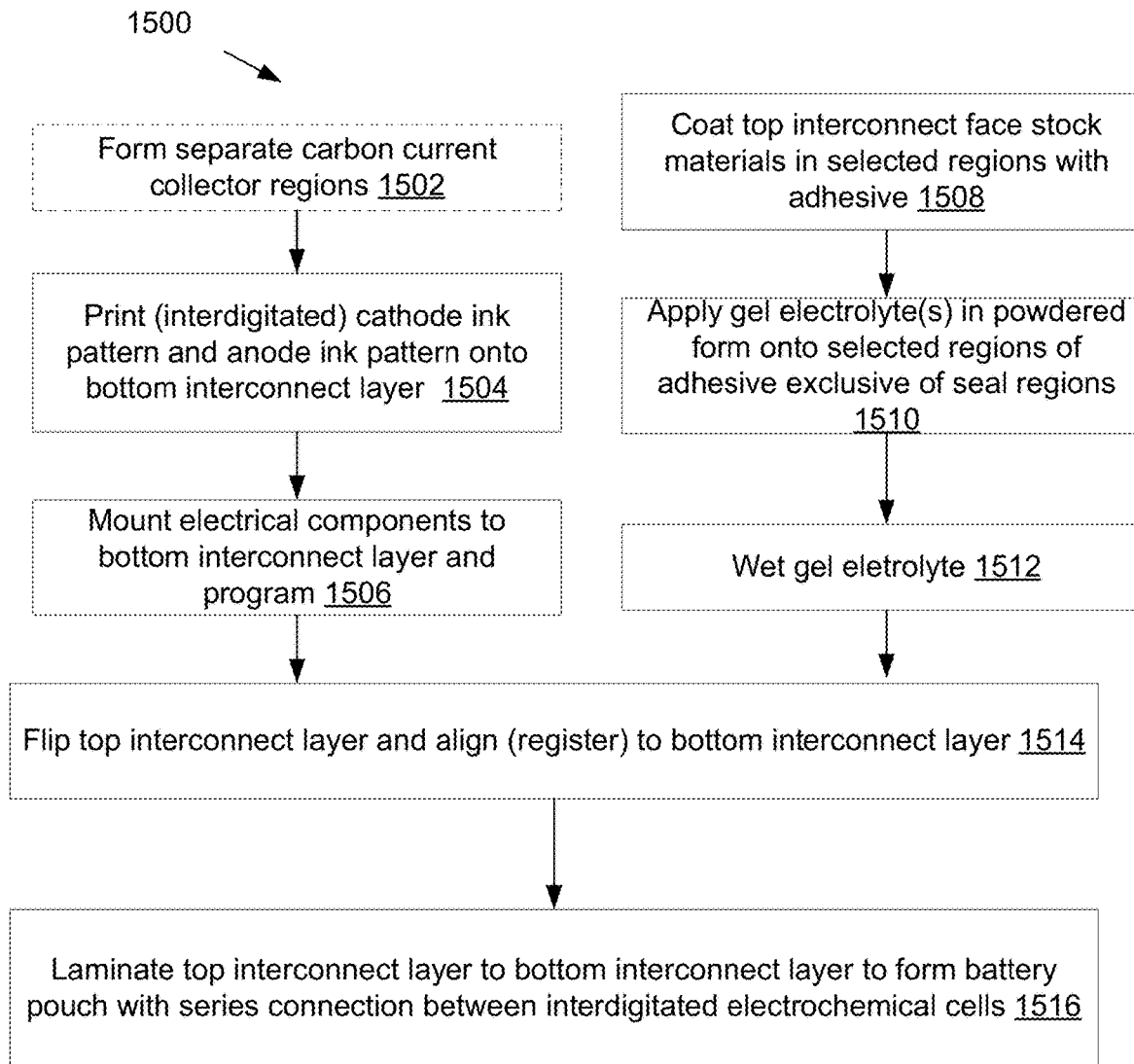
FIG. 15 is a flow chart of a coplanar process in accordance with an implementation.

An example of a coplanar fabrication process will now be described that also includes flipping a top interconnect layer and laminating it to a bottom interconnect layer. A coplanar fabrication has an interdigitated arrangement of anode and cathode regions with a horizontal flow of ions in each electrochemical cell (as previously discussed in regard to FIGS. 12A and 12B). An electrical trace is formed to form a series connection between electrochemical cells. FIG. 15 is a flowchart 1500 of a method of forming a wireless tape 102. FIGS. 15A, 15B, 15C, 15D, and 15E illustrate aspects of the method.

Figure 15A:
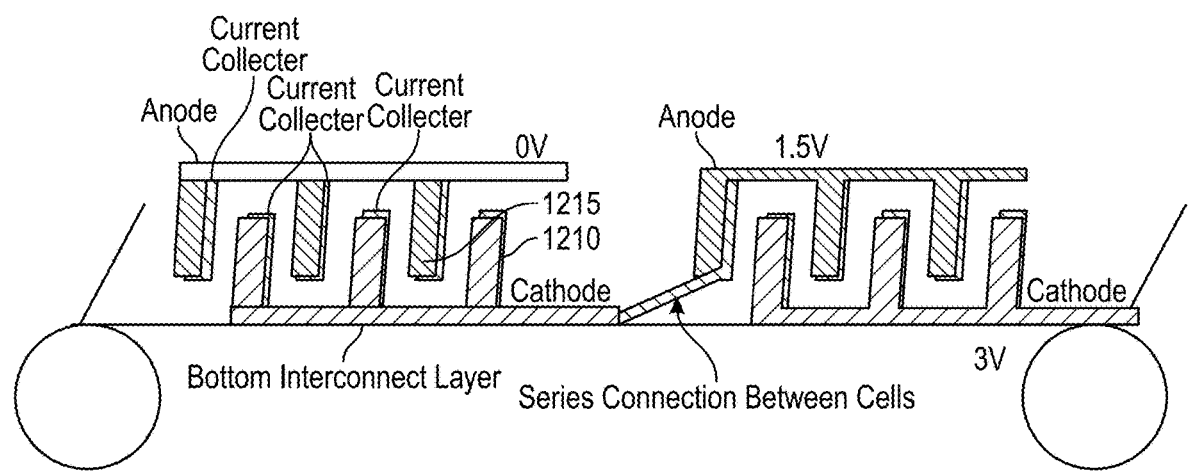
FIGS. 15A, 15B, 15C, 15D, and 15E illustrate aspects of the flowchart of FIG. 15.

FIG. 15A illustrates the result of steps 1502 and 1504 in regard to printing a cathode (e.g., $MnO_2$-PVDF) ink and anode (e.g., Zn—C-PVDF) ink onto a bottom interconnect layer 118A. The bottom interconnect layer will serve to form a portion of an impermeable battery pouch. As examples, the bottom interconnect layer may be formed from thermalchromatic paper, or a liner or underside of a face stock material. It will be understood that a current collector layer (e.g., carbon) may be included. Each individual electrochemical cell has interdigitated anode 1215 and cathode 1210 regions with a lateral ion flow between interdigitated fingers. Two interdigitated electrochemical cells are illustrated, which may be connected in series, e.g., with an aluminum or copper electrical trace or other connection, such as inks to form these connections including carbon, silver, or carbon nanotubes. Thus, if each interdigitated coplanar cell produces 1.5V, two in series produces about 3V. The anode and cathode layers include a negative and positive current collector, respectively, which may be fabricated with carbon, copper, aluminum, carbon coated copper, carbon coated aluminum, carbon nanotubes, etc.

Figure 15B:
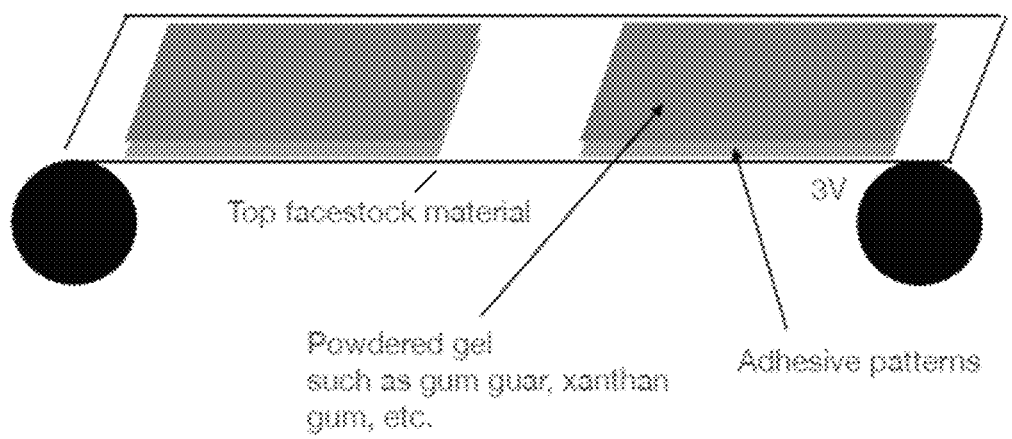

FIG. 15B illustrates a top interconnect layer having transfer adhesive regions onto which a powdered gel is applied (e.g., brush rolled). FIG. 15B corresponds generally to the result of steps 1508 and 1510. Fiducial marks can be detected along a moving web and a relative offset calculated for determining where to apply the transfer adhesive. A transfer adhesive is patterned onto 1) edge seal regions ("first regions") and 2) portions of the top interconnect to which electrolyte regions will be formed ("second regions"). The transfer adhesive forms a sticky side of a face stock material. The electrolyte may be formed on the second regions in two different ways. In one implementation, gum guar, xanthan gum, or a similar powdered material that forms a gel when wetted is initially deposited in a dry powdered form. For example, it may be deposited, in a powdered form in which it is brush rolled onto the adhesive patterns in the second regions. In one implementation, these second regions are later wetted by applying water vapor that includes an electrolyte. In another implementation, the electrolyte chemical, in a dry powdered form, is included in powdered gum guar, xanthan gum, etc., that is brush rolled onto the adhesive patterns. Water vapor is then applied to wet these regions, forming a gel electrolyte. In one implementation, top and bottom interconnect layers are processed to permit the top and bottom layers to be attached to each other to form the battery and battery pouch with transfer adhesive edges to form the edge seals.

Figure 15C:
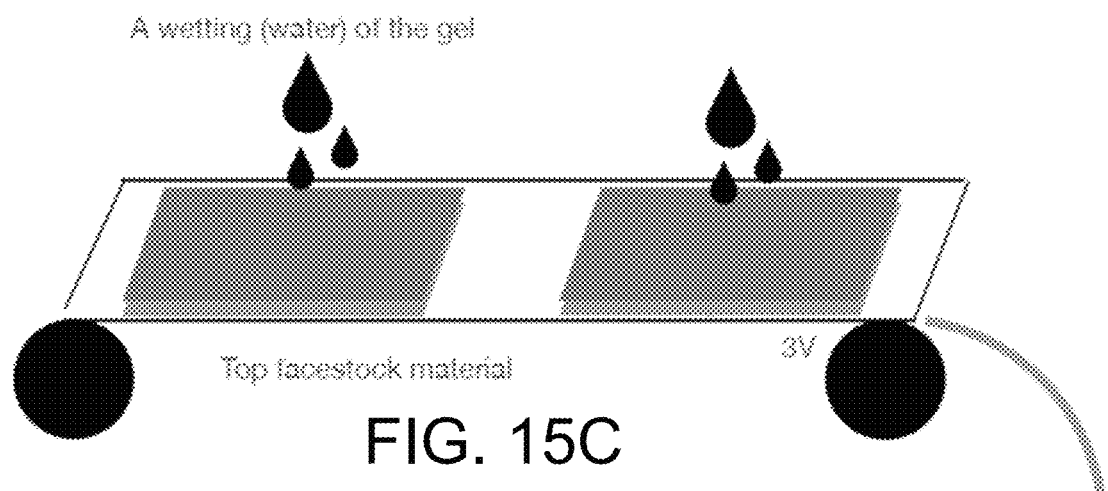

FIG. 15C illustrates wetting the gel (e.g., with water vapor) to form a semi-aqueous gel for the top layer). This corresponds to step 1512. As previously discussed, depending on implementation details, the water vapor may include the electrolyte. Alternatively, the powdered gel material may include the electrolyte material in dry form (e.g., a chemical salt) which becomes chemically active in the semi-aqueous gel.

Figure 15D:
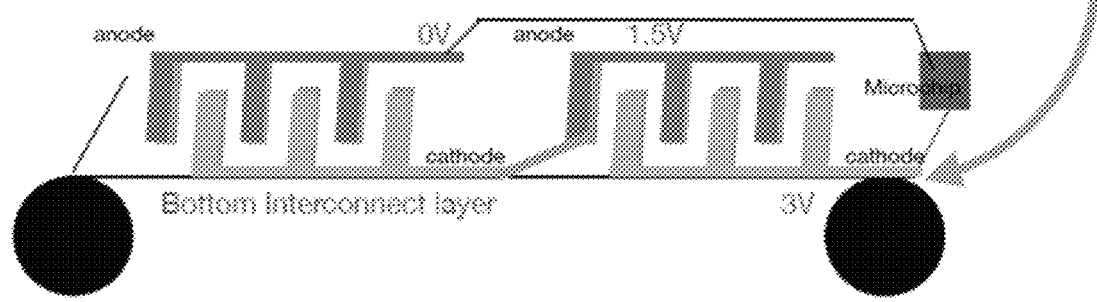

FIG. 15D illustrates how electrical components, such as a Bluetooth processor and communication chips, are mounted to the bottom interconnect layer. Programming of microchip firmware may also be performed. This corresponds to the result of step 1506.

Figure 15E:
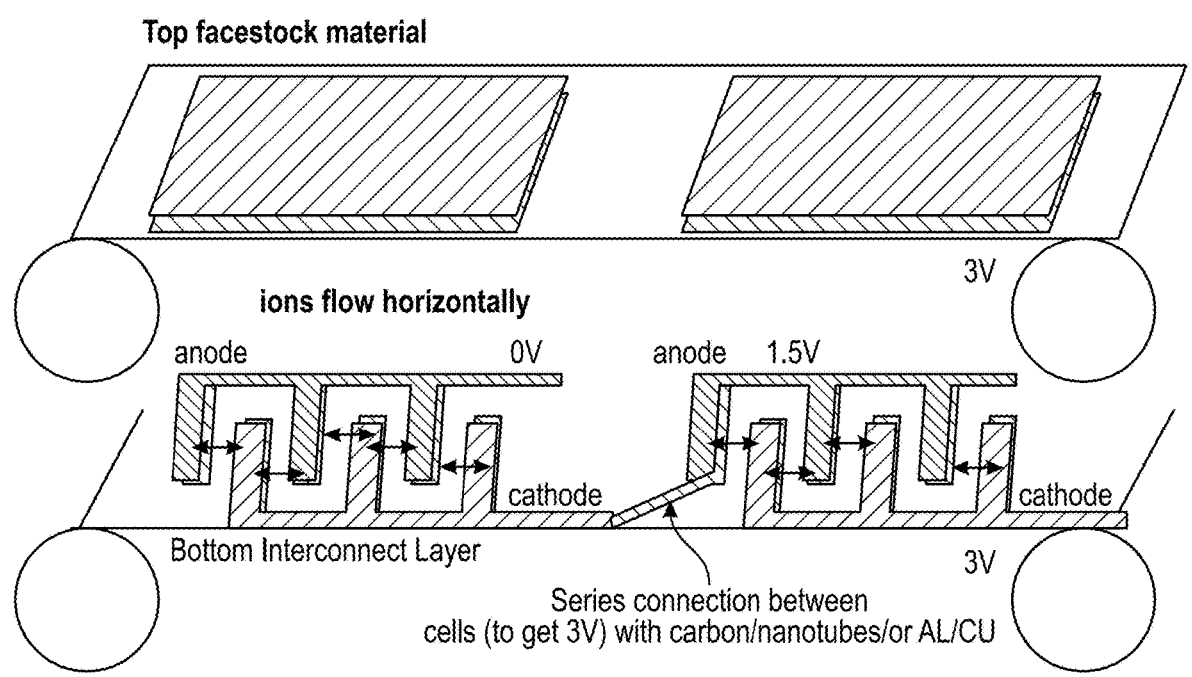

FIG. 15E illustrates that the top interconnect layer with the gel electrolyte that is to be laminated and sealed to the bottom interconnect layer with the transfer adhesive forming a seal of the battery pouch along the edges to form the battery pouch. This may include, for example, flipping the top layer over and aligning/registering it to the bottom layer. This corresponds to step 1516.

Referring back to FIG. 15, the process may include forming top and bottom barrier layers (e.g., on any suitable layer for forming an impermeable barrier) in which the interconnect layer(s) form portions of the battery pouch. The processing of the bottom layer may include forming current collector regions 1502, followed by printing 1504 interdigitated cathode and anode ink patterns. For the case of two electrochemical cells to be used in series, a series connection may be provided with an aluminum, copper as part of the interconnect layer itself, or from ink-based coatings which may include carbon, carbon nanotubes, or silver. Electrical components are mounted on the bottom layer in step 1506, along with any required programming (e.g., of firmware). For the top layer, adhesive is coated in selected regions in step 1508. In step 1510, a powdered gel is deposited on selected areas of the adhesive. In step 1512, the deposited powdered gel is wetted by, for example, exposing it to a source of water vapor (e.g., a fine mist or, for some materials, steam). Water applied to the powdered gel may include the electrolyte. Alternatively the electrolytic chemicals (in a powdered dry form) may be added to the powdered gel material. In step 1514, the top layer is flipped, aligned, and registered with the bottom layer. In step 1516 the top and bottom layers are laminated together.

One advantage of the process of FIG. 15 is that the adhesive used to form seals may be also used to form electrolyte regions.

Figure 16:
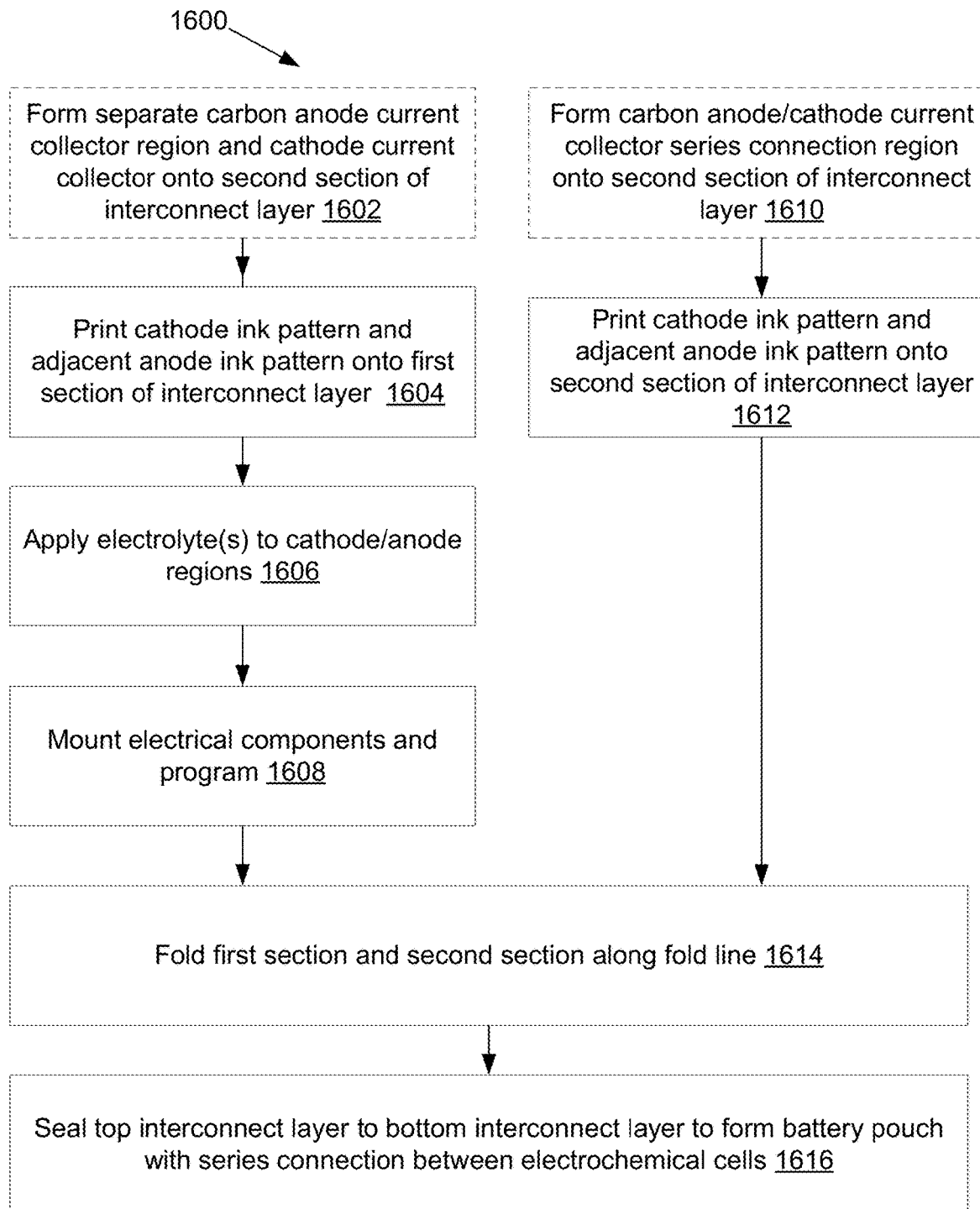
FIG. 16 is a flowchart of a planar fabrication process that includes folding in accordance with an implementation.
Figure 16A:
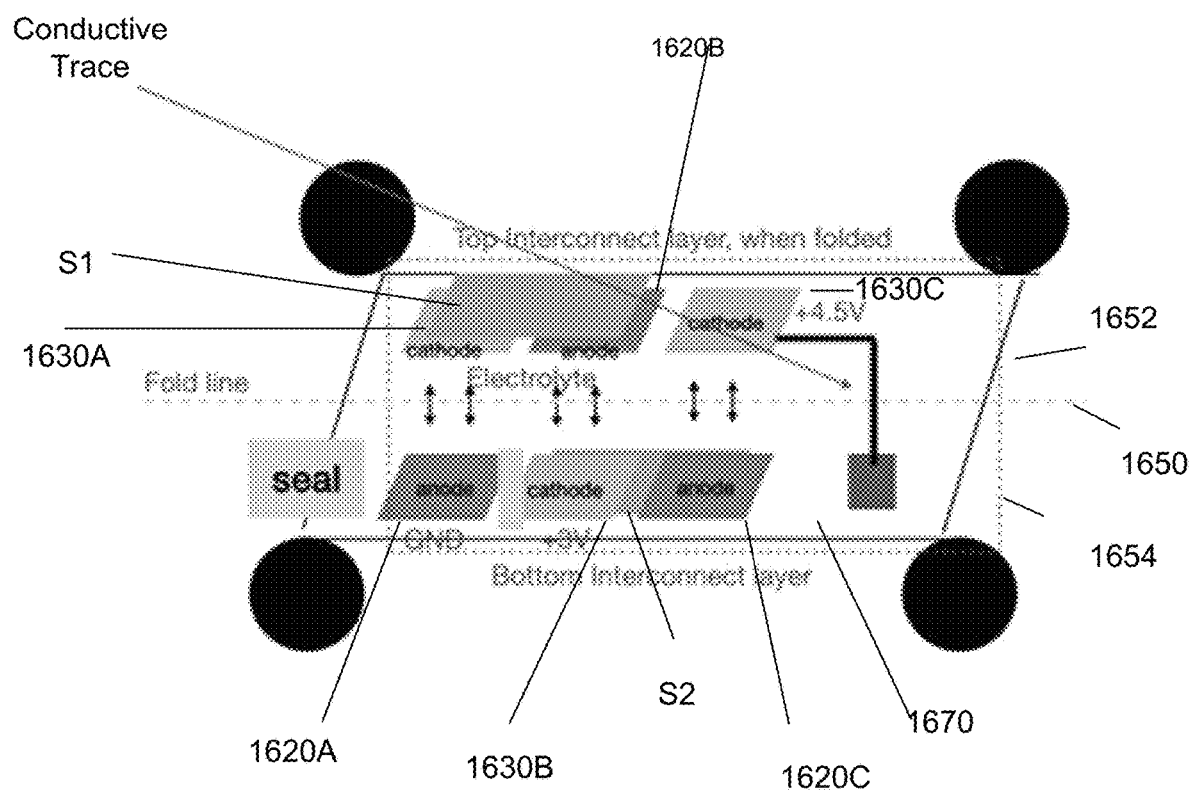
FIG. 16A illustrates aspects of the process of FIG. 16.

Referring to the flow chart of FIG. 16, and FIG. 16A in some implementations, a planar fabrication process 1600 uses a folding process to form a wireless tape 102. For example, a component may be used to force it to fold along a fold line. A folding process eliminates the need to precisely align two separate top and bottom interconnect layers. Thus, the fabrication process includes forming top and bottom interconnect layers on the same substrate/interconnect layer, mounting processor and communication chip components, and folding and sealing to form the battery and battery pouch.

A folding process facilitates fabrication in a reel-to-reel process because the folding is easier to perform than precisely registering separate top and bottom layers during a lamination stage. This is because the folding process forces a precise alignment.

Another advantage of a folding process is that it permits 3 electrochemical cells to be coupled in series. A conducive trace may be formed to connect the top and bottom without requiring welding, conductive adhesive or crimping.

FIG. 16A illustrates a fold line and how an interconnect layer is patterned to form top and bottom interconnect layers after folding. An interconnect layer 1670 has a top section 1652 and a bottom section 1654 and a fold line 1650 between the top section 1652 and bottom section 1654. An electrical trace may be formed to connect top and bottom layers as required after folding.

In the example of FIG. 16A, there are three anode/cathode pairs corresponding to three electrochemical cells in series, as illustrated by the vertical arrows. There is a first anode/cathode pair corresponding to anode 1620A and first cathode 1620A. There is a second anode/cathode pair corresponding to second anode 1620B and second cathode 1630B. There is a third anode/cathode pair corresponding to third cathode 1630C and third anode 1620C. This corresponds to what will become three electrochemical cells in series. There is a first series connection from a first connecting layer S1 and a second connecting layer S2. That is, S1 forms a series connection from first cathode 1630A to second anode 1620B. S2 forms a series connection from second cathode 1630B to third anode 1620C. A conductive electrical trace forms a connection from third cathode 1630B to a voltage input (e.g., 4.5V). A ground connection is made to first anode 1620A.

S1 and S2 may, for example, include a carbon layer, an aluminum layer, or a copper layer. Folding on the fold line (illustrated by the center dashed line) and laminating/sealing results in 3 series connected electrochemical cells housed in a battery pouch to provide power to mounted electrical components. For the purposes of illustration, the vertical arrows illustrate the vertical ion flow in the final battery structure.

In some implementations, the materials of the interconnect layer may be selected for the entire battery pouch to form a Faraday cage or RF shield. For example, a thin metal coating layer may be included as part of the interconnect layer to form a faraday cage after folding and laminating.

Referring back to FIG. 16, many aspects of the process are similar to previously described process steps for a planar process except that some process steps are done on different sections of the same interconnect layer and folding is used to fold different sections together. A top section (above the fold line) forms the top interconnect layer after folding. The bottom section (below the fold line) forms the bottom interconnect layer after folding. In block 1602, separate carbon anode and cathode current layers are formed on a second portion of an interconnect layer. In block 1604 adjacent cathode and anode ink patterns are patterned onto a first section of an interconnect layer. In block 1606, electrolytes are applied to cathode and anode regions. In block 1608, electrical components are mounted and firmware is programmed into the RF processor. For example, programming of firmware may also be performed using pogo pin landing pads (not shown in the figures). In block 1610, a carbon anode/cathode current collector series connection is formed onto the second section of the interconnect. In block 1612, adjacent cathode and anode ink patterns are printed onto the second section. In block 1614, the first and second section are folded along the fold line. In block 1616, the top and bottom interconnect layers are sealed for the battery pouch. As some examples, the sealing may be formed using a thermal lamination sealing process or by using transfer adhesive.

In addition to other manufacturing techniques previously discussed, in some implementations, an ultrasonic weld is used to weld one interconnect layer to another.

Figure 17:
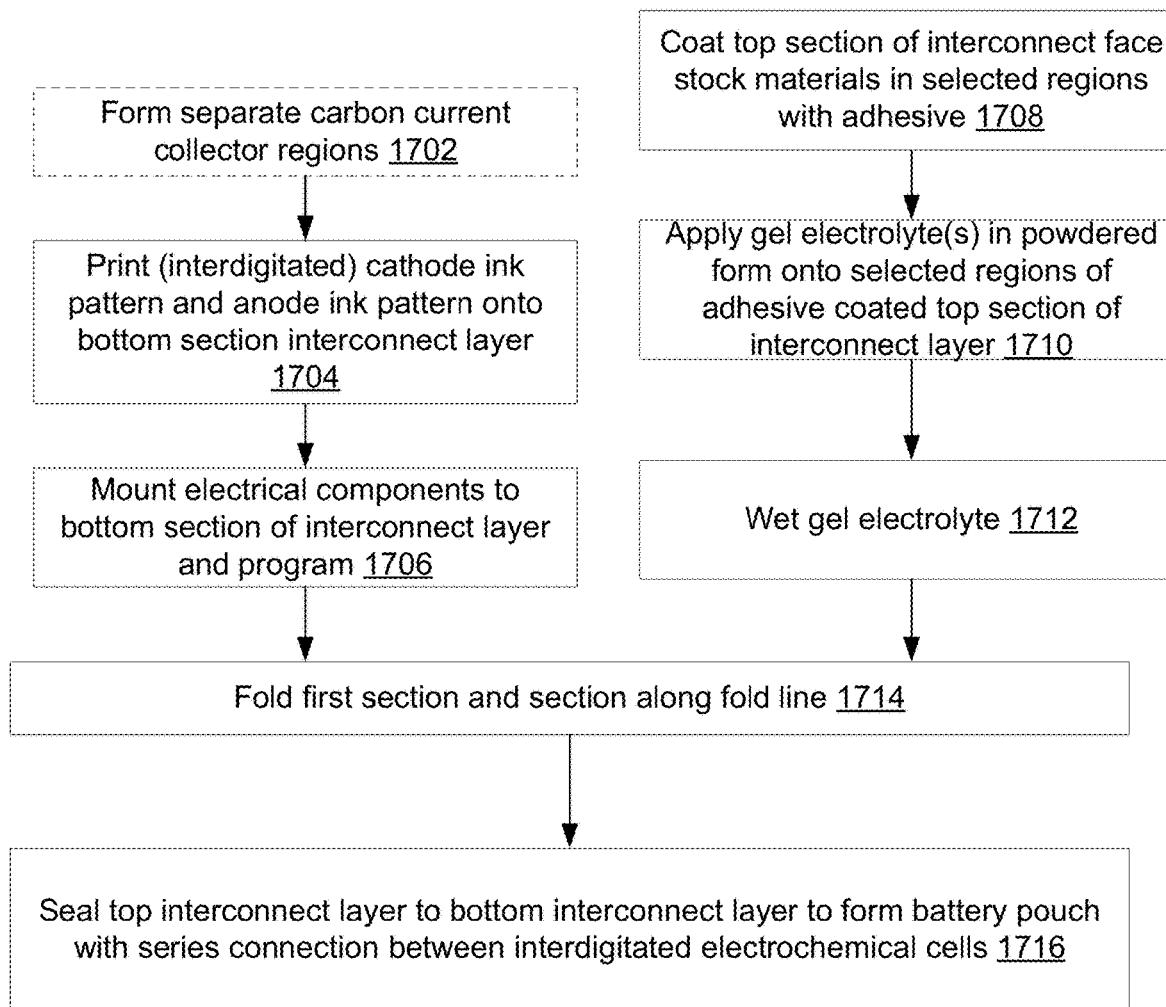
FIG. 17 is a flowchart of a coplanar fabrication process that includes folding in accordance with an implementation.
Figure 17A:
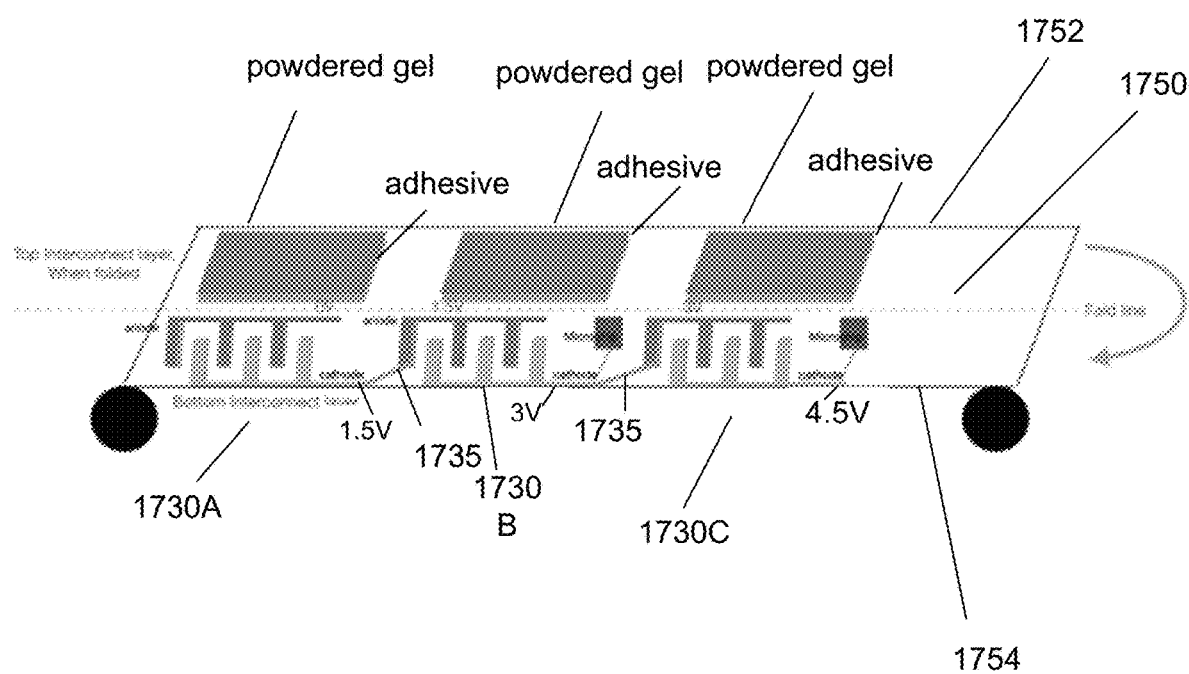
FIG. 17A illustrates aspects of the process of FIG. 17.

FIG. 17 and FIG. 17A illustrate an example of how the folding process may be applied in a co-planar design of a wireless tape 102. As illustrated by FIG. 17A, three interdigitated electrochemical cells 1730A, 1730B, and 1730C may be formed and connected in series to support running chips at 3.0 volts or 4.5 volts as illustrated in the FIG. 17A. Many of the details of the processing are similar to previously described coplanar designs. However, a top section 1752 and a bottom section 1754 are patterned to form top and bottom interconnect layers after folding on a fold line 1750. As previously discussed, the battery pouch may include a conducive layer or conducive coating such that after the folding process a Faraday cage RF shield is formed around critical components to eliminate emission of unwanted radiation. Referring back to FIG. 17, there is a first section below the fold line that will form the bottom interconnect layer after folding. There is a top section above the fold line that will form the top interconnect layer after folding. An exemplary method includes forming separate carbon current collector regions 1702. In block 1704, the interdigitated cathode and anode ink patterns are printed onto the bottom section of the interconnect layer. In block 1706, the electrical components are mounted to the bottom section of the interconnect layer and firmware is programmed. In block 1708, the top section of the interconnect face stock materials are coated in selected regions with adhesive. In block 1710, a gel material is deposited in powdered form (e.g., via brush rolling) onto the adhesive coated top section. The gel material is wetted in block 1712 to form a gel electrolyte. For example, water vapor may be deposited that includes an electrolyte. Alternatively, the dry powder may include the electrolyte chemical in a dry form (e.g., a salt) such that wetting the gel material with water generates a semi-aqueous gel with the electrolyte. In block 1714, the first and second section are folded along the fold line. In block 1716, the top interconnect layer and bottom interconnect layer of the folded structure are sealed to form the battery pouch around the interdigitated electrochemical cells.

Figure 18A:
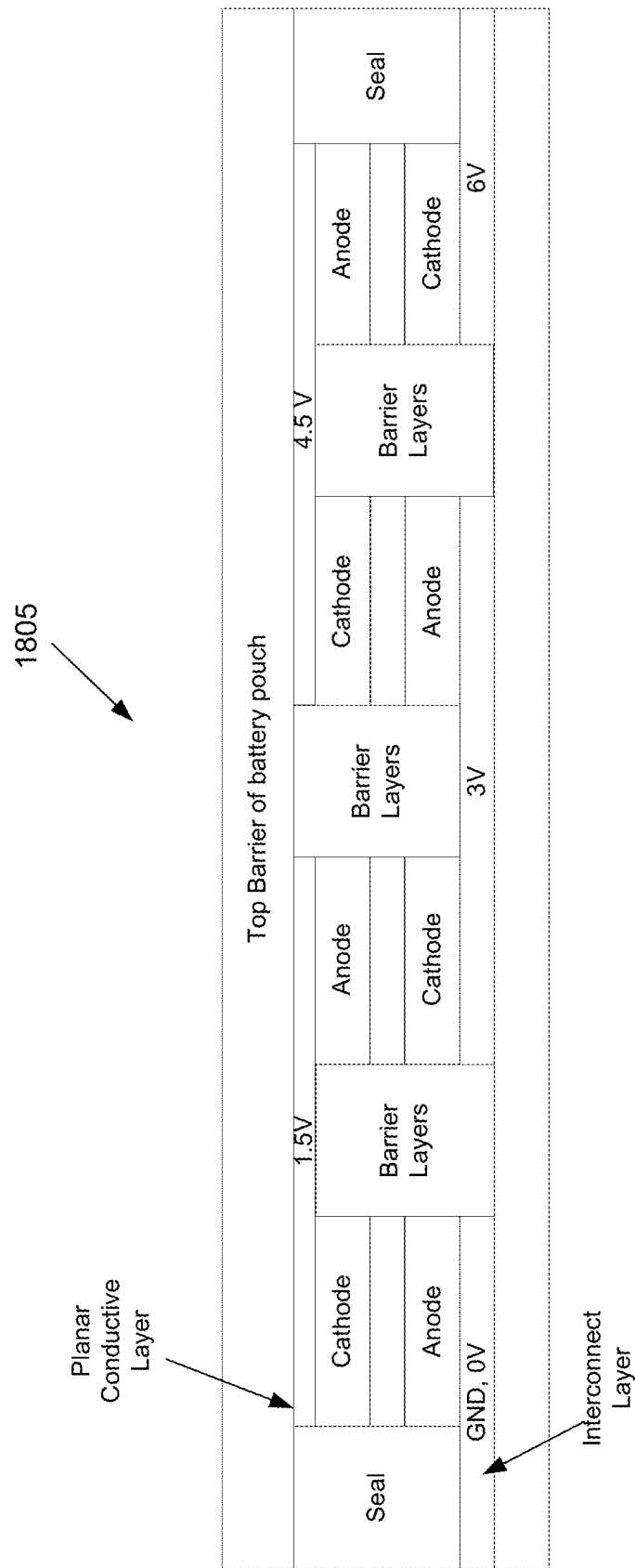
FIG. 18A is a cross-section of a battery pouch having an even number of electrochemical cells in series in accordance with an implementation.

FIG. 18A is a side view cross-section of a battery pouch 1805 wireless tracking label that extends the previously described examples of a wireless tracking label with two electrochemical sells in series, formed by a planar process with a vertical flow of ions in each electrochemical cell with planar conductive layers coupled the electrochemical cells in series. FIG. 18A shows a battery comprising four electrochemical cells in series with a vertical flow of ions in each electrochemical cell with patterned planar conductive layer regions coupling the electrochemical cells in series.

Figure 18B:
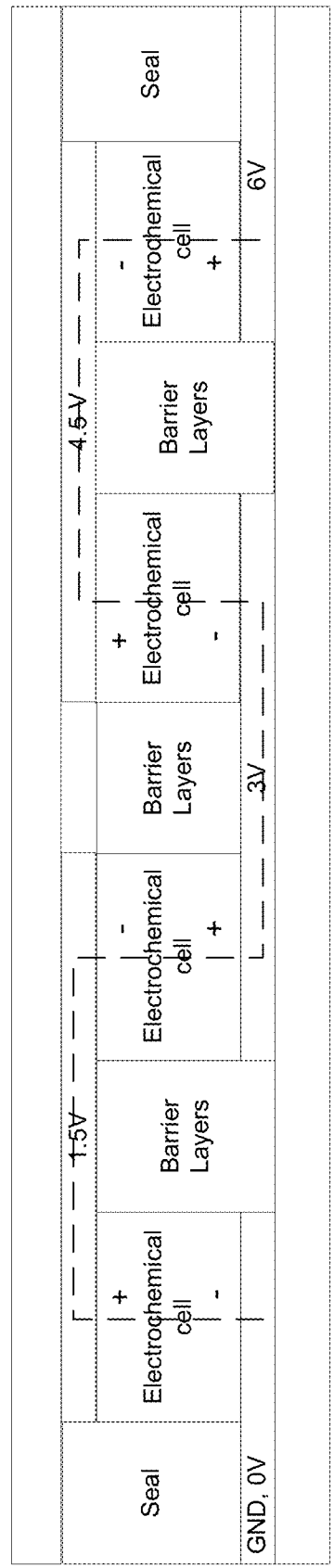
FIG. 18B illustrates the series connections of the battery of FIG. 18A in accordance with an implementation.

For a planar stacked design, an even number of electrochemical cells in series (e.g., 2, 4, 6, etc.) eliminates the need to form a separate connection (e.g., using a conductive tab) from a top planar conductive layer to an interconnect layer. That is, with an even number of electrochemical cells, a first electrochemical cell extends upwards from a portion of the interconnect layer to a planar conductive layer and the next electrochemical cell in series goes back downwards from the planar conductive layer to the interconnect layer. This is illustrated in FIG. 18B. This is true for two electrochemical cells, for four electrochemical cells, or even for higher even numbers of electrochemical cells, such as six electrochemical cells. For an even number of vertical electrochemical cells in series, the process for forming series connection is highly manufacturable. The fabrication thus doesn't require overlapping tabs or other steps (like forming conductive vias) that are harder to implement in a low-cost, high-yield manufacturing process.

One aspect of the wireless tracking label of FIG. 18A is that two or more different voltages can be routed from the electrochemical cells. In the example of FIG. 18C, a battery with an even number of electrochemical cells in series 1880, such as four cells in series has a dual voltage output use to power a first circuit block at a first voltage 1882 (e.g., 3V) and a second circuit block at a second voltage 1884 (e.g., 6V) by routed two different voltage to two different circuit blocks. For example, 3V could be routed to circuit blocks that operate well on 3V. However, some types of circuits, such as some types of RF circuit blocks, function better at voltages greater than 3V.

The example of FIG. 18A may be fabricated using any of the previously discussed techniques for forming vertical stacks of electrochemical cells in series. The interconnect layer can be patterned to route dual voltages (e.g., 3V or 6V) to different circuit blocks, as illustrated in FIG. 18C.

Figure 19A:
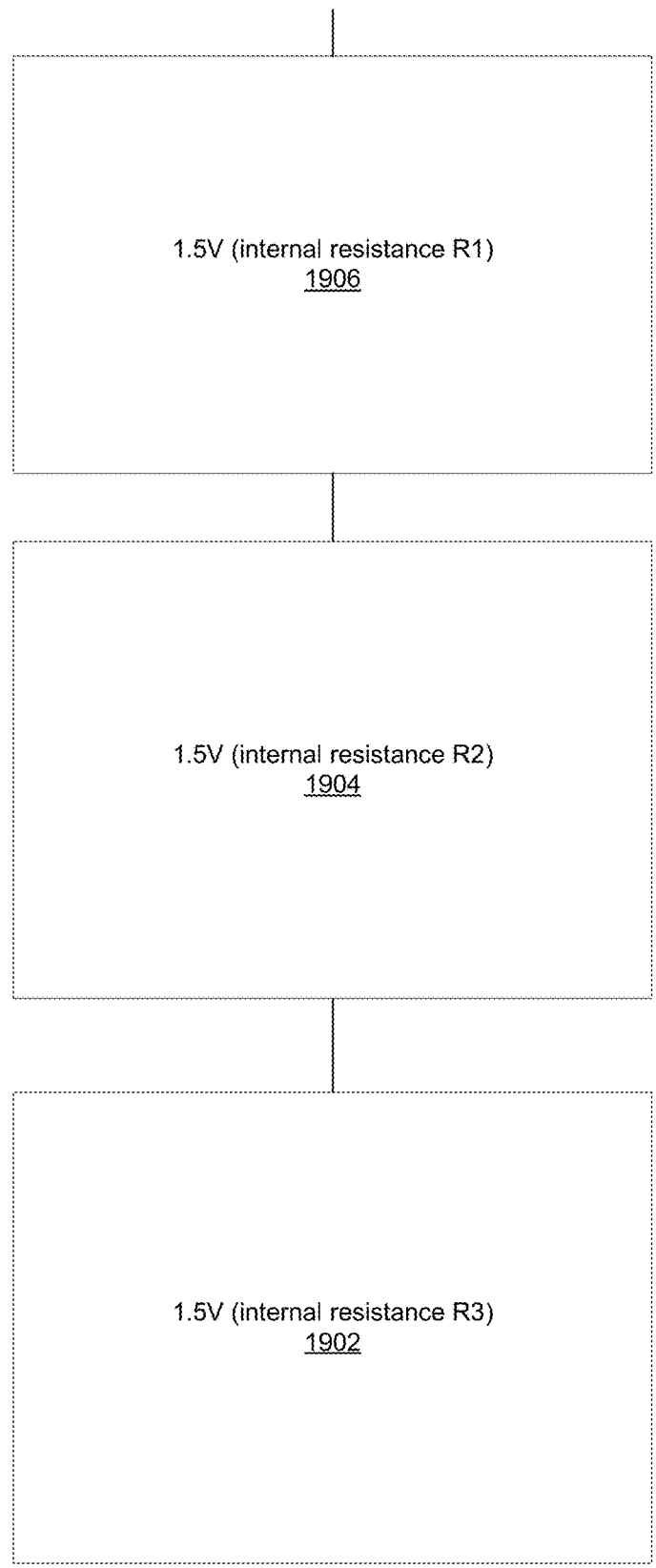
FIG. 19A illustrates electrochemical cells in series in accordance with an implementation.
Figure 19B:
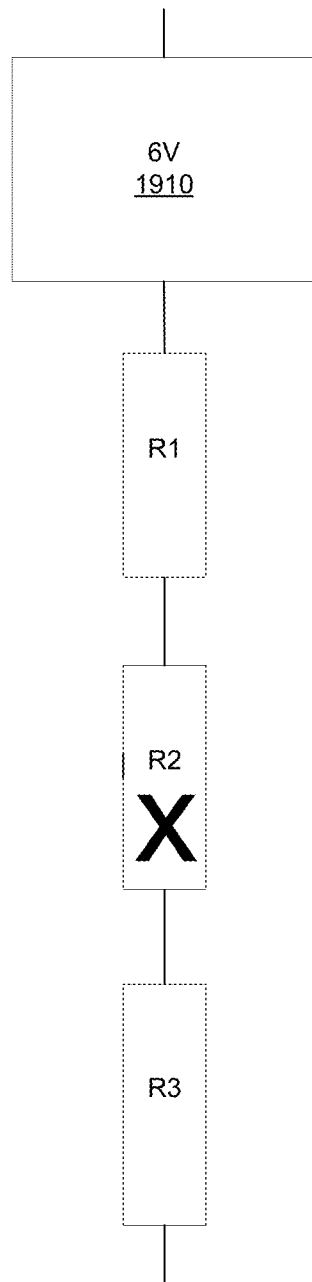
FIG. 19B illustrates how a defect or fabrication problem in an individual electrochemical cell can create an excessive resistance or open connection for electrochemical cells in series.

FIGS. 19A and 19B illustrate some of the issues associated with scaling up the area of the electrochemical cells in a wireless tracking label. In FIG. 19A, a series connection of electrochemical cells is illustrated in which each electrochemical cell 1902, 1904, and 1906 has an associated battery resistance (e.g., R1, R2, and R3 respectively). In FIG. 19B, the equivalent battery has the series equivalent voltage 1910 of all the batteries in series. The equivalent resistance is the combined series resistance of the batteries in series corresponding to resistors R1, R2, and R3.

However, as illustrated in FIG. 19B, an individual resistance (e.g., that of resistor R2) may be higher than average. In thin film batteries using graphite coatings, the graphite coatings are notorious for high resistance compared to metal-based conductors. Graphite coatings are also prone to cracking. When connecting multiple cells in series, there is a multiplier effect regarding the probability than any one cell either exhibits above-normal resistance or is a disconnect.

There may also be a multiplier effect in scaling up the area of an electrochemical cell regarding the formation of potential cracks or other defects that, if they occur, may increase the resistance of the battery, or even create a disconnect.

Figure 19C:
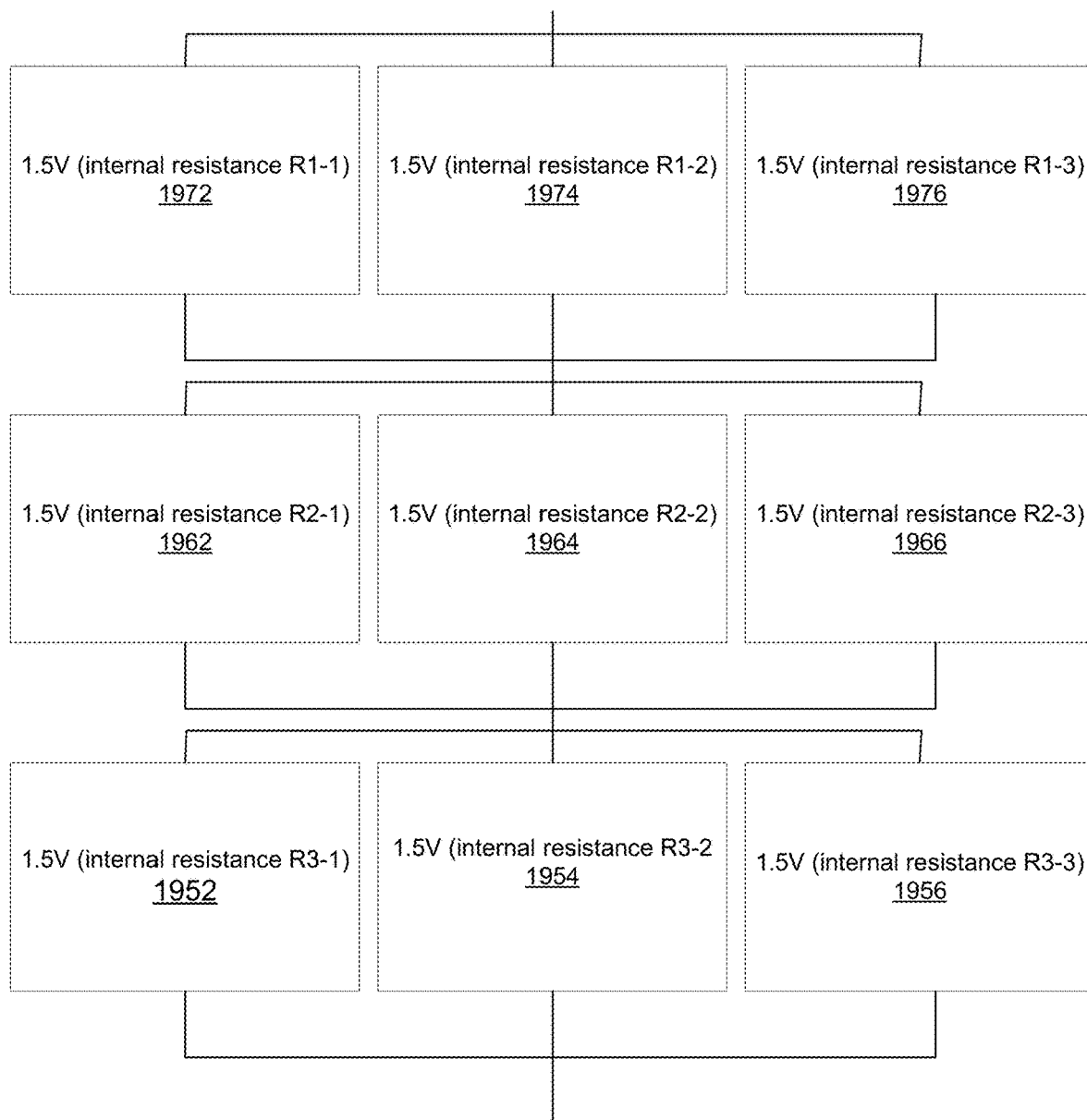
FIG. 19C illustrates a series-parallel arrangement in which individual stages of electrochemical cells are coupled in parallel, and the stages are coupled in series.

As illustrated in FIG. 19C, in one implementation the electrochemical cells of the wireless tracking label are connected in series and parallel. That is, instead of a single large 1.5V cell (e.g., cell 1902 in FIG. 19A with nominal resistance R3), there may be a stage of two or more cells in parallel (e.g., cells 1953, 1954, and 1956). Instead of a single large 1.5V cell 1904 with nominal resistance R2, there may be a stage having two or more cells in parallel (e.g., cells 1962, 1964, and 1966). Instead of a single large 1.5V cell 1906 with nominal resistance R1, there may be a stage with two or more cells series in parallel (e.g., cells 1972, 1974, and 1976). There is thus a parallel electrical connection of cells in each stage of the battery, with the stages electrically connected in series. There can be any reasonable number of stages connected in series (e.g., 2, 3, 4, etc.) and any reasonable number of cells in parallel in each stage (e.g., 2, 3, etc.).

Figure 19D:
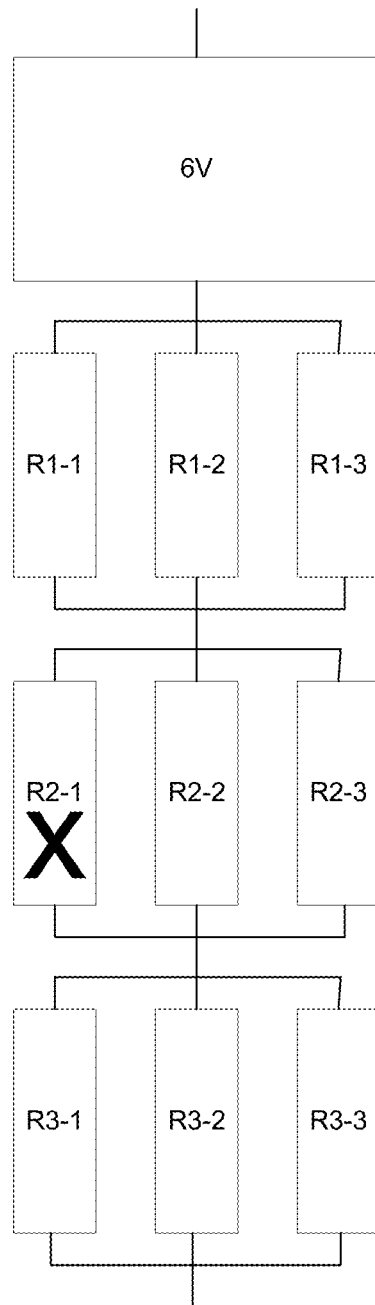
FIG. 19D illustrates a high resistance or open connection in an individual electrochemical cell in the series-parallel arrangement of FIG. 19C.

As illustrated in FIG. 19D, the equivalent circuit for FIG. 19C has a set of parallel resistances for each cell. This means that if there is a defect in an individual cell (e.g., resistance R2-1 is higher than average or there is a disconnect for resistor R2-1) that it will not be catastrophic for the use of the battery. The battery resistance will still stay in a bounded range by virtue of other equivalent resistances in parallel (e.g., R2-2 and R2-3). The series-parallel configuration of battery cells and their equivalent resistances results in a more manufacturable process robust to manufacturing variances and defects.

In some implementations, the wireless tracking label uses a nominal higher voltage thin-film printed battery voltage (e.g., 6V) to power circuits having a lower safe operating voltage (e.g., 4.5V). As a practical matter, for thin film ZnMn batteries each having a nominal voltage of about 1.5 V, it's easiest to manufacture thin film printed batteries with voltage of either 3V or 6V nominal (no load) voltages. As previously discussed, it's more complicated to manufacture a thin film printed battery for a wireless tracking label with environmentally friendly materials with intermediate nominal voltages, such as 4.5V.

Figure 20A:
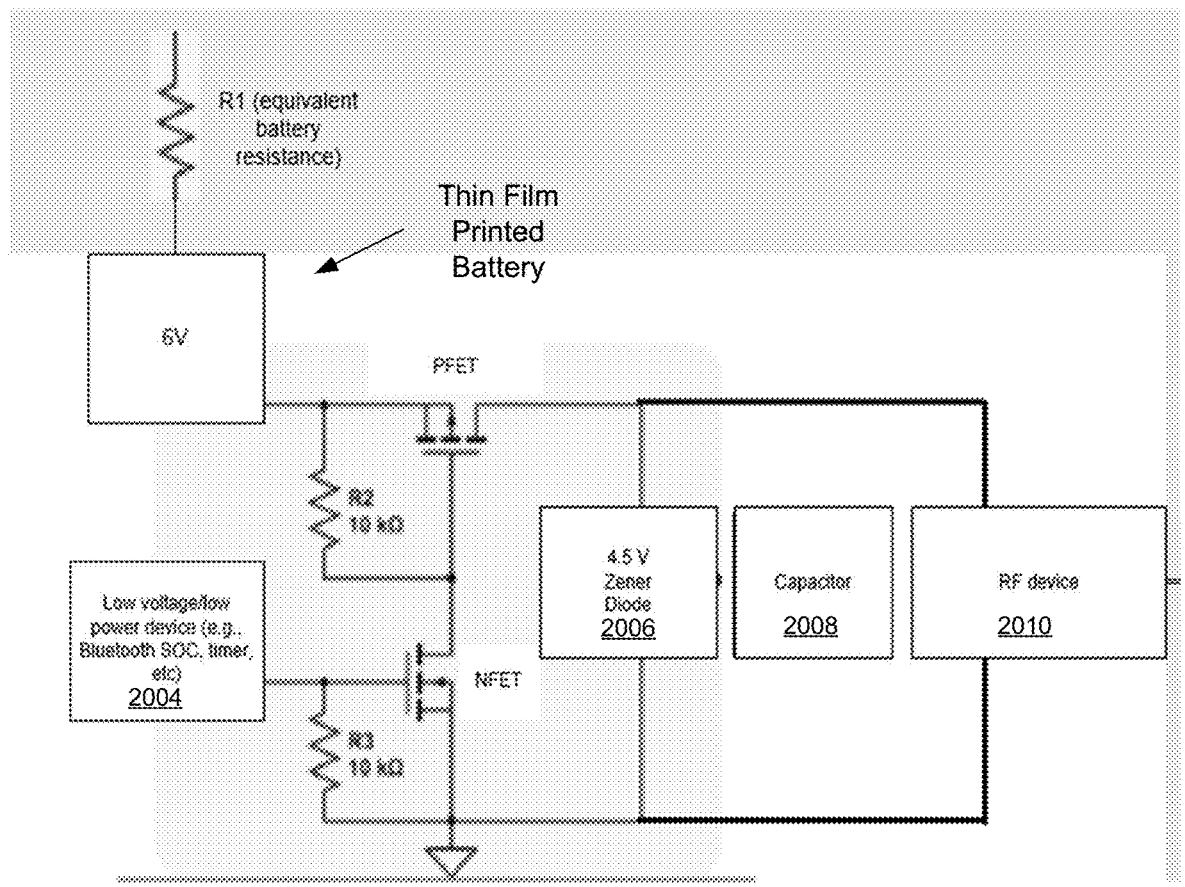
FIG. 20A illustrates a voltage control circuit to switch a battery voltage of a wireless track label and prevent an excessive voltage during an initial turn-on phase of an RF device in accordance with an implementation.

A wireless tracking label may include a variety of different processors and other circuits. Some of these circuits may consume more power (and draw more current) when activated. FIG. 20A illustrates a circuit that can be implemented on a wireless tracking label that is capable of using a higher supply thin film printed battery voltage (e.g., 6V) to power a circuit block on a wireless tracking label having an intermediate maximum operating voltage (e.g., an RF device 2010, such as an RF communication processor, having a maximum safe operating voltage of 4.5 V, or other RF communication circuit having a maximum safe operation voltage). In one implementation, a voltage protection circuit is provided that is capable of switching a supply voltage to a load (e.g., 6V to a high-power RF device (e.g., an RF communication processor or other RF communication circuit) using a lower power device 2004 (e.g., using a timer or a Bluetooth chip or other processor).

In the example of FIG. 20A, the RF device 2010 has some maximum highest safe voltage, which for example may be a maximum voltage around 4.5 V (or slightly lower, such as 4.2V). Some commercial RF devices are designed to operate at around 4.5 V.

However as previously discussed, a thin film printed battery constructed of environmentally friendly materials with four 1.5V electrochemical cells in series has a nominal voltage of 6V. As an example, depending on fabrication details, it may have an equivalent internal resistance in the range of 50 to 90 ohms. This internal resistance can be used beneficially in a voltage control circuit having a Zener diode circuit to control the voltage of an RF device during an initial turn on time period.

In the example if FIG. 20A, a complementary p-FET and N-FET complementary pair switch allows a lower power processor (or other circuit) to turn on the switch. When the lower voltage processor or circuit turns on the switch, 6V is initially presented to the load, which includes the 4.5V tolerant RF device in parallel with voltage protection circuit that include a 4.5 V Zener diode 2006 and a capacitor 2008.

When the load is applied, the Zener diode initially goes into reverse breakdown, which causes current to flow through the Zener to ground, limiting the voltage presented to the RF device to be no more than the Zener reverse breakdown voltage. However, while there is initially a high current drawn by the Zener diode 2006, the internal resistance of the thin film printed battery results in a voltage drop presented to the load, and hence to the Zener diode. That is, as the RF device 2010 turns on and draws current, there is effectively a voltage divider in the circuit in the sense some of the voltage of the battery is dropped by the internal resistance of the battery. The voltage drop created by the resistance of the thin film printed battery increases as the RF device 2010 turns on and draws current. After some initial turn on time period, the voltage drops below the range where the Zener diode 2006 is strongly conducting. The Zener diode 2006 begins to draw less current and consume less power. The Zener diode 2006 stops conducting strongly, effectively turning off.

This approach takes advantage of the internal resistance, R1, of the thin film printed battery, the Zener diode breakdown voltage, the capacitance value of the capacitor 2008, the turn-on voltage of the RF device 2010 (e.g., an RF processor, and the current drawn by the RF device (e.g., a RF processor) when it is turned on. By selecting these parameters, the Zener diode 2006 acts to prevent an over-voltage on the RF device 2010 beyond a maximum safe operating voltage when the 6V battery is initially presented to the load, yet after a short period of time, the voltage protection circuit enters a second mode of operation during normal use of the RF device in which the Zener diode stops strongly conducting (effectively turning off) and this the Zener diode doesn't waste power during normal operation of the RF device.

Fog 20B illustrates how the Zener diode 2006 sinks current in reverse breakdown during an initial turn-on time constant to protect the RF device 2010 from an excessive voltage exceeding a maximum voltage for the RF device. However, after the turn on time constant, the voltage drops enough at the load such that the Zener diode 2006 is no longer conducting significant amounts of current. During normal operation of the RF device 2010, the current drawn by the Zener diode 2006, and the power consumed by the Zener diode 2006, is insignificant.

Figure 20B:
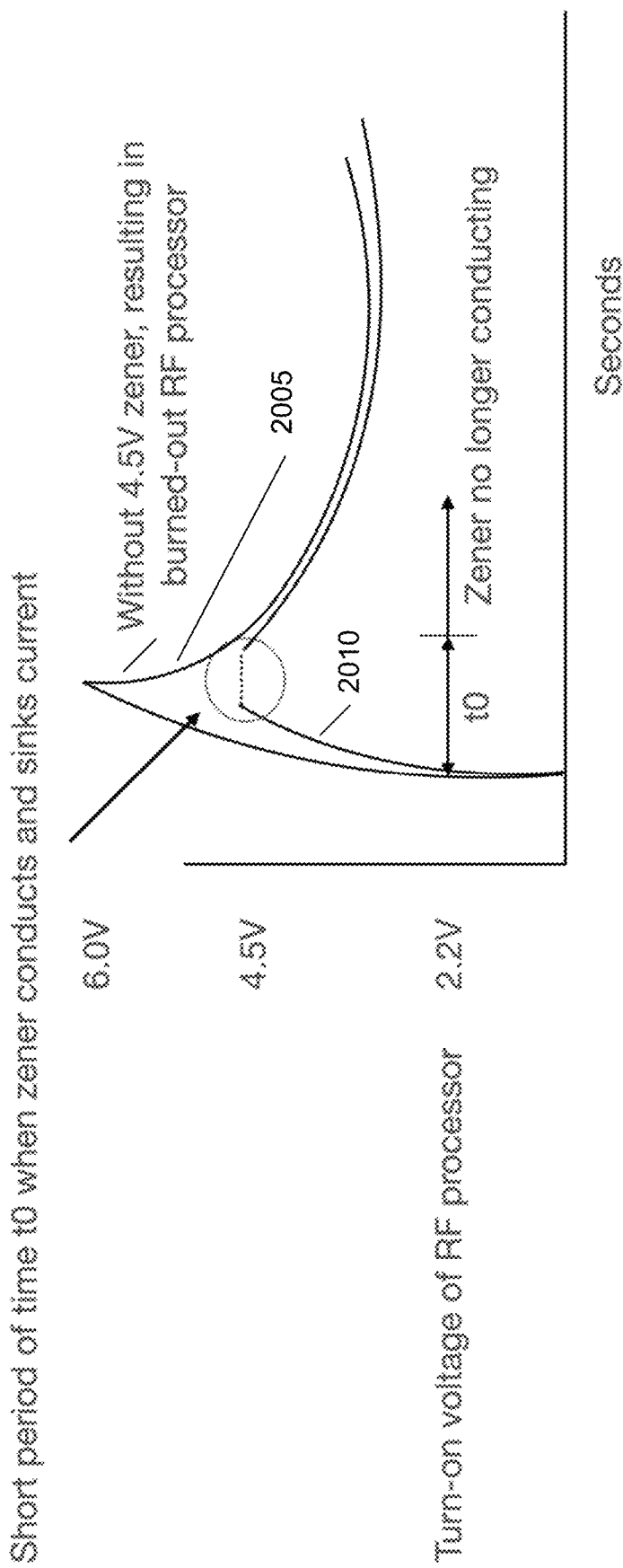
FIG. 20B illustrates a time response of the voltage control circuit of FIG. 20A.

FIG. 20B illustrates the voltage applied to the load and hence to the RF device 2010. Curve 2005 illustrates how the voltage applied to the load, without the Zener diode 2006 providing voltage protection, would initially rise to be approximately 6V and burn-out an RF device 2010 that was designed to operate at lower safe maximum voltage, such as 4.5V. Curve 2010 illustrates the voltage with the voltage protection circuit that includes Zener diode 2006 and associated capacitance 2008. The voltage at the load initially rises until the Zener diode 2006 conducts. There is a limited time period, t0, when the Zener diode 2006 conducts and sinks significant current. However, the Zener diode 2006 current drops after time t0 because once the RF device 2010 begins to draw significant current, the voltage drop created by the internal resistance R1 of the battery drops the applied voltage by acting as a voltage divider.

The circuit of FIG. 20A takes advantage of the fact that thin film printed batteries formed from a series connection of 1.5V electrochemical cells have a significant resistance. The circuit of FIG. 20A performs a complex function using a small number of comparatively inexpensive components to achieve voltage protection while consuming minimal power during normal operation of the RF device.

Figure 20C:
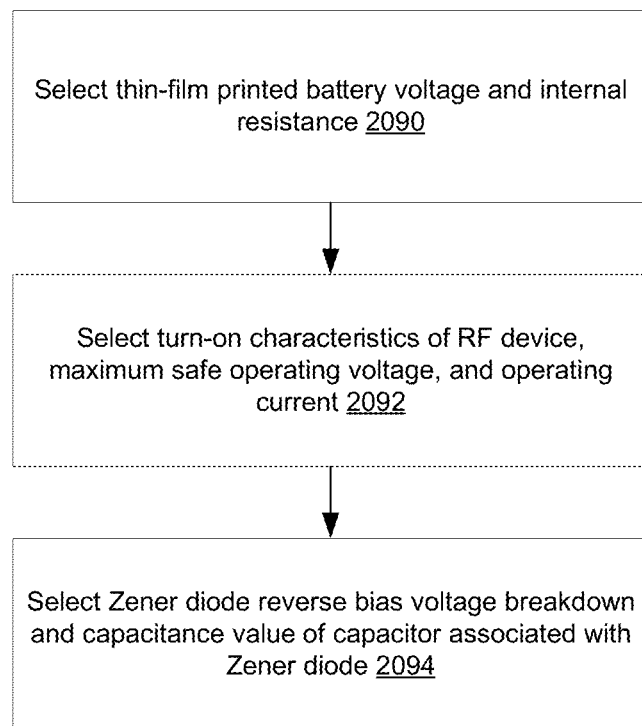
FIG. 20C illustrates a design methodology for the circuit of FIG. 20A.

FIG. 20C illustrates a general design approach for the circuit of FIG. 20A. In block 2090, in designing a thin film printed battery for a wireless tracking label, there is some nominal internal resistance range for a series connection of electrochemical cells. For example, the range could be 50 to 90 ohms for a series connection of four electrochemical cells of 1.5V to produce a nominal 6V battery. However, different ranges of battery resistance are also possible depending on various factors. In block 2092, the circuit designer picks an RF device to use, which has turn-on characteristics, a maximum safe operating voltage, and operating current parameters. In block 2094, a selection is made of the Zener diode reverse breakdown voltage, and the capacitance associated with the Zener diode. For example, for a given thin film printed battery having a nominal 6V with 50 to 90 ohms internal resistance, the Zener diode characteristics and capacitance may be tweaked to achieve the desired voltage protection of the RF device.

Figure 21A:
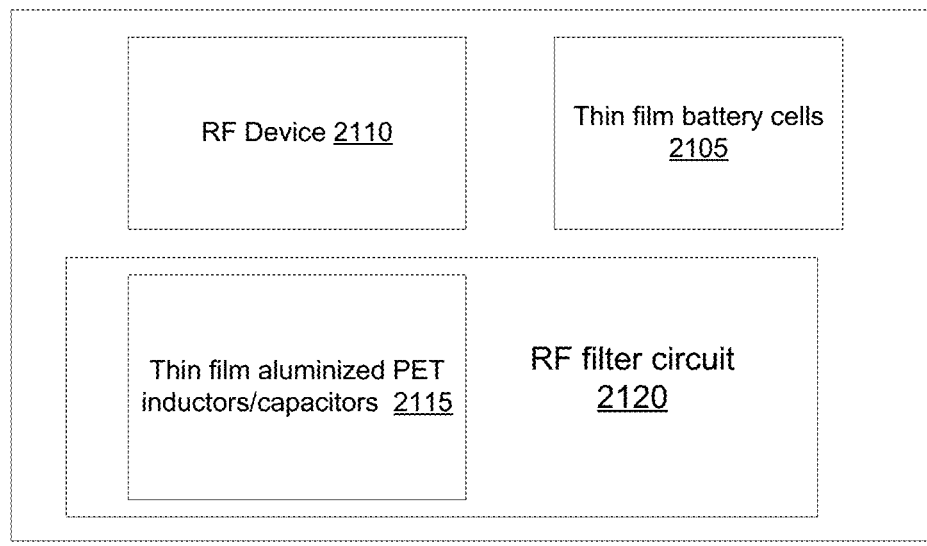
FIG. 21A illustrates a wireless tracking label in which a discrete component of an RF circuit, such as a capacitor of an RF filter, is replaced with a thin film component compatible with fabrication of the wireless tracking label.

FIG. 21A illustrates an implementation in which a wireless tracking label RF device 2110 (e.g., an RF communication processor) is powered by thin film battery cells 2105. An RF filter circuit 2120 may be provided that utilizes thin film aluminized PET inductor and/or capacitors 2115 formed from layers compatible with other layers of the wireless tracking label. This reduces the part content and manufacturing costs compared to using discrete capacitors and inductors. Even eliminating a single discrete capacitor can be significant in terms of manufacturability.

Figure 21B:
FIG. 21B illustrates an example of an aluminized PET layer in accordance with an implementation.

FIG. 21B illustrates an example of aluminized PET structure. An example implementation has a 38 micron thickness PET layer, a 15 micron thick top aluminum layer, and a 10 micron thick bottom aluminum layer. These layer thickness can be adjusted to be compatible with the design and fabrication of other layers of the wireless tracking label.

Figure 21C:
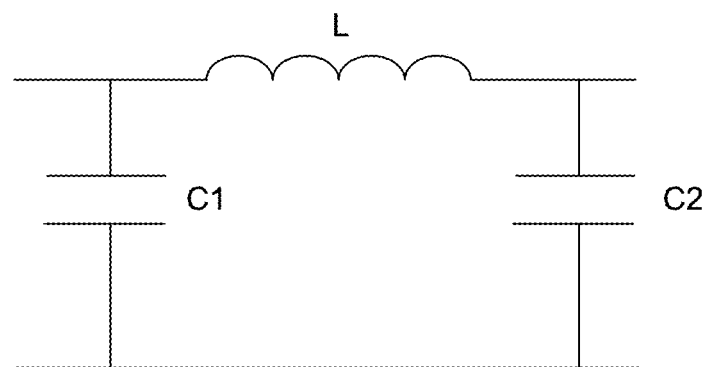
FIG. 21C illustrates an example of an RF filter circuit for which a discrete component is replaced with an aluminized PET layer in accordance with an implementation.

Referring to FIG. 21C, an illustrative example of an RF circuit may be a 50 Ohm impedance matching circuit between a wireless RF device and an antenna. For example, the circuit may be a Pi filter for filtering noise that has an equivalent circuit of two capacitors and an inductor. The capacitor value of capacitors C1 and C2 may, for example, have values in the range between 1.2 pF and 6 pF. The inductor may have a value between 2nH and 5nH. As an illustrative example, a capacitor C1 of 1.2 pF can be fabricated as a patterned rectangle of the aluminized PET structure of FIG. 21B having approximate surface dimensions 1.33 mm×1.5 mm for total surface area of 1.95 mm². Capacitance is given by the formula C=EA/d, where E=permittivity, A is area, and d is the separation distance. For PET, E is around 3.5. Assuming A=1.95 mm² and d=38 microns, then C is 1.5 pF.

Eliminating the need for one or more discrete capacitors and/or inductors reduces the number of discrete components that need to be used to implement a wireless tracking label, which reduces manufacturing costs.

Figure 22A:
FIG. 22A is a flowchart illustrating a technique to form via-like connections between conductive layers of a wireless tracking label in accordance with an implementation.
Figure 22A:
Figure 22B:
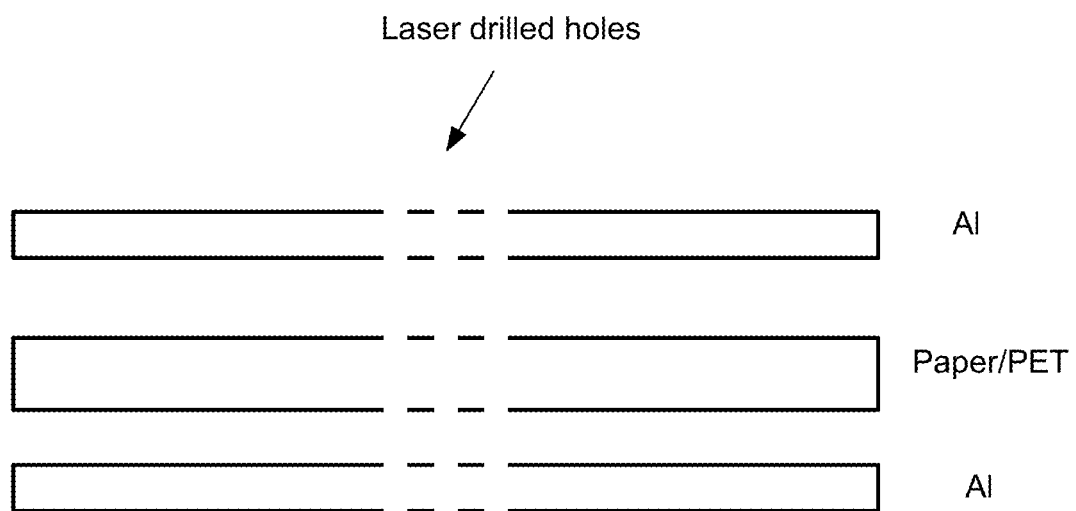
FIG. 22B illustrates forming laser drilled holes between conductive layers of a wireless tracking label in accordance with an implementation.
Figure 22C:
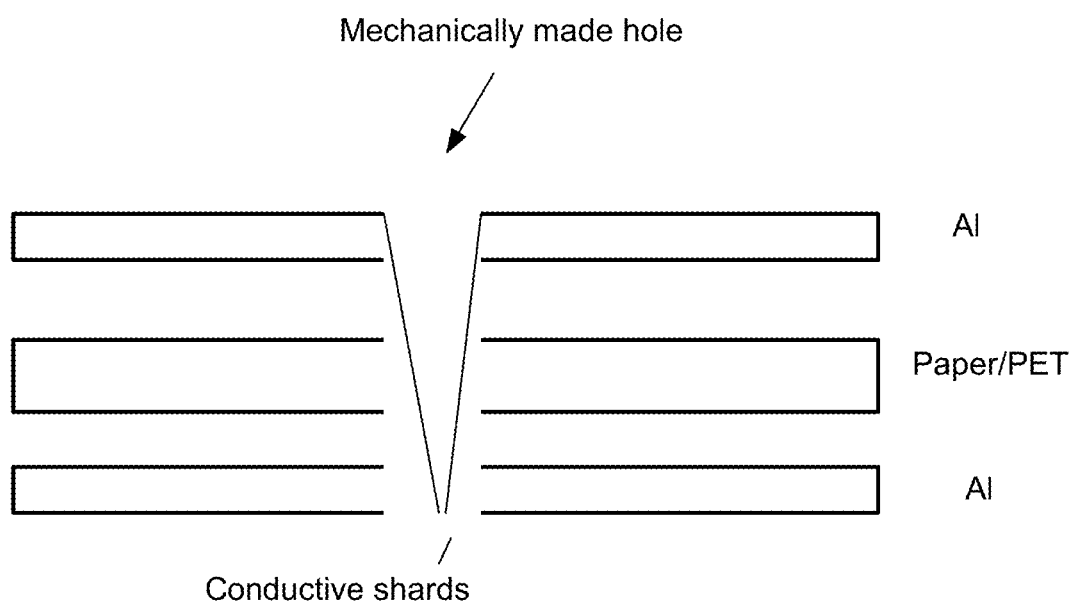
FIG. 22C illustrates forming mechanically created holes between conductive layers of a wireless tracking label in accordance with an implementation.
Figure 22D:
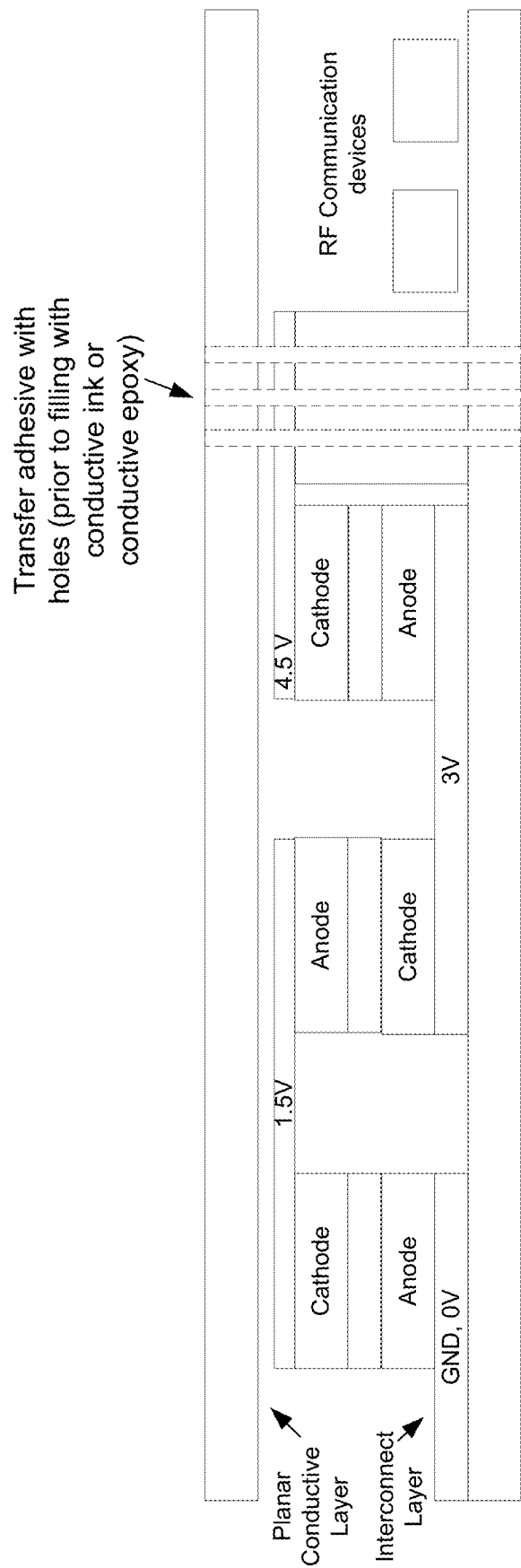
FIG. 22D illustrates an example of a cross-section in which a via-like connection is formed between conductive layers of a wireless tracking label in accordance with an implementation.

Referring to FIG. 22A, an exemplary method of forming electrical connection between conductive layers may include forming a label layer structuring have at least two conductive layers separated by an intermediate layer in block 2202, forming perforation in block 2204, and filling in voids in the perforation with a conductive material, such as by using a conductive ink or a conductive epoxy. A conductive ink or a conductive epoxy may, for example, include silver flakes or nickel spheres.

This method of forming an electrical connection is analogous to forming a conductive via hole in a printed circuit board (PCB). Conductive vias are formed in PCBs by forming holes and copperplating. However here the materials are different, as in PCBs copper plating and other technologies exist that are not compatible with manufacturing a via hole for a flexible wireless tracking label in a reel-to-reel fabrication process.

Figure 23A:
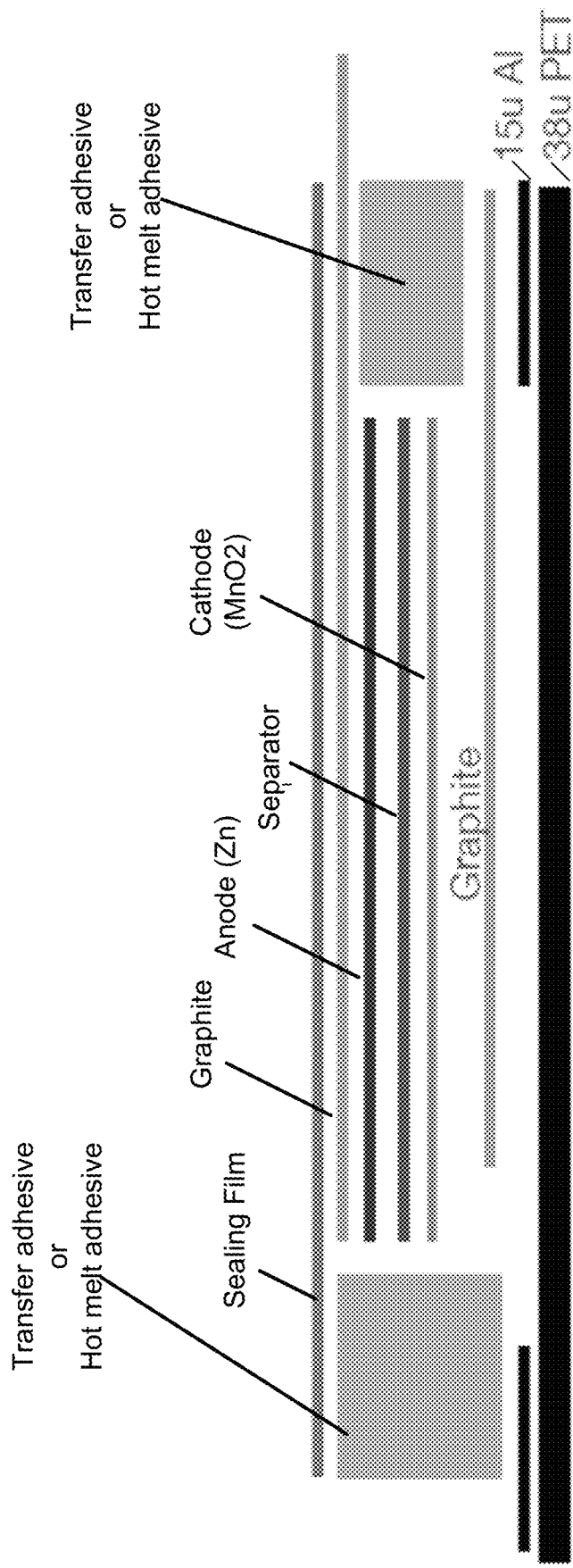
FIG. 23A is a cross section of a battery structure to protect an aluminum layer from corrosion in accordance with an implementation.

A variety of different implementation options to improve manufacturing and improve battery lifetime will now be described. One aspect of battery lifetime is associated with the issue of electrolytic corrosion. FIG. 23A illustrates a cross-section of a portion of an implementation of a wireless tracking label that protects an aluminum laminate from electrolytic corrosion. In this implementation, a PET film is employed (which in a preferred implementation is laminated between two layers of aluminum foil). An aluminum laminate serves as the interconnect layer, forming both the cathode and anode current collectors of the stacked structure and electrically connecting them to the electrical components of the wireless tape.

Within the pouched area, however, electrolytes such a $ZnCl_2$ can cause corrosion to the aluminum foil, deteriorating its conductivity, resulting in a failed battery. One way to minimize this corrosion is by coating the aluminum current collector with printed graphite and a polymer such as PVDF (Poly(vinylidene fluoride)). However, this may not be sufficient to avoid corrosion over time from an aqueous electrolyte that may slowly permeate the graphite coating and corrode the underlying aluminum. Consequently, in one implementation the wireless tape is patterned without aluminum forming the current collector in the sealed pouch area. Instead, the aluminum is patterned to be adjacent to the pouched area of the cell with a graphite layer forming a bridge between the current collector and aluminized interconnect layer. This is illustrated in FIG. 23A. The pouched region generally includes the region between the top sealing film, the bottom PET layer, and the side adhesive regions. For the purposes of illustration, a 15 micron thick aluminum layer is illustrated adjacent to the pouched region having a graphite layer forming the bridge. This fabrication ensures electrolyte does not come into contact with the aluminum.

Figure 23B:
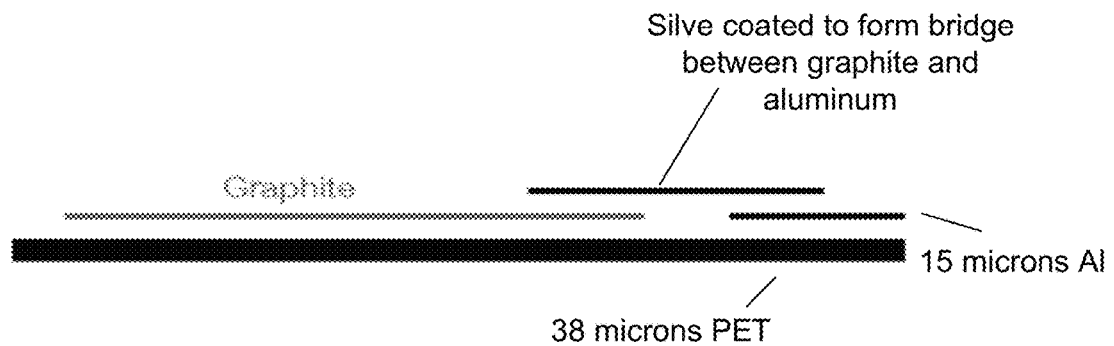
FIG. 23B is a partial cross section of a battery structure to protect an aluminum layer from corrosion in accordance with an implementation.
Figure 23C:
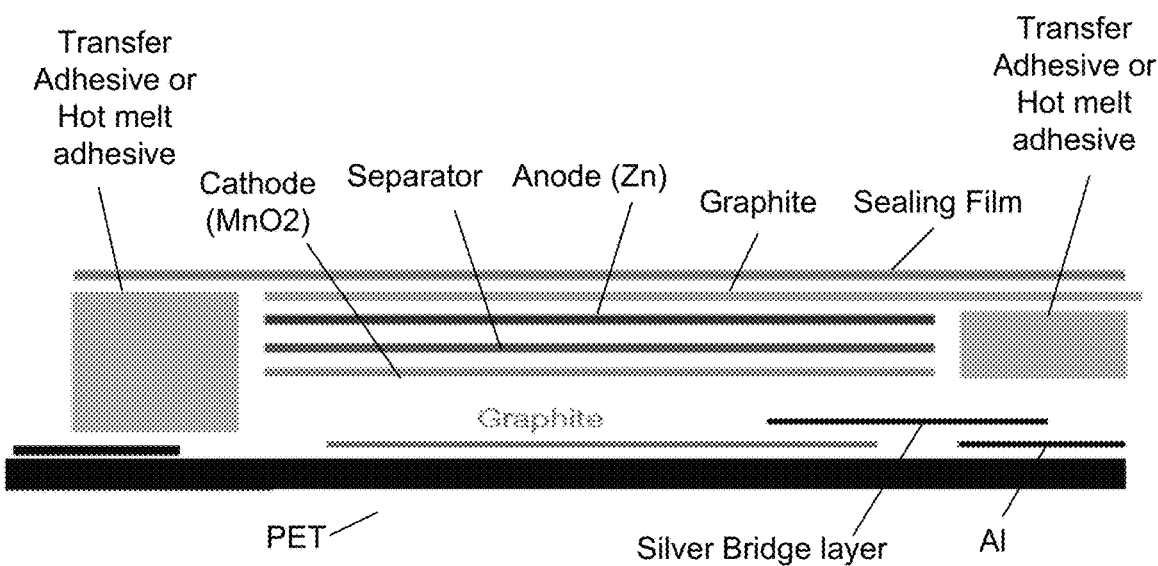
FIG. 23C is a cross section of the battery structure of FIG. 23B in the completed structure for protect an aluminum layer from corrosion in accordance with an implementation.

FIG. 23B illustrates a variation of the same principle in which a conductive ink, such as silver, is printed on or under the graphite layer at the interface between the graphite current collector and aluminum interconnect layer. FIG. 23C illustrates a cross section including other portions of the pouch.

Figure 23D:
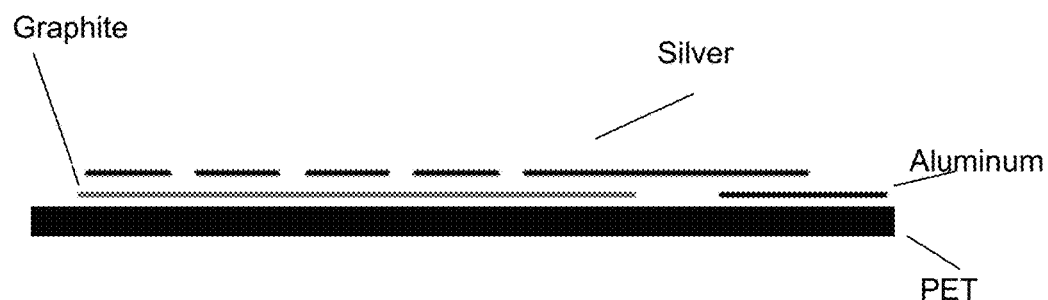
FIG. 23D is a partial cross section of a battery structure to protect an aluminum layer from corrosion in accordance with an implementation.
Figure 23E:
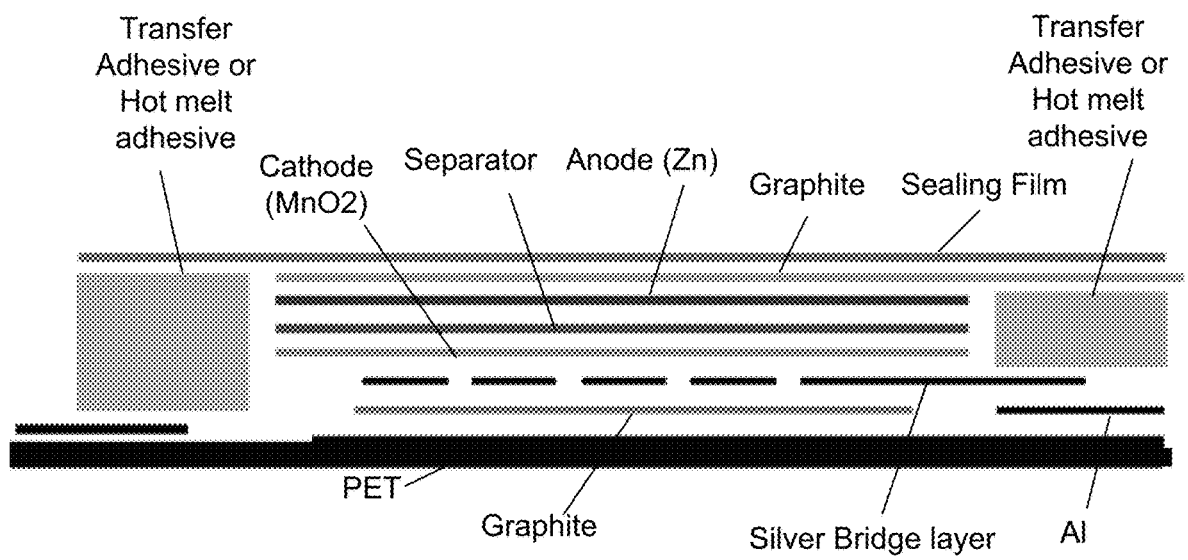
FIG. 23E is a cross section of the battery structure of FIG. 23E in the completed structure to protect an aluminum layer from corrosion in accordance with an implementation.

FIG. 23D illustrates an implementation variation in which silver ink is patterned patterned not only at the interface, but in a grid across the entire graphite-coated current collector area to increase the conductivity of the graphite and reduce the internal resistance of the battery. FIG. 23E illustrates the example of FIG. 23D showing the additional layers of the pouch.

Figure 24:
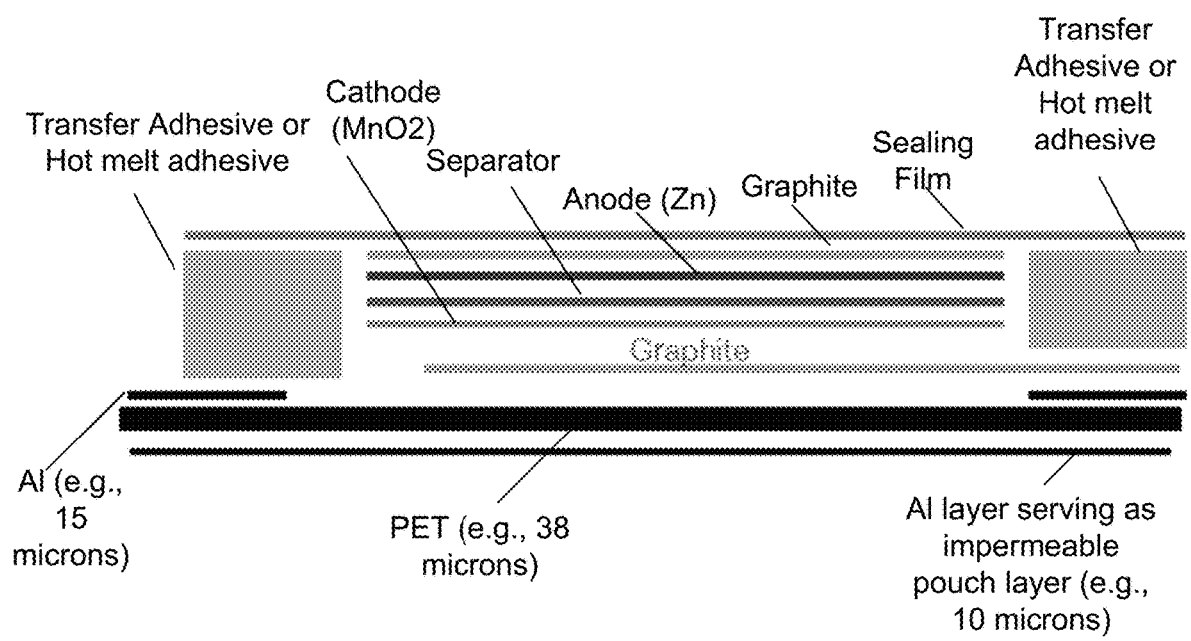
FIG. 24 is a cross section of a variation of a battery structure having an outer aluminum layer serving as an impermeable pouch layer in accordance with an implementation.

FIG. 24 is a cross section of a battery pouch of a wireless tracking label that illustrates another variation to increase battery lifetime. The removal of aluminum as part of the current collector for either the cathode or anode fabrication avoids problems related to corrosion of the aluminum with common electrolytes such as $ZnCl_2$. However, there is an additional consideration by such a modification, because the substrate, which forms one side of the battery pouch, also serves as the interconnect layer, no longer provides a barrier layer to protect the oxidation and evaporation of the active electrochemical components. PET is not an impermeable material on its own and over time, oxygen and $H_2O$ can migrate through the PET material, causing evaporation of an aqueous electrolyte and failure of the battery on circuit.

To address this issue, a second layer of the interconnect on the bottom side of the PET layer can be added that also serves as a ground plane and interconnect, while also forming an impermeable pouch layer. As illustrated in FIG. 24, an additional aluminum layer can be added to the bottom of the PET layer to serve as a bottom impermeable pouch layer.

Figure 25:
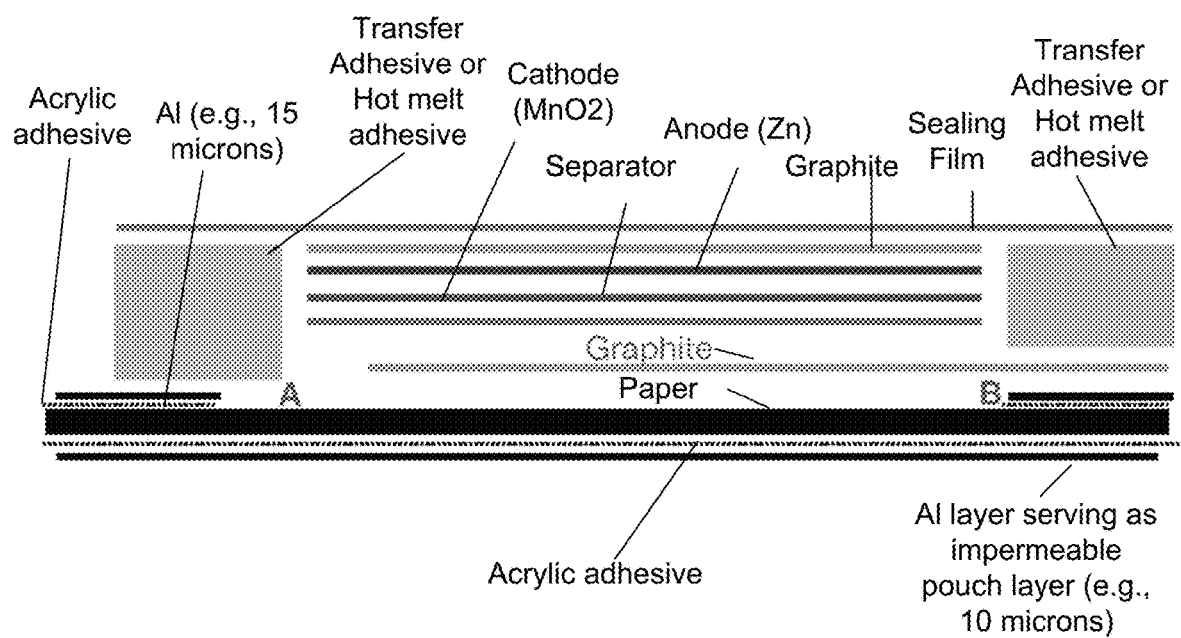
FIG. 25 is a cross section of a variation of a battery structure having an outer aluminum layer serving as an impermeable pouch layer in accordance with an implementation.

FIG. 25 is a cross section of a battery pouch of a wireless tracking label that eliminates the need for plastic-based materials to satisfy growing environmental impact regulations. Eliminating plastic-based materials makes wireless tracking labels fully recyclable and disposable. In some implementations, the PET layer can be replaced with a paper layer. As illustrated, the bottom aluminum layer serves as the impermeable pouch layer. A thin layer of acrylic adhesive (or other protective adhesive material) between the paper layer and the bottom aluminum layer separates the aqueous electrolyte from the aluminum and avoids corrosion. However, some seepage may occur in the horizontal direction. In one implementation, this is solved by impregnating points A and B with a material to make the paper more impermeable to $H_2O$ and $O_2$. As an example, wax or sol gel process may be used a points A and B. Alternatively, the paper could be patterned with a silicone additive or other environmentally friendly sealing mechanisms to make it impermeable.

Figure 26A:
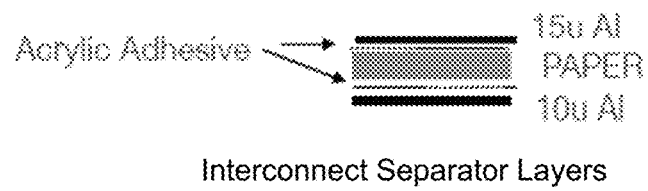
FIG. 26A illustrates an example of Interconnect Separator layers in accordance with an implementation.
Figure 26B:
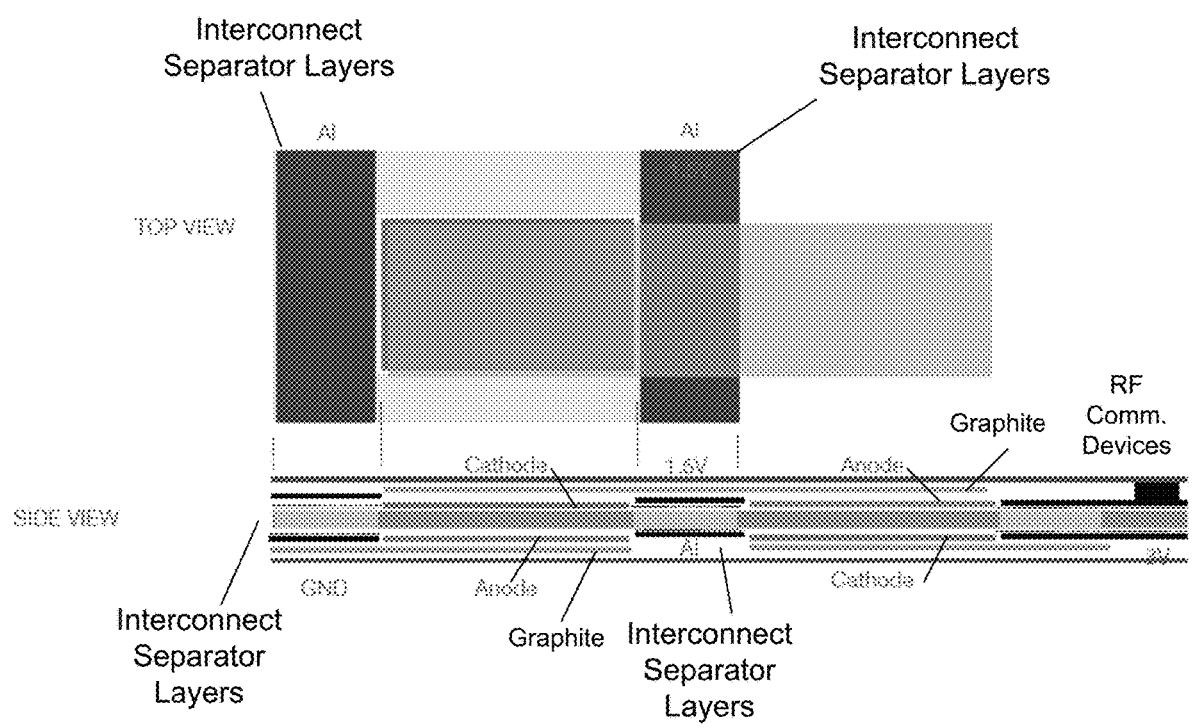
FIG. 26B illustrates a top view and a side cross-sectional view of a wireless tracking label with Interconnect Separator layers in accordance with an implementation.

FIG. 26A, FIG. 26B, FIG. 26C, and FIG. 26D illustrate aspects of an implementation using an interconnect layer as a separator for double-sided battery formation. individualized top seal areas. The reason individualized top seals are required is that battery formation must be performed before component assembly. The battery is typically screen printed or coated in various ways via gravure or rotary flexographic on a flat surface. That requires the battery formation to occur before component assembly. Components, such as the RF processor would impart bumps and impede the printing process. FIG. 26A illustrates a cross-section of interconnect separator layer, which may, for example, include a paper layer, top and bottom aluminum layers, and additional acrylic adhesive layers. FIG. 26B show a top view and a side cross-sectional view. The side cross-section view shows the interconnect separator layers, battery layers, etc. This approach uses the interconnect layer itself as a separator of the battery formation. In this implementation, the separator is considered the primary material and also acts as the interconnect layer. It can be described as an Interconnect Separator. It can be constructed as paper, or a porous polypropylene material such as Celgard. The Interconnect Separator includes a porous material (or a material that could be made porous) to facilitate ionic transfer within an electrolyte between the anode and cathode of a battery. In one implementation, the Interconnect Separator is a cellulose-based paper material laminated with aluminum foil on both sides. This is a commonly available material, typically used for making environmentally friendly RFID labels.

In one implementation, the Interconnect Separator is impregnated with a polymer around the borders of each cell, but this could be accomplished with a printing method. For example, a sealant in a liquid form can be patterned via a printing process to isolate each separator cell area.

Figure 26C:
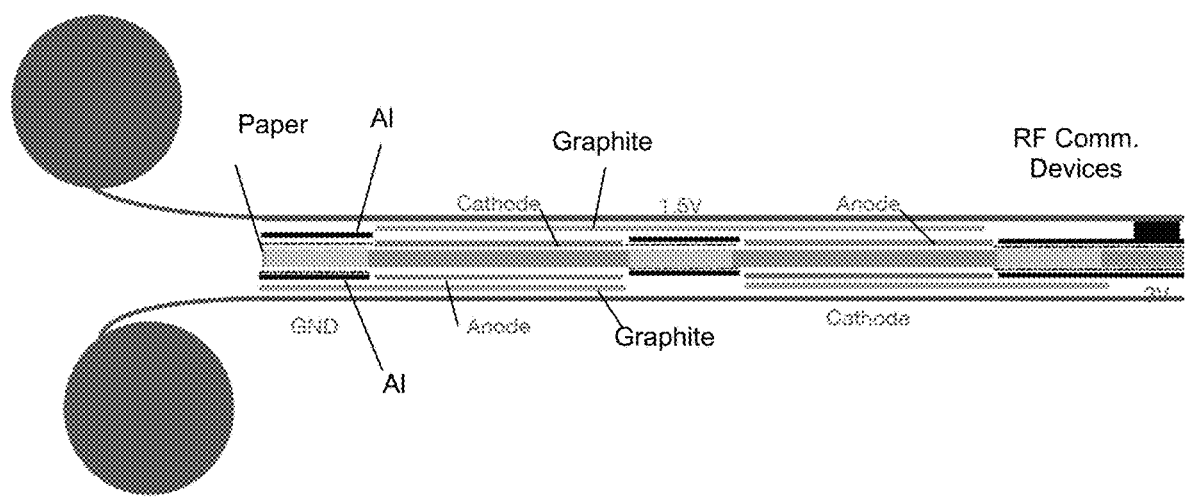
FIGS. 26C and 26D illustrate how the Interconnect Separator can be used for dual-sided battery formation in a reel-to-reel fabrication process in accordance with an implementation.
Figure 26D:
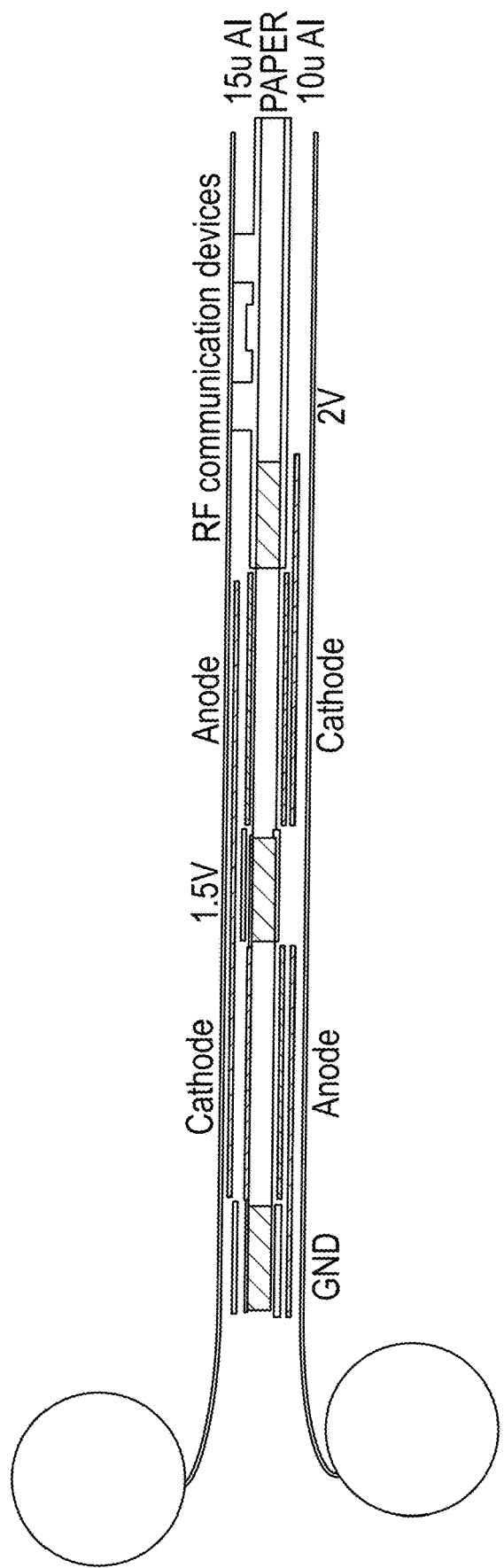

Referring to FIGS. 26C and 26D, this method using the Interconnect Separator supports a continuous reel-to-real method of fabrication. The double-sided battery fabrication makes the material flatter, eliminating large, bumped areas and uneven levels in some other fabrication processes. This method also supports fabricating various parallel and series battery configurations.

As previously discussed, in one implementation the wireless tracking label performs active beaconing. In order to build an active beaconing smart label, a wireless communication chip is required. However, advanced wireless silicon communication chips are often packaged in a variety of industry standards packages, such as epoxy Quad Flat No-Lead (QFN) packages Ball Grid Array (BGA) packages, etc. As an illustrative example, the heights of such packages may be in the range of 0.5 mm to 0.85 mm, to accommodate multiple chips in the same package, often referred to as an Multi Chip Module (MCM). As an example, the chips may include the RF communication chip itself, plus a memory chip, and even onboard inductors and capacitors on silicon. In typical manufacturing processes, these components are stacked in an MCM and formed with epoxy into a wireless chip (e.g., with a thickness of 0.5 mm to 0.85 m). However, in the application of a wireless tracking label, there are label applications in which it's necessary to use very thin packages, in some cases ideally less than 0.5 mm in height. The only practical way to accommodate this is by bonding the wireless chip die (and memory and inductors/capacitors) directly to the flexible substrate (which may for example be a PET substrate). The height is critical since the labels must be printable as normal labels and if the circuitry is too high, it interferes with the printability.

Additionally, another consideration is that flexibility of wireless tracking labels is also critical for larger chips, such as those that might be bigger than 2 mm×2 mm (length, width). This is because labels are reeled up as they are finished and therefore need to bend. During manufacturing on a reel-to-reel (R2R) system, the wireless label substrate must take various bends as it moves over and under rollers. In a thermal printer itself, the labels must pass through a platen roller in the print head, again, exerting forces that bend and flex the labels. A rigid, packaged chip (such as a chip packaged with BGA or QFP) will tend to break away or crack the connections to the wireless label substrate. Therefore, in some implementations, directly attaching the die to the flexible substrate is used to keep the surface area of the bonds very small. For larger die, using wire bonding techniques enables flexible connections, allowing the wireless chip to bend as the entire flexible label substrate bends.

In some implementations, the wafer die itself can be "bumped" and flipped, and directly bonded to the flexible label substrate. However, the resolution in which circuits can be built using a flexible label substrate, such as aluminized PET, may in some implementation not be able to accommodate such tight space and trace requirements to reach the pads directly on the flipped die. Therefore, in one implementation, wire bonding methods, similar to those used in making the MCMs, are employed on a reel-to-reel process in which moving a web of aluminized PET through a machine to directly form flexible wire connections from very close pads on the die, to wider points of contact on the substrate.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A wireless tracking label tape, comprising:
   a flexible substrate;
   an interconnect layer formed on the flexible substrate and patterned to electrically couple a plurality of electrical circuits including a RF communication processor and a RF communication circuit configured to generate tracking information; and
   a battery formed on the flexible substrate and comprising a cathode coating and an anode coating, with a battery pouch formed on the interconnect layer, the battery pouch containing electrochemical components of the battery to form a barrier impermeable to gases or moisture deleterious to battery lifetime for electrolyte chemicals including at least one member from the group consisting of $ZnSO_4$, $ZnCl_2$, $MnSO_4$, and $AlCl_4$.

2. The wireless tracking label tape of claim 1, wherein the interconnect layer comprises an aluminum layer.

3. The wireless tracking label tape of claim 1, wherein the RF communication processor and the RF communication circuit are configured to stay in a power-saving sleep mode during storage until activated for use.

4. The wireless tracking label tape of claim 1, wherein the wireless tracking label tape is formed in a reel-to-reel process with the RF communication processor and the RF communication circuit of at least one individual wireless tracking label activated subsequent to separation from a reel.

5. The wireless tracking label tape of claim 1, wherein the wireless tracking label tape includes a coil antenna tuned to resonate at a wake-up frequency and generate a wake-up voltage in response to engaging with a user device having a transceiver emitting a wireless signal at the wake up frequency.

6. The wireless tracking label tape of claim 1, wherein the battery comprises at least two electrochemical cells in series formed by a planar process with vertical flow of ions in each electrochemical cell with a planar conductive layer coupling the two electrochemical cells in series.

7. The wireless tracking label tape of claim 1, wherein the battery comprises at least two electrochemical cells in series formed by a coplanar process with each electrochemical cell having a lateral flow of ions between an interdigitated cathode and anode, with a planar conductive layer coupling the two electrochemical cells in series.

8. The wireless tracking label tape of claim 1, wherein the battery comprises 3 electrochemical cells in series with an electrical trace formed on the flexible substrate electrically coupling a top layer to a bottom layer.

9. The wireless tracking label tape of claim 1, wherein the battery comprises 3 electrochemical cells in series with an electrical via formed in the flexible substrate electrically coupling a top layer to a bottom layer.

10. The wireless tracking label tape of claim 1, wherein the battery comprises at even number of electrochemical cells in series formed by a planar process having a vertical flow of ions in each electrochemical cell with a patterned planar conductive layer coupling the four electrochemical cells in series.

11. The wireless tracking label tape of claim 10, wherein the battery comprises at least four electrochemical cells in series formed by a planar process with vertical flow of ions in each electrochemical cell with the patterned planar conductive layer coupling the four electrochemical cells in series.

12. The wireless tracking label tape of claim 1, wherein the battery comprises a series connection of at least two stages of electrochemical cells formed by a planar process with a vertical flow of ions in each electrochemical cell each stage of electrochemical and with each stage of electrochemical cells having at least two electrochemical cells in parallel.

13. The wireless tracking label tape of claim 12, the battery comprises a series connection of four stages of electrochemical cells with at least two electrochemical cells in parallel in each of the four stages.

14. The wireless tracking label tape of claim 1, further comprising a voltage control circuit to protect a load of an RF device, the voltage control circuit including a Zener diode with a Zener diode breakdown voltage selected to regulate a voltage applied to the load to within a safe voltage for the RF device during an initial time period when a battery voltage is switched to the load, the voltage control circuit being configured for the Zener diode to enter a low-current conductance mode after the initial time period.

15. The wireless tracking label tape of claim 14, wherein the RF device comprises at least one of the RF communication processor and the RF communication circuit.

16. The wireless tracking label of claim 15, wherein the voltage control circuit comprises a Zener diode with an associated capacitance in parallel with the load.

17. The wireless tracking label tape of claim 1, further comprising forming at least one of a capacitor and an inductor on one or more layers formed on the flexible substrate.

18. The wireless tracking label tape of claim 17 wherein the at least one of a capacitor and an inductor is utilized in an RF filter circuit of the wireless tracking label.

19. The wireless tracking label tape of claim 1, wherein the flexible substrate comprises a PET substrate.

20. The wireless tracking label of claim 1, wherein the flexible substrate comprises a paper substrate.

21. The wireless tracking label tape of claim 1, wherein the battery is coated onto the interconnect layer.

22. The wireless tracking label tape of claim 1, wherein the battery is printed onto the interconnect layer.

23. The wireless tracking label tape of claim 1, further comprising a conductive via formed between two conductive planes using a perforation with voids in the perforation filled in using a conductive ink.

24. The wireless tracking label tape of claim 1, further comprising a conductive via formed between two conductive planes using a perforation with voids in the perforation filled in using a conductive epoxy.

25. The wireless tracking label tape of claim 1, wherein the RF communication processor is disposed on a die, the die being attached to the flexible substrate.

* * * * *